US010254928B1

(12) United States Patent
Jesensky et al.

(10) Patent No.: US 10,254,928 B1
(45) Date of Patent: *Apr. 9, 2019

(54) CONTEXTUAL CARD GENERATION AND DELIVERY

(71) Applicant: Amazon Technologies, Inc., Seattle, WA (US)

(72) Inventors: James Joseph Jesensky, Issaquah, WA (US); Samuel Scott Gigliotti, Seattle, WA (US); Anil Kumar Kalagatla, Lynwood, WA (US); Jean Sevak Froundjian, Seattle, WA (US); Angela Lam, Seattle, WA (US); Ari Liberman Garcia, Austin, TX (US); Leon Amdour, Cambridge, MA (US); Ronald Alan Morris, Seattle, WA (US); Tracy Dianne Schultz, Seattle, WA (US); Raghav Kishor Phadke, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 854 days.

This patent is subject to a terminal disclaimer.

(21) Appl. No.: 14/498,729

(22) Filed: Sep. 26, 2014

Related U.S. Application Data

(60) Provisional application No. 62/047,629, filed on Sep. 8, 2014.

(51) Int. Cl.
*G06F 3/0484* (2013.01)
*G06F 17/30* (2006.01)
*H04L 29/08* (2006.01)
*G06F 3/0482* (2013.01)

(52) U.S. Cl.
CPC .......... *G06F 3/0484* (2013.01); *G06F 3/0482* (2013.01); *G06F 17/30528* (2013.01); *H04L 67/10* (2013.01)

(58) Field of Classification Search
CPC ................. G06F 3/0484; G06F 3/0482; G06F 17/30528; H04L 67/10
USPC ........................................................ 715/745
See application file for complete search history.

(56) References Cited

U.S. PATENT DOCUMENTS

| | | | |
|---|---|---|---|
| 8,090,794 B1 * | 1/2012 | Kilat | G06F 17/30867 709/203 |
| 9,069,578 B2 | 6/2015 | Singh | |
| 2002/0164999 A1 | 11/2002 | Johnson | |
| 2004/0059790 A1 | 3/2004 | Austin-Lane et al. | |
| 2008/0082941 A1 | 4/2008 | Goldberg | |
| 2008/0104177 A1 | 5/2008 | Keohane et al. | |

(Continued)

*Primary Examiner* — John T Repsher, III
(74) *Attorney, Agent, or Firm* — Eversheds Sutherland (US) LLP

(57) ABSTRACT

Systems, methods, and computer-readable media are disclosed for generating cards that include personalized content that is relevant to tastes or preferences of a user and contextually relevant to a current, historical, or future use context of a user device. The card content is determined to be relevant to a current use context of a user device based on an evaluation of contextual data with respect to constraints associated with the card. The card content is transmitted to a card client for presentation via a user interface of the client when the card content is deemed relevant to the current use context of the device.

18 Claims, 40 Drawing Sheets

(56) References Cited

U.S. PATENT DOCUMENTS

| | | | |
|---|---|---|---|
| 2009/0271778 A1* | 10/2009 | Mandyam | G06Q 10/06 |
| | | | 717/171 |
| 2010/0001980 A1 | 1/2010 | Kim | |
| 2010/0188328 A1 | 7/2010 | Dodge | |
| 2010/0211872 A1 | 8/2010 | Rolston | |
| 2010/0313149 A1 | 12/2010 | Zhang | |
| 2011/0214007 A1 | 9/2011 | Singh | |
| 2011/0264656 A1 | 10/2011 | Dumais | |
| 2013/0007255 A1 | 1/2013 | Gerber | |
| 2013/0191397 A1 | 7/2013 | Avadhanam | |
| 2013/0344899 A1 | 12/2013 | Stamm | |
| 2014/0015784 A1* | 1/2014 | Oonishi | G06F 3/0412 |
| | | | 345/173 |
| 2014/0067901 A1* | 3/2014 | Shaw | G06Q 10/10 |
| | | | 709/201 |
| 2014/0189030 A1 | 7/2014 | Benchenaa et al. | |
| 2014/0208234 A1* | 7/2014 | Amit | G06Q 30/0273 |
| | | | 715/753 |
| 2014/0372566 A1* | 12/2014 | Milne | G06F 17/30867 |
| | | | 709/219 |
| 2015/0100893 A1* | 4/2015 | Cronin | G06Q 10/06316 |
| | | | 715/751 |
| 2015/0178283 A1* | 6/2015 | Garg | G06F 17/3053 |
| | | | 707/748 |
| 2015/0304406 A1 | 10/2015 | Penilla | |
| 2015/0324271 A1 | 11/2015 | Glass | |
| 2016/0004393 A1 | 1/2016 | Faaborg et al. | |

* cited by examiner

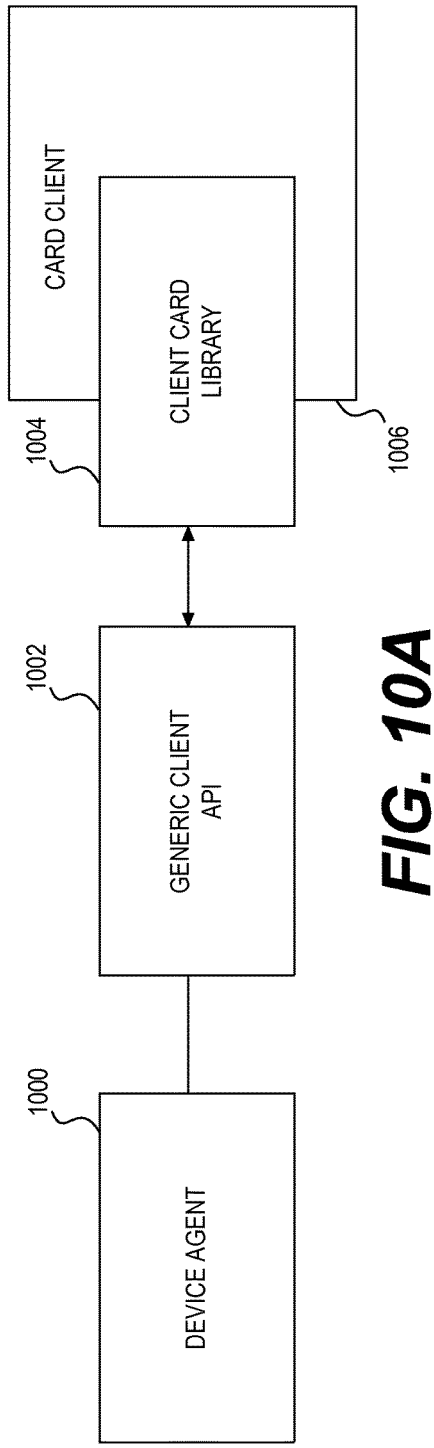
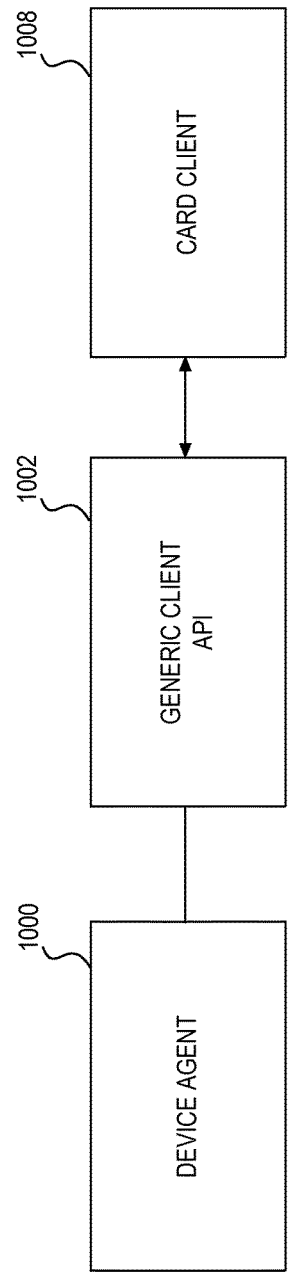

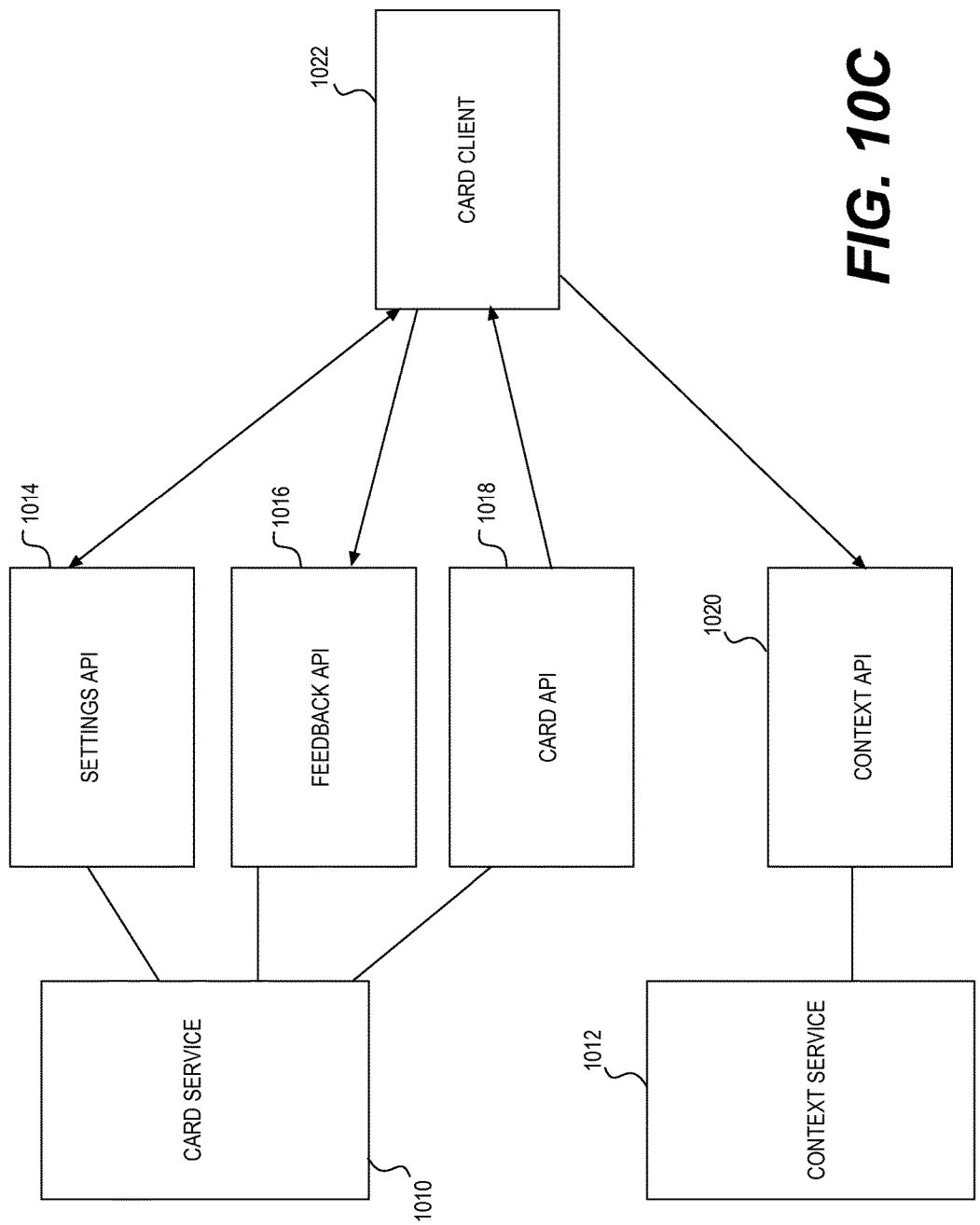

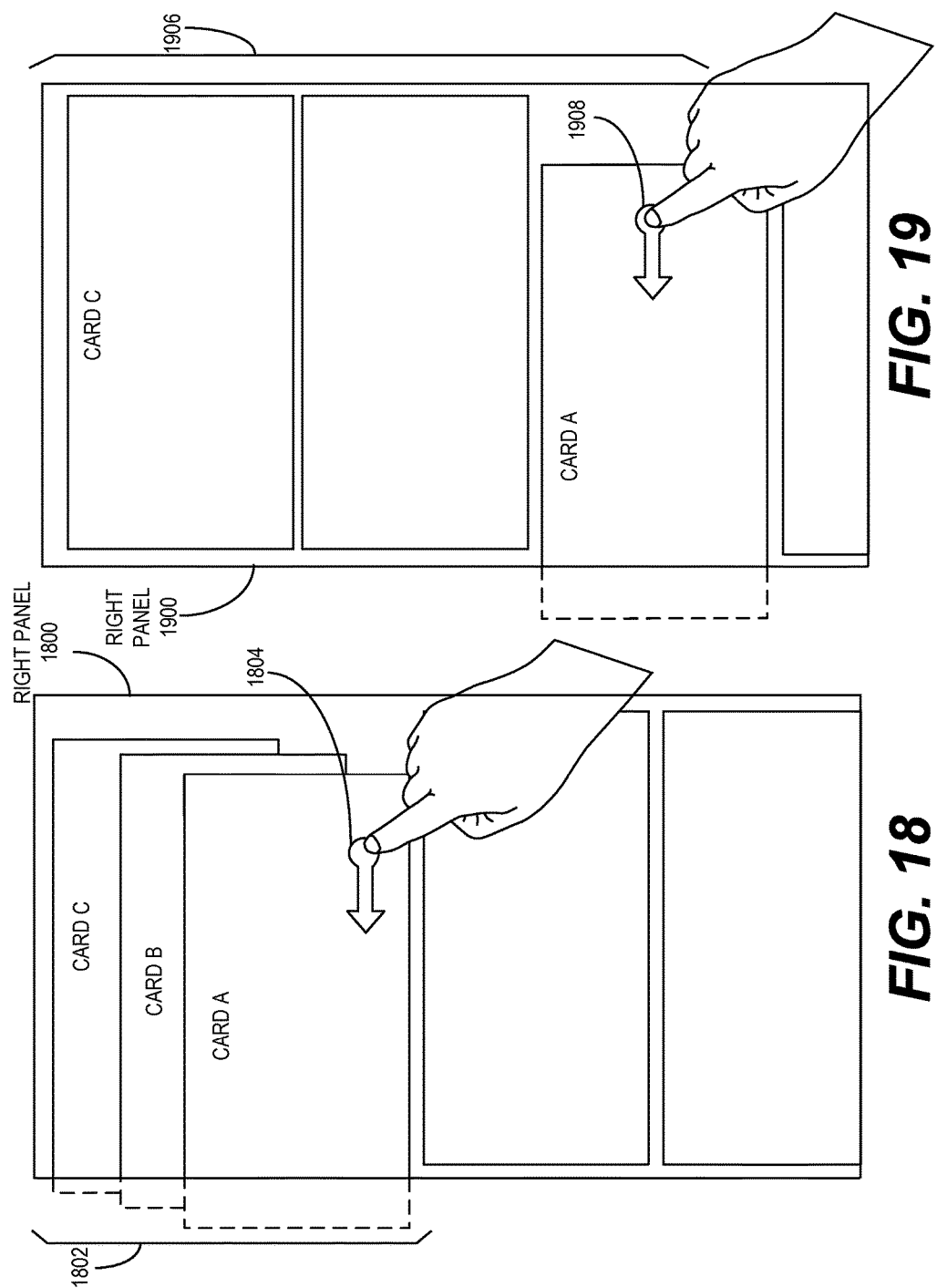

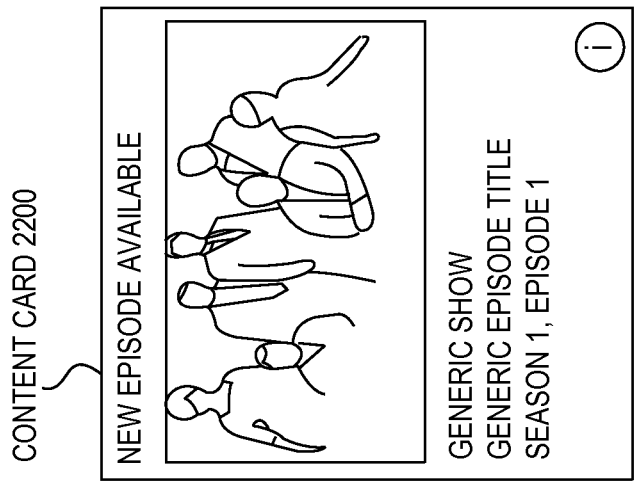
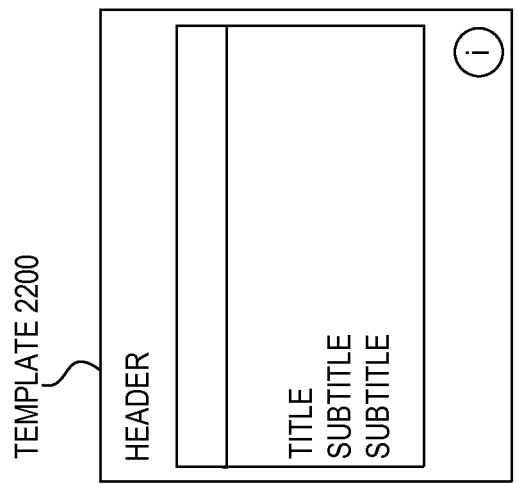
FIG. 22

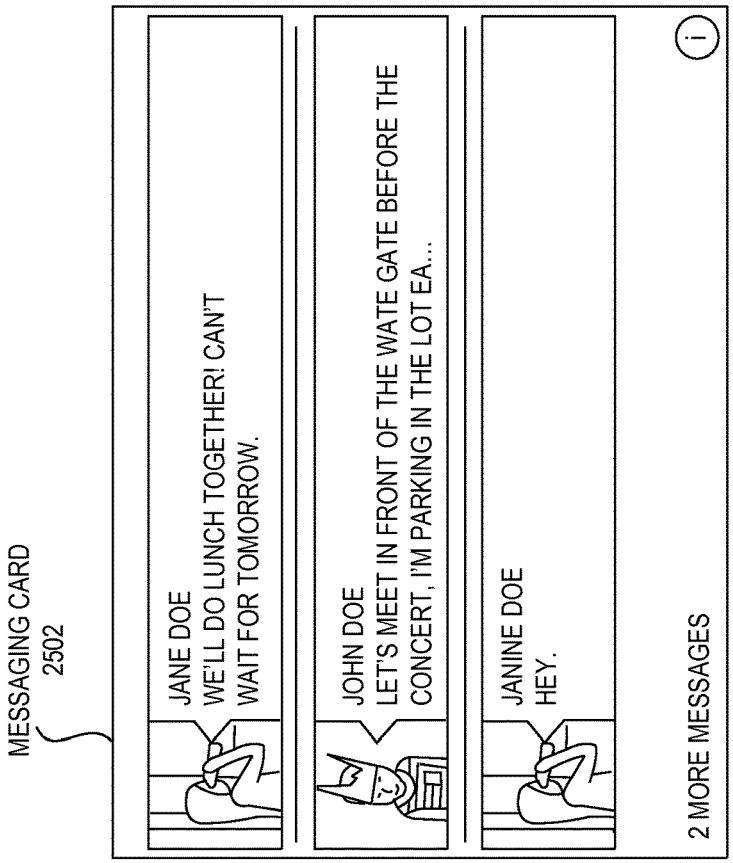
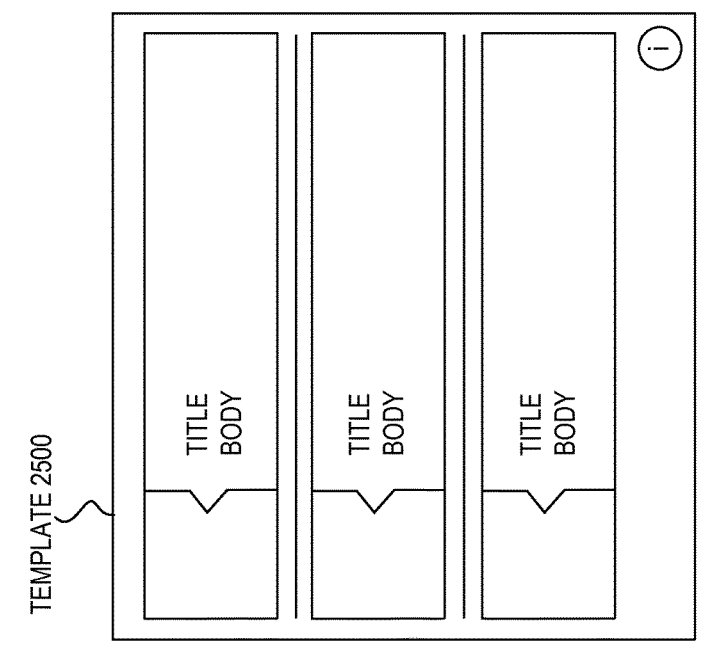
FIG. 25

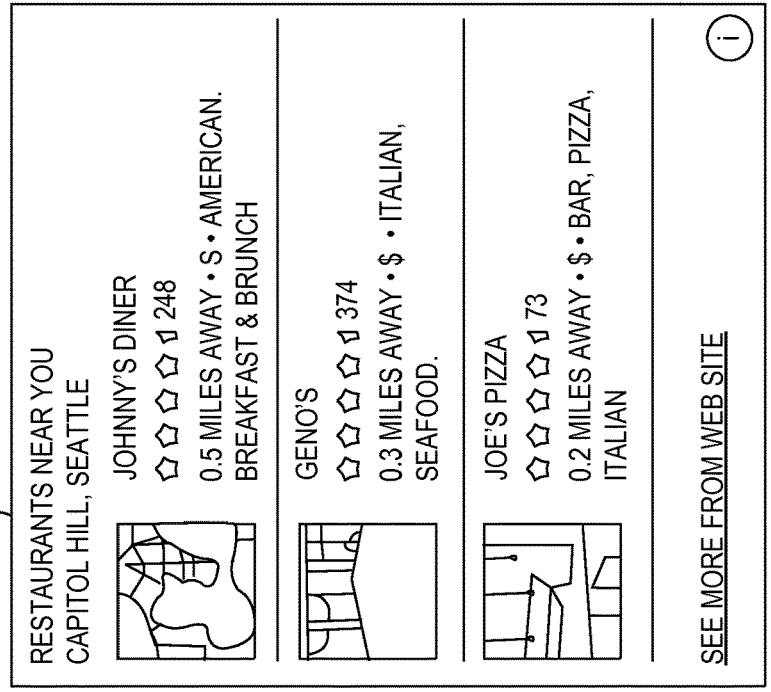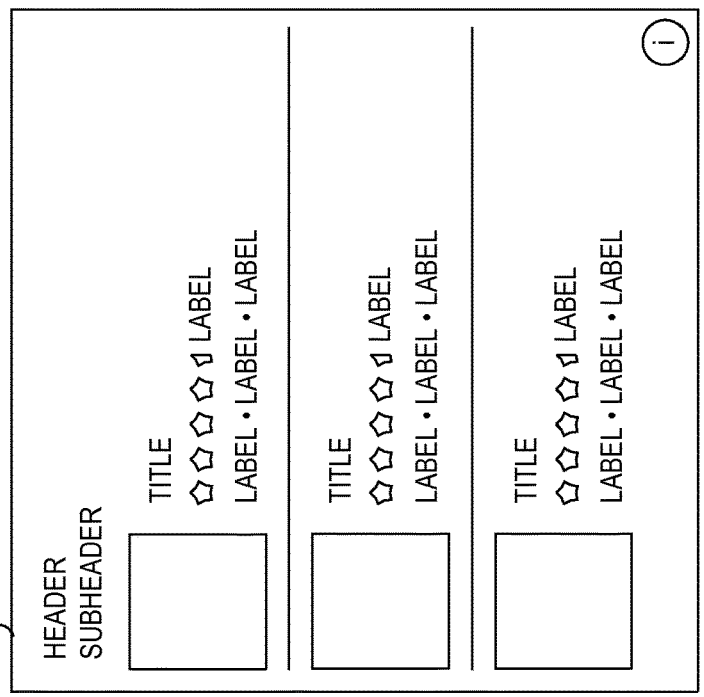
FIG. 26

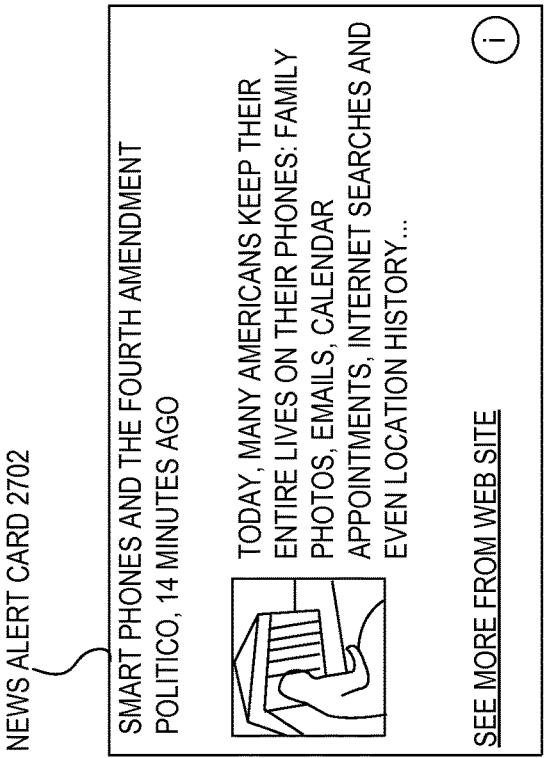
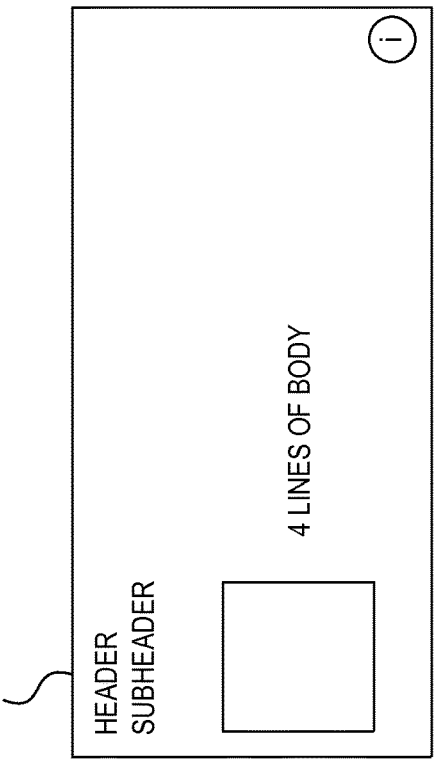
FIG. 27

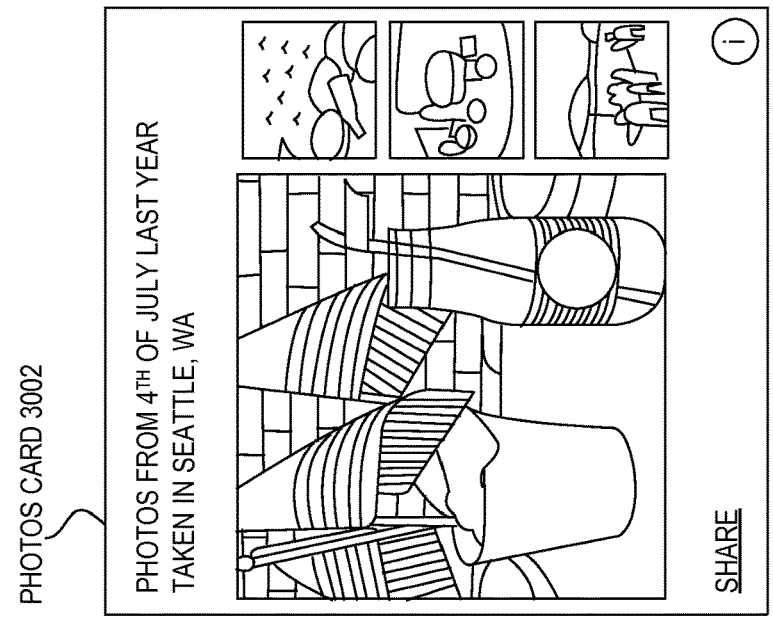
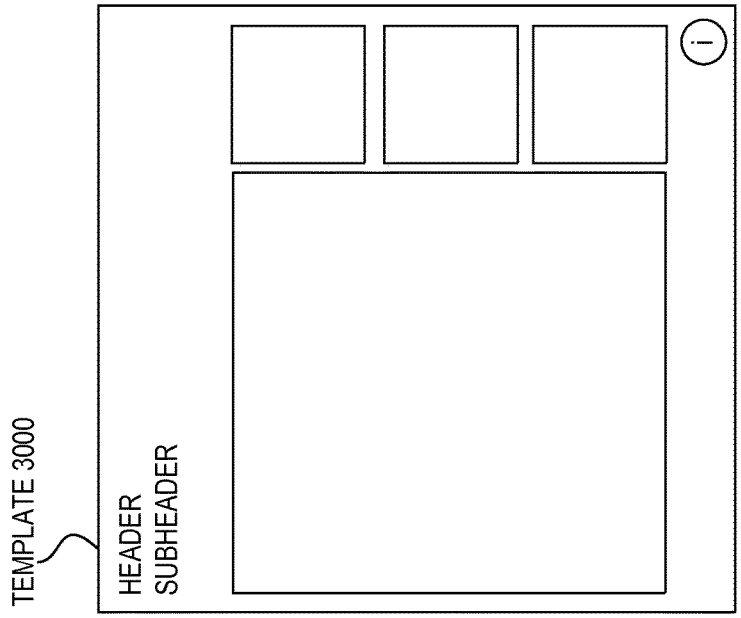
FIG. 30

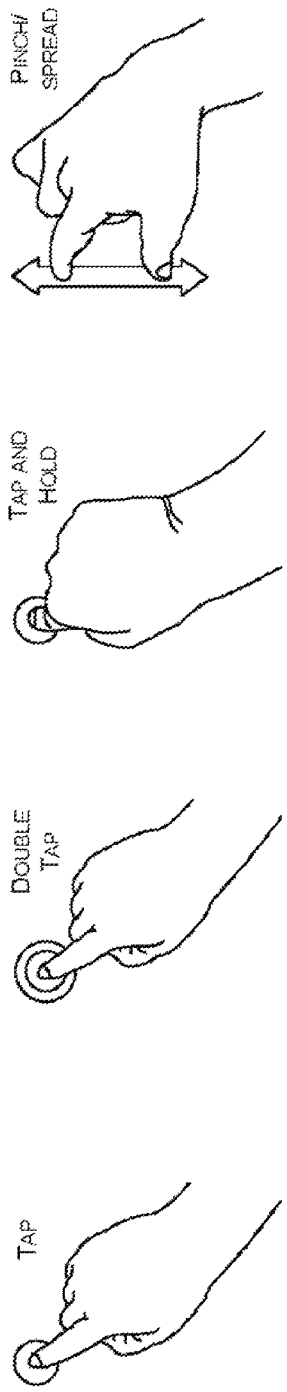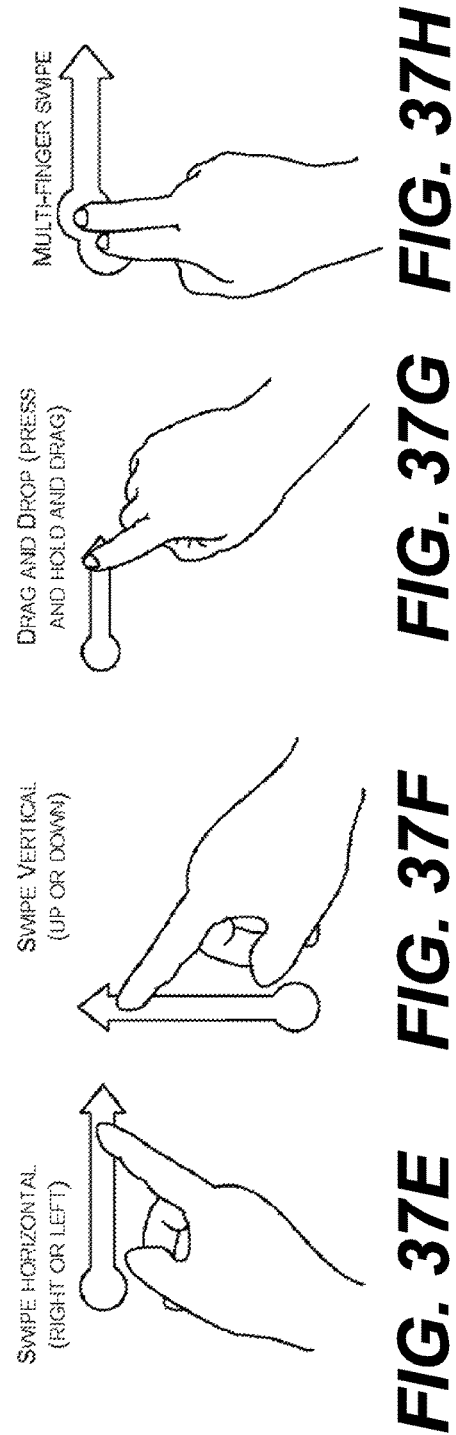

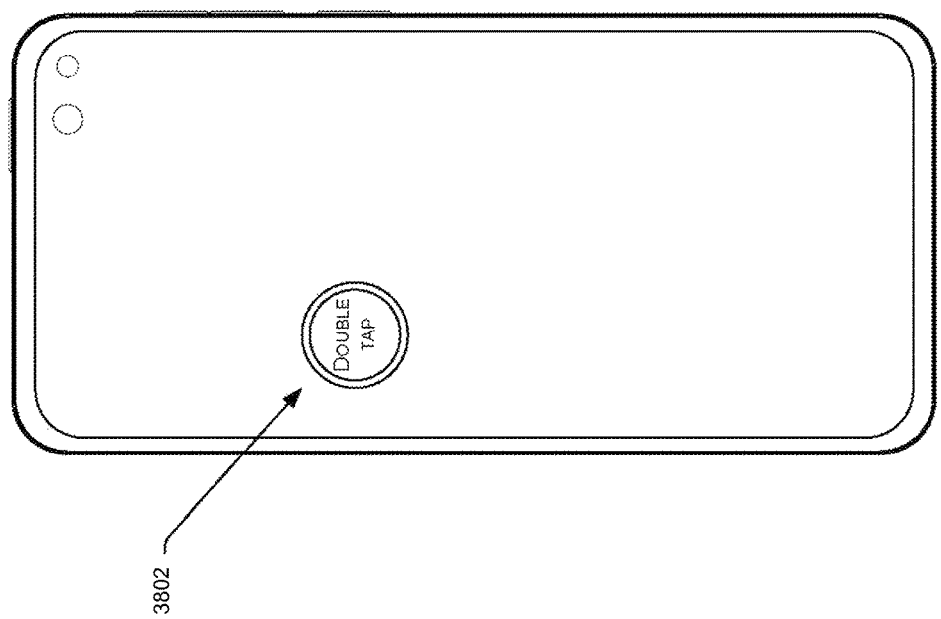

CONTEXTUAL CARD GENERATION AND DELIVERY

CROSS-REFERENCE TO RELATED APPLICATION(S)

This application claims priority from U.S. Provisional Application No. 62/047,629, filed on Sep. 8, 2014, the entire disclosure of which is hereby incorporated by reference.

BACKGROUND

The last decade has seen a dramatic increase in the availability and use of mobile devices. Advances in device and network capabilities, coupled with the rapid expansion in the breadth of available content and the number and variety of applications available for accessing such content, have caused mobile device users to increasingly rely on their mobile devices to obtain desired information, perform daily tasks, and so forth. Some mobile device applications provide users with notifications regarding available software updates, new content, and so forth. Such notifications may be pushed to a mobile device from a remote server or pulled by a device from the remote server at periodic intervals or as new information becomes available, and may be presented to a user in a predefined manner such as, for example, as part of a notifications menu.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 10A-10C are schematic block diagrams of various architectural implementations for supporting the presentation of card content by different types of card clients in accordance with one or more example embodiments of the disclosure.

FIG. 18 is a schematic diagram of an illustrative user action for dismissing a stacked set of cards in accordance with one or more example embodiments of the disclosure.

FIG. 19 is a schematic diagram of an illustrative user action for dismissing an individual card of an expanded set of cards in accordance with one or more example embodiments of the disclosure.

FIGS. 20-30 are schematic diagrams of example templates and corresponding card types in accordance with one or more example embodiments of the disclosure.

FIGS. 37A-37H illustrate various example touch and multi-touch gestures that may be performed using a user device in accordance with one or more example embodiments of the disclosure.

FIG. 38 illustrates an example double-tap gesture that may be performed on a back surface of a user device in accordance with one or more example embodiments of the disclosure.

DETAILED DESCRIPTION

Overview

Figure 1:
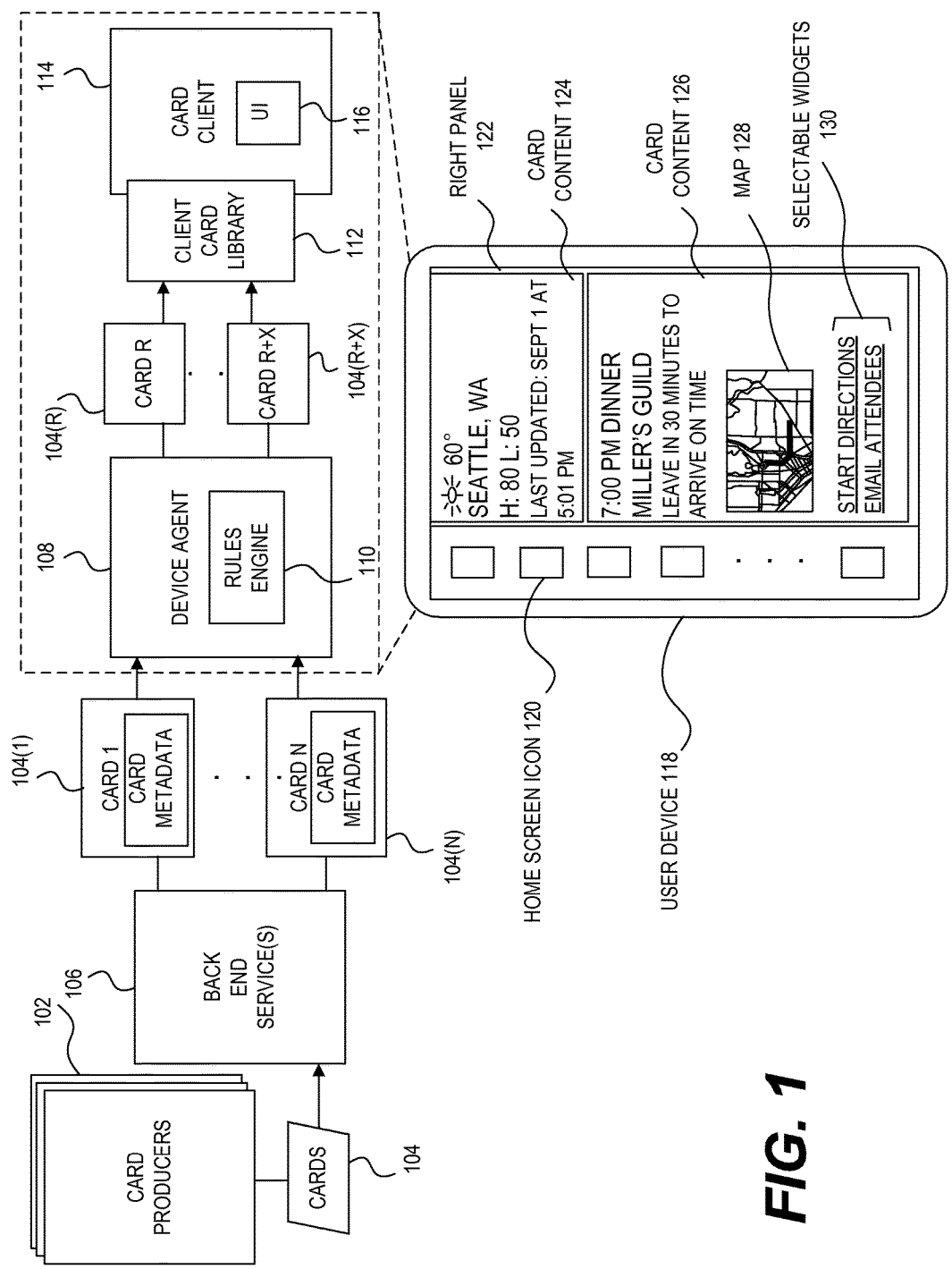
FIG. 1 is a schematic diagram of example data flows as part of an illustrative use case in accordance with one or more example embodiments of the disclosure.

This disclosure relates to, among other things, systems, methods, computer-readable media, techniques, and methodologies for generating cards that include personalized content that is relevant to tastes or preferences of a user and contextually relevant to a current, historical, or future use context of a user device, determining when the card content of a card is relevant to a current use context of the device based on an evaluation of contextual data with respect to constraints associated with the card, and transmitting card content of the card to a card client for presentation via a user interface of the client when the card content is deemed relevant to the current use context of the device. The card content may be rendered in or otherwise presented via a user interface of the card client or may be otherwise utilized by the card client to perform one or more actions such as to identify and present an advertisement that is relevant to the card content.

The terms card and card object may be used interchangeably herein. A card or card object may include a package of information including card content intended for presentation via a user interface of a card client and card metadata. The card metadata may include various types of identifiers that may identify the particular card object, the type of card, the producer of the card, etc.; constraints that constrain presentation of the card content to certain situations; date/timestamps that indicate a date/time of creation or expiry of the card; machine-readable structured data that indicates various attributes of the card content; and so forth.

In one or more example embodiments of the disclosure, a device agent may be provided in connection with a user device such as a smartphone, tablet device, wearable computing device, desktop or laptop device, or the like. The device agent may include any suitable combination of software, firmware, and/or hardware. In an example embodiment of the disclosure, the device agent may include one or more software and/or firmware modules configured to manage the receipt of cards from card producers and the delivery of cards to card clients for presentation via associated interfaces. The device agent may be referred to herein, at times, as a card delivery management module or the like.

In certain example embodiments of the disclosure, card producers may operate in an environment that is remote from a local device environment. For example, a card producer may be provided at one or more remote servers from the user device. In such example embodiments, the device agent may communicate with one or more remote services which may, in turn, communicate with the card producer. In other example embodiments, a card producer may be provided locally on a device. Short messaging service (SMS) clients, electronic mail (e-mail) clients, or the like may be examples of local card producers.

The device agent may receive contextual data from one or more context sources. The context sources may include, for example, location-based services, personal information management (PIM) services, device sensors, or the like. The contextual data received from one or more context sources may include location data that indicates a current location of a user device, historical device locations over some period of time, and so forth. The contextual data may further include time data that includes a date/timestamp indicating a current date and/or time; user speed data that indicates a current speed, historical average speed, or historical range of speeds at which a user of the user device travels over some period of time (as gleaned from, for example, inertial sensor data); calendar data that indicates appointments or tasks scheduled on a calendar of the user device; data identifying voice calls or electronic communications (e.g., SMS messages, e-mails, instant messages, social networking messages, etc.) received over some period of time, and so forth.

The contextual data may further include data indicating a change in the current use context of the user device. For example, the contextual data may indicate a change in a user activity or mode. Various user activities or modes may be associated with particular user speeds or ranges of user speeds. Such activities may include, for example, walking, biking, jogging, running, an in-vehicle mode, a stationary mode, flying, and so forth. As another example, the contextual data may indicate a change in location in relation to a known location such as a work location, home location, frequently visited location, a point-of-interest (POI) location, etc. For example, a known location may be associated with a tag, label, or the like that identifies it as a particular type of location. The known location may be associated with a geo-fence that defines a virtual perimeter around the location. Generation of contextual data may be triggered if the user device passes a boundary of a geo-fence associated with a known location, and thus, may indicate a change in a location-based context of the user device. Similarly, contextual data may be generated by a context source and received by the device agent whenever a current location of the device is altered by a predetermined distance.

Other types of changes to the use context of a user device that may trigger the generation of contextual data include, without limitation, large location changes (e.g., the device moves into a region with a different postal code, the device changes location to a new country, etc.); establishment of a connection with another device over, for example, a personal area network (e.g., Bluetooth™) or movement within range of a network connection with another device (e.g., headphones, another user device, an in-vehicle system, etc.); daily routine events (e.g., daily commute); the beginning or end of a particular time range during the day (e.g., sunrise, sunset, etc.) that may be associated with a typical activity (e.g., breakfast-time, lunch-time, dinner-time, etc.); a change to predicted future locations of the user device; proximity to another user device associated with another user with whom the user of the user device is connected via, for example, a social networking platform; and so forth. It should be appreciated that the above examples of changes to a use context of the user device are merely illustrative and not exhaustive.

As previously noted, contextual data received by the device agent from one or more context sources may be communicated, potentially via a proxy or firewall, from the device agent to a device service executing on a remote server. In certain example embodiments, the device service may transmit the contextual data to a context service executing on a same or different remote server. The context service may be configured to store the contextual data and push the contextual data to interested card producers and/or provide the contextual data to card producers in response to queries received from the card producers. Contextual data may be pushed to a card producer when, for example, the contextual data indicates a change in the use context of a device. Any one or a combination of the device agent, the device service, the context service, and/or a card service (described hereinafter) may form part of a card delivery management platform, as that term is used herein. Any of the remote services forming part of the card delivery management platform may include any combination of software, firmware, and/or hardware, and may, in certain example embodiments, include one or more web services. One or more Application Programming Interfaces (APIs) may be utilized by card producers, the device agent, and so forth to access one or more of the remote services.

In certain example embodiments, the context service may be configured to generate historical contextual data that may indicate, for example, a percentage of time spent at a particular known location (e.g., a work location, a home location, another known location) over some period of time (e.g., the current day, the past week, the past month, etc.); a number of times a particular known location was visited over some period of time; an average time of day or an average time range during which the user of the user device is engaged in a particular activity (e.g., ate lunch, went for a jog, started his/her work commute, etc.); an average time of day or an average time range during which the user consumed content on the user device or another device; a breakdown of the types of content consumed over some period of time; and so forth. The context service may be further configured to generate predictions regarding potential future use contexts for the user device. Such predictions may be generated based on an analysis of historical contextual data. It should be appreciated that the above examples are merely illustrative and not exhaustive.

A card producer may utilize the contextual data to generate a card that includes content that is contextually relevant to a historical, current, or future use context of a user device. For example, a card producer may generate a card that provides current traffic information along a travel route in response to receiving contextual data indicating the user device has passed a geo-fence boundary associated with a work or home location or in response to receiving historical or predictive contextual data indicating that the user typically begins a daily commute at or around a particular time. A card producer may also update card content in response to receiving contextual data. For example, a card producer that generates weather-related cards may update the content indicating weather data for a particular location upon receiving contextual data indicating that the user device's location has changed (e.g., entered a zip code associated with a different city).

A card generated by a card producer may include card content intended for presentation to a user via a user interface of a card client, and may further include card metadata that indicates various attributes of the card. The card content may be presented in any suitable manner. For example, the card content may be visually displayed or may be presented as auditory or haptic output. In certain example embodiments, the card content may be presented as visual, auditory, or haptic output via an accessory device with which a user device is capable of communicating such as, for example, a Bluetooth™ device (e.g., a headset), an external speaker, a wearable computing device, or the like. The card content may include text, graphics, video content, animated content, or the like. The card content may further include a representation of a uniform resource identifier (URI) such as, for example, a hyperlink that when selected causes other content to be presented to the user (e.g., related web content). As another example, the card content may include a selectable widget that causes a related mobile application to be launched responsive to selection. The card may be generated using a template that may define the organization, formatting, size, and type of card content that can be presented. In certain example embodiments, a template may define an overall structure or organization for card content including placeholders for various content (e.g., a header placeholder, a sub-header placeholder, an image placeholder, an action placeholder, etc.) and a card client may receive card content corresponding to the various placeholders specified by the template and may adjust formatting (e.g., font type, font size, positioning of content items, etc.) based on the capabilities of a user interface of the card client via which the card content may be presented. The card content or the card or card object itself may, at times, be interchangeably referred to herein as being presented by a card client.

The card metadata may include various identifiers associated with the card. For example, the card metadata may include a version identifier that indicates a version of an Application Programming Interface (API) used by the card producer to push the card to a card service which, in turn, may transmit the card to the device agent executing on the user device. The card metadata may further include a request identifier. The request identifier may be used by the device agent and the device service for synchronization purposes to ensure that the same card data is being maintained both locally on the device and remotely on one or more servers on which the device service is executing. The request identifier may also be used to stamp feedback data (described in more detail later in this disclosure) to link the feedback data to the card to which the feedback data relates. The card metadata may further include a producer identifier that creates a namespace of card types and identifies the card producer. The card metadata may additionally include a card type identifier that indicates the type of card (e.g., a meal-related card, a weather-related card, etc.). The card metadata may additionally include a card identifier that identifies a particular presentable card. The producer identifier in conjunction with the card type identifier may create a namespace of card identifiers. In certain example embodiments, a user may be able to select a setting to selectively turn on or off the presentation of cards based on the card type identifier. For example, a user may select a setting instructing a card client to always exclude presentation of weather-related cards.

The card metadata may also include a card instance identifier that identifies a particular instance of a card. In certain example embodiments, a card producer may produce multiple instances of a card, with each instance having a different card instance identifier but the same card identifier. Different instances of a card may correspond to different versions of a card with different card content relevant to different contextual conditions. For example, a card producer may produce multiple instances of a "lunchtime" card that provide different restaurant recommendations in relation to different geo-coordinates. The different contextual conditions to which different instances of a card may be relevant may be embodied as constraints within the card metadata. If the contextual conditions of two instances overlap, the device agent and/or the card client may select the more relevant instance based, for example, on user preferences, contextual history data, or the like.

The card metadata may further include a time/datestamp that indicates a point in time at which the card expires and is no longer available for presentation, a time/datestamp indicating a point in time at which the card producer generated the card (which may differ from a point in time at which the card is pushed to the card service via a call to a corresponding API), a customer identifier that may indicate a particular user for whom the card is intended, and a device identifier that may indicate a particular device on which the card is to be presented. If no device identifier is specified, the card may be presented on any device associated with the customer identifier. Card producers may not be required to store customer and/or device identifiers. Rather, these identifier(s) may be provided to the card producer in association with the contextual data. For example, the payload of an event notification transmitted to a card producer that indicates a change in device location may include the device identifier associated with the device.

The card metadata may further include constraints that specify desired contextual conditions or contextual conditions that must be present before the card content is presented. For example, the card metadata may specify a desired location or time during which the card content is deemed more relevant. For example, a "lunch mealtime" card intended for presentation on a weekday may specify a user's work location as the most relevant location and a time that corresponds to when people typically eat lunch (or a time that the user typically eats lunch) as a most relevant time. The card metadata may further specify one or more constraints on when the card content can be presented. An example set of constraints may include the following: 1) within a specified radius of the most relevant location, 2) not the home location, and 3) within a specified time range. The card metadata may further include various other data which will be described in more detail later in this disclosure.

A card producer may utilize other types of data in addition to contextual data to generate personalized card content. For example, a card producer may receive customer data for a user from the device agent via, for example, the context service and/or the card service. The customer data may include, for example, search/browsing history data indicating previous search or browsing activity of the user, purchase history data indicating previous items/services purchased by the user, content consumption data indicating previous content consumed on the user device or other device(s), and so forth. The card producer may identify personalized content for the user based on the customer data.

Upon generating a card, a card producer may transmit the card to a card service via a call to an associated API. The card service may store the card in a datastore and may communicate the card to the device service which, in turn, may communicate the card to the device agent executing on the user device. If no constraints are specified in the card metadata of the card, the device agent may transmit the card to a card client for presentation by the client via an associated user interface. In certain example embodiments, a client card library may be provided that receives the card and manages the loading and rendering of the card in the user interface of the card client. For example, the card client may provide the card client library with pixel coordinates corresponding to a window of a user interface in which the card content is to be rendered, and the client card library may render the card content in the window. In certain example embodiments, the card client may be a display panel having an associated user interface that is rendered on a display of the device in response to a user gesture such as a swipe or swivel gesture. The card content may be rendered in the display panel by the client card library. It should be appreciated, however, that the card client may be any suitable entity that presents card content such as, for example, a browser application, a mobile application, a web-based application, or the like.

If constraints are specified in the card metadata, the device agent may utilize a rules engine to evaluate current contextual data to determine whether the contextual data satisfies the constraints. For example, if the card metadata specifies the following constraints: 1) within 10 miles of the user's work location, 2) not the user's home location, and 3) within a specified time range, the device agent may evaluate current contextual data received from various context sources to determine if the constraints are satisfied. If a constraint is not satisfied (e.g., the user device is at the home location because, for example, the user is working from home), the device agent may refrain from communicating the card to a card client. If, on the other hand, the device agent determines that the constraints are met, the device agent may transmit the card to a card client.

Assuming that the card is transmitted to a card client and the card content is presented via a user interface of the card client, the user may interact with the card in a variety of ways. For example, the user may dismiss the card from the user interface by applying a particular gesture to a touch-sensitive display of the user device (e.g., a swipe, a double tap, etc.). The card content may include various selectable elements such as, for example, selectable icons, selectable images, selectable representations of URIs (such as a hyperlink to a web resource), video content capable of being selected to initiate playback, or the like.

Various feedback data may be collected by the card client (or the client card library). The feedback data may indicate one or more user interactions with the card content. For example, the feedback data may indicate a number of impressions of the card content (e.g., a times of times the card content was presented), an amount of time the card content was displayed by the card client, whether the card was dismissed (e.g., swiped away), an amount of time that elapsed between presentation of the card content and dismissal of the card, a number of actions that were triggered as a result of interaction with the card content, head tracking data gathered by image sensors of the device that may indicate an amount of time that the user viewed the card content, and so forth. The feedback data may further include data that may provide a more direct assessment of the user's sentiment towards the card content. For example, the card itself (or the card client or the client card library) may provide a user with the capability to rate or review the card content.

The feedback data may be communicated to the device agent, which may, in turn, communicate the feedback data to the device service. The device service may convey the feedback data to the card service which may store the feedback data and provide the feedback data to the producer of the card. The feedback data may include the card identifier of the card to which it relates so that the card producer can link the feedback data to the appropriate card. The card producer may utilize the feedback data to update the card content with the goal of increasing positive user sentiment towards the card content. For example, if the feedback data indicates that the user dismissed the card after a short period of time, the producer may update the card content to increase the relevance of the card to the user's preferences or tastes. More specifically, the card producer may utilize the feedback data and customer data associated with the user to generate updated card content having increased personalization for the user. The card producer may also utilize the feedback data in conjunction with the contextual data to generate updated card content that is more contextually relevant. Cards with updated card content may include the same card identifier as a previously generated card (but perhaps a new instance identifier), while a new card may include a new card identifier, which may cause existing cards of the same card type to be deleted.

In generating or updating card content for a card, and in addition to contextual data, feedback data, and/or customer data, a card producer may utilize settings data to improve the personalization and/or contextual relevance of a card to a user. The user may be provided with a capability to specify various values reflected in the settings data. For example, the settings data may indicate a desired language; a desired unit system (e.g., metric vs. English system); desired activities, interests, content, or the like; a desired ordering of card types, and so forth. In certain example embodiments, default settings may be used if the user has not specified settings values. For example, if the registered address of a device is in Sunnyvale, Calif., the user's favorite sports teams may default to the 49ers and the Giants.

The card metadata for a card associated with a particular card identifier may include a score generated by the producer that reflects a perceived degree of contextual relevance and/or personalization of the card content to a particular user. The producer may update the score assigned to a card based on received feedback data. In addition to a producer-generated score, the card metadata may further include a priority indicator that indicates an importance of the card content contained in the card. The priority indicator may be one of multiple predefined priorities that may be indicative of an importance of the card content. In certain example embodiments, the priority indicator may be determined across multiple card types and across an aggregate number of users. For example, a same priority indicator may be assigned to multiple cards of different card types to be presented to multiple users if the respective card content of the multiple cards is determined to be of equal importance.

In certain example embodiments, the card delivery management platform may generate a platform score for a card associated with a particular card identifier based at least in part on the producer-generated score for the card and a priority indicator assigned to the card. The card delivery management platform may further utilize feedback data to generate or update the platform score. The card delivery management platform may include a ranking engine that executes a ranking model that receives a platform score for a card and contextual data indicative of a current use context of a user device as input and generates a ranking for the card. The ranking may specify whether the card content of the card is to be presented as well as an order in which the card content is to be presented with respect to card content of other cards. The ranking may be updated based on feedback data received for the card. It should be appreciated that any of a variety of other types of input may be provided to the ranking engine in addition to, or in lieu of, the platform score and contextual data, such as, for example, the producer-generated score, the priority indicator, settings data, customer data, or the like. In certain example embodiments, the ranking for a card may be used to update the producer-generated score and/or the platform score as part of a feedback loop. In addition, in certain example embodiments, the producer-generated score or the platform score may be an absolute score determined in accordance with a scoring formula, while in other example embodiments, the score(s) may be relative score(s) that indicate a card's degree of relevance and/or personalization (e.g., likelihood to generate positive user sentiment) in relation to other cards. The ranking model may be a static model or a dynamic model that is refined over time as additional contextual data and feedback data are collected.

In certain example embodiments, a card with a higher ranking may be prioritized for presentation over a card with a lower ranking. Further, a different ranking of cards may be provided for different users based on the current contextual data associated with the different users and the personal tastes or preferences of the users. In addition, ranking data that indicates relative rankings of cards available for presentation to a user may be updated based on feedback data received for card content of one or more of the cards to reflect an updated set of relative rankings. It should be appreciated that feedback data received for card content for a particular card may impact the rankings of multiple cards (e.g., cards that include related card content).

The term "ranking metric" may be used herein to describe a score and/or a ranking for a card. In certain example embodiments, a platform score determined by the card delivery management platform may be based, at least in part, on a score assigned to the card by the card producer. Further, in certain example embodiments, a card producer may assign an initial ranking to a card, which may be later modified by the card delivery management platform. Any component of the card delivery management platform (e.g., the device agent, the device service, the card service, or the context service) may generate the platform score and/or ranking for a card.

Example embodiments of the disclosure can provide a number of technical features and/or technical effects. For example, in accordance with example embodiments of the disclosure, cards that include content that is personalized to a user's taste/preferences may be presented to a user when the content is determined to be contextually relevant based on a current use context of a user device. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Case

FIG. 1 is a schematic diagram of an illustrative use case in accordance with one or more example embodiments of the disclosure. While any given component depicted in any of FIGS. 1-39 may be described in the singular, it should be appreciated that multiple such components may be provided in accordance with example embodiments of the disclosure. As shown in FIG. 1, one or more card producers 102 (remote or local) may generate one or more cards 104. The cards may include a new card with new content that does not relate to an existing, non-expired card, or may include a card with updated content that may include the same card identifier as an existing, non-expired card (such cards may be referred to herein as "updated cards"). The card producers 102 may communicate the cards 104 to one or more back-end services 106. The back-end services 106 may include, for example, a context service, a card service, and/or a device service. In one or more example embodiments, the card producers 102 may push the cards 104 to the card service via an API.

Upon receipt of the cards 104, the card service may store the card data and communicate the cards 104 to the device service which may, in turn, communicate the cards 104 to a device agent 108 hosted on a user device 118. The cards 104 may include, for example, cards 104(1)-104(N) produced by any number of card producers 102. Each card 104 (e.g., card 104(1)) may include respective card content for presentation to a user and respective card metadata that may include any of the types of data previously described. For example, a card 104 (e.g., card 104(N)) may include card metadata that specifies one or more constraints. The device agent 108 may utilize a rules engine 110 to evaluate contextual data (not shown in FIG. 1) to determine whether the contextual data satisfies the constraint(s) of the card. As previously described, the contextual data may be received from any number of context sources and may include any data that may indicate a current use context for the user device 118 such as, for example, location data, time data, user speed data, activity mode data (e.g., a particular user speed or range of speeds may correspond to a particular activity such as walking, running, etc.), calendar data, data relating to other device applications (e.g., SMS messages recently sent or received via an SMS application, e-mails recently sent or received via an e-mail application, etc.), and so forth.

The device agent 108 may identify one or more cards 104(R)-104(R+X) of the cards 104 that are associated with constraints that are satisfied by the contextual data and may transmit the cards 104(R)-104(R+X) (generically referred to hereinafter as cards 104') to a client card library 112 for rendering in a user interface (UI) 116 of a card client 114. It should be appreciated that in various example embodiments, the cards 104' may be transmitted to the card client 114 directly and not via the client card library 112. In such example embodiments, the client card library 112 may or may not be present.

In certain example embodiments, the cards 104' may include one or more cards that do not include metadata that specifies constraints on contextual conditions for display of the associated card content. Further, in certain example embodiments, even if the constraint(s) associated with a card are met, the device agent 108 may nonetheless refrain from transmitting the card content to the client card library 112 for display in the UI 116 of the card client 114. For example, as previously described, one or more cards 104 may have an assigned ranking metric (e.g., a score generated by a producer of the card, a score generated by the card delivery management platform, a ranking assigned to the card by the card producer and/or the card delivery management platform, etc.). In certain example embodiments, the device agent 108 may select only those cards having a ranking metric above a certain threshold value for inclusion in the set of cards 104' transmitted to the client card library 112. In other example embodiments, the device agent 108 may select the X cards having the highest ranking metrics even if the ranking metric of any particular card of the X cards does not meet or exceed a threshold value. The ranking metric that is compared against a threshold value or otherwise evaluated to determine the X cards having the highest ranking metric may be the producer-generated score, the platform-generated score, an assigned ranking (e.g., producer-generated, platform-generated, producer-generated and platform-modified, etc.), or any combination thereof. The threshold value may be determined by the card delivery management platform (e.g., the device agent 108, a back-end service 106, etc.) and may be a static value or a dynamic value that is adjusted using a machine-learning ranking model that receives feedback data as input.

In addition to selecting a subset of X cards to communicate to the client card library 112 and/or the card client 114, the device agent 108 may further generate presentation order data based on associated ranking metrics of the cards. The presentation order data may specify an order in which the cards are to be presented via the UI 116 of the card client 114. In other example embodiments, the device agent 108 may transmit all of the cards 104 determined to be contextually relevant, and the client card library 112 or the card client 114 may determine which cards to present and an order in which the cards are to be presented. In certain example embodiments, the presentation order data may be the ranking data, while in other example embodiments, the presentation order data may be generated from the ranking data.

FIG. 1 depicts various example cards that may be presented via the UI 116 of the card client 114. The card client 114 may be, for example, a right panel 122 of the user device 118 that may be accessed via a gesture such as a swipe or swivel. The appropriate user gesture may cause the right panel 122 to appear as an overlay over the home screen image or another image associated with, for example, a foreground application. One or more home screen icons 120 may remain visible even after the right panel 122 is accessed. Card content 124 of an example weather-related card and card content 126 of an example meal-reminder card are illustratively shown in FIG. 1. The card content 124 and/or the card content 126 may be displayed in accordance with templates from which the corresponding cards are generated. The card content 126 for the meal-reminder card may include, for example, a map image 128 displaying a proposed route from a current location to a restaurant as well as one or more selectable widgets 130 that may cause various actions to be triggered responsive to selection such as, for example, initiation of turn-by-turn directions or generation of an e-mail message to attendees. Any other portions of the card content 124 and/or the card content 126 may also be selectable. For example, the map image 128 may be selectable, and if selected, may launch a maps application. As another example, any portion of the card content 124 may be selectable, and if selected, may launch a weather application on the user device 118, redirect the user to a web resource (e.g., a weather-related website), or the like.

It should be appreciated that the right panel 122 (or other card clients) may be accessed from user interfaces other than the home screen such as, for example, from another, foreground application executing on the device. Further, the card content that is displayed may be prioritized or de-prioritized based on the content of the foreground application. For example, rankings of travel-related cards may be increased if the foreground application is a maps application.

Illustrative Architecture

Figure 2A:
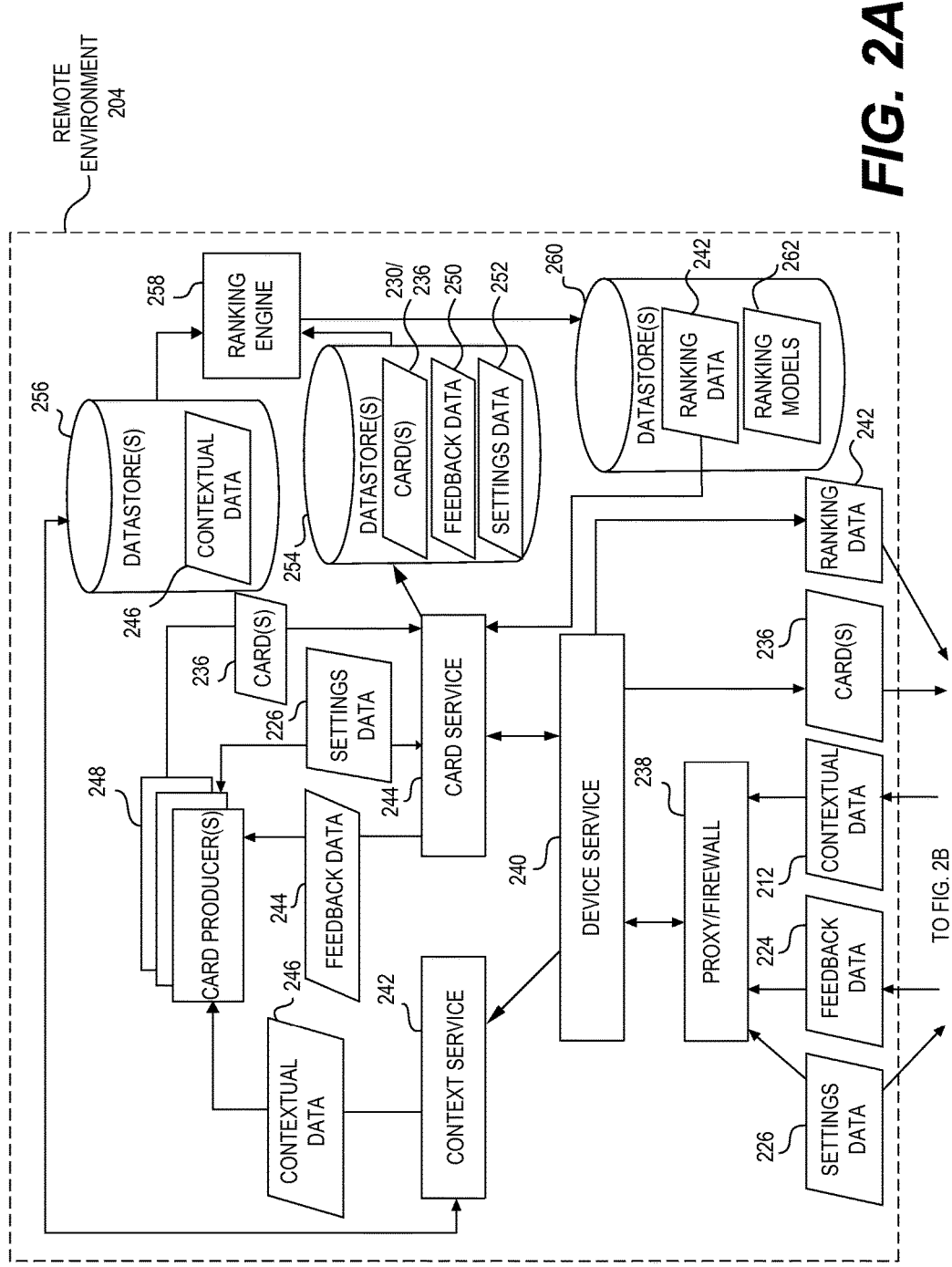
FIGS. 2A-2B are hybrid system architecture and data flow diagrams in accordance with one or more example embodiments of the disclosure.
Figure 2B:
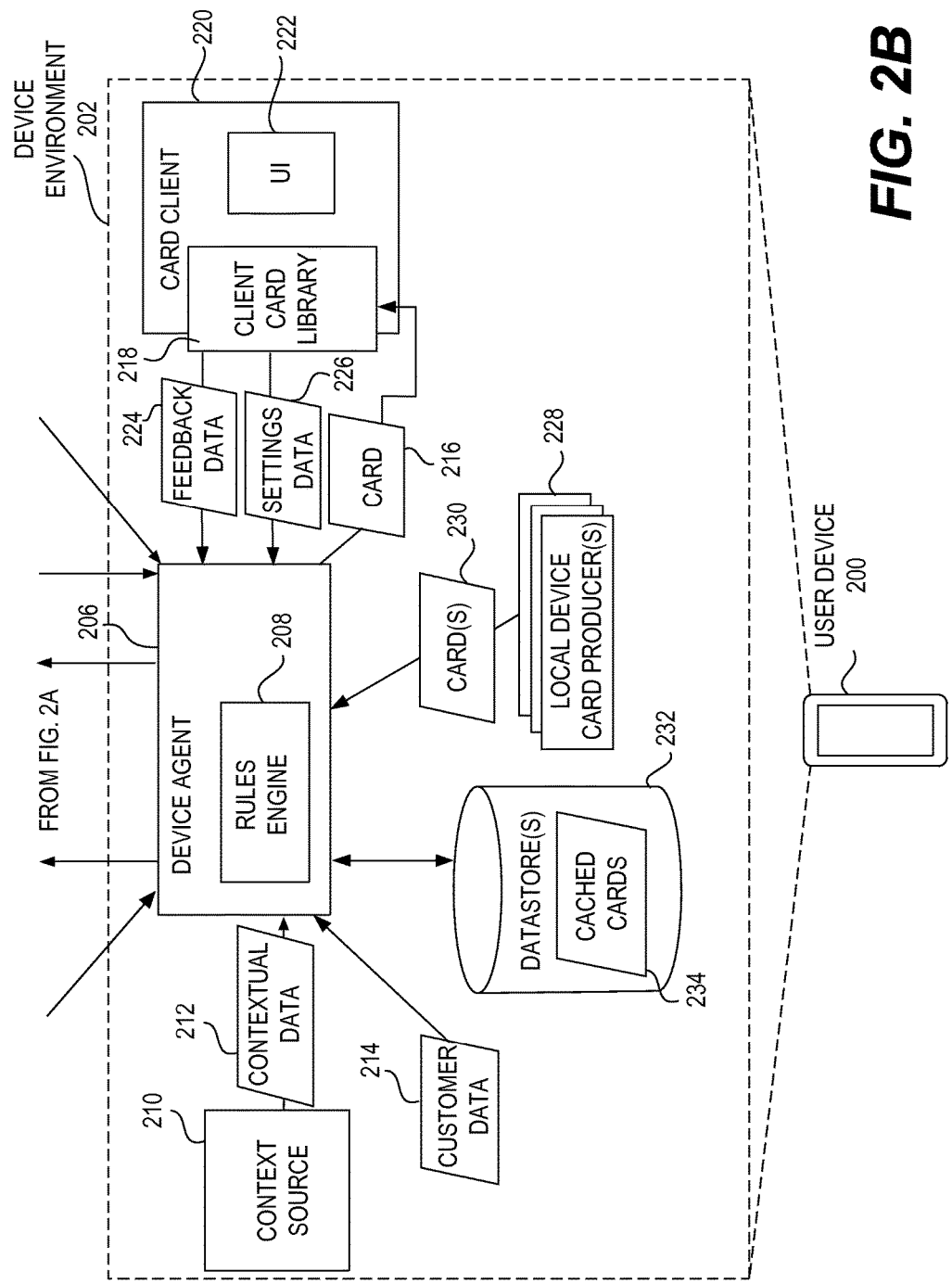

FIGS. 2A-2B are hybrid system architecture and data flow diagrams in accordance with one or more example embodiments of the disclosure. FIG. 2A depicts a remote environment 204 and FIG. 2B depicts a device environment 202. The device environment 202 may include one or more hardware, software, and/or firmware components of a user device 200. For example, the device environment 202 may include data storage components, processing components, applications, services, or the like.

In an illustrative configuration, the device environment 200 may include a device agent 206 that includes a rules engine 208. In one or more example embodiments, the device agent 206 and the rules engine 208 may correspond to the device agent 108 and the rules engine 110 depicted in FIG. 1. The device agent 206 may receive contextual data 212 from a context source 210. The context source 210 may be, for example, a location-based service configured to determine a position of the user device 200 using any suitable positioning technology such as, for example, the Global Positioning System (GPS) or another Global Navigation Satellite System (GNSS), Wi-Fi based indoor positioning, hybrid positioning systems such as Assisted GPS, or any other technology involving multilateration of radio signals between radio towers of a network and the user device 200. The context source 210 may further include a PIM application that provides contextual data 212 including device calendar data, messaging data, or the like. The context source 210 may also include one or more sensors of the user device 200 such as biometric sensors, inertial sensors, gyroscopes, and so forth that may provide contextual data 212 in the form of acceleration data, user speed data, user biometric data, or the like.

In addition to the contextual data 212, the device agent 206 may also receive customer data 214. The customer data 214 may include, for example, search/browsing history data indicating previous search or browsing activity of the user, purchase history data indicating previous items/services purchased by the user, content consumption data indicating previous content consumed on the user device or another device associated with the user, and so forth. Although not depicted in FIG. 2, the device agent 206 may communicate the customer data 214 to a device service 240 of the remote environment, potentially via a proxy service or firewall 244. The device service 240 may, in turn, communicate the customer data 214 to one or more card producers 248 via a card service 244 of the remote environment 204. The card producer(s) 248 may utilize the customer data 214, potentially in conjunction with various other types of data described herein, to generate cards with card content that relates to the preferences, tastes, or the like of particular users (e.g., to personalize card content).

The device agent 206 may receive cards 230 from one or more local card producers 228. The local card producer(s) 228 may include, for example, a communication application of the user device 200 such as an SMS application, an email application, a voice calling application, or the like. The device agent 206 may also receive cards 236 from one or more remote card producers 248. Once generated, the remote card producers 248 may push the cards to the card service 244 using a corresponding API, and the card service 244 may transmit the cards 236 to the device agent 208 via the device service 240. Upon receipt of the cards 230/236, the device agent 208 may store the cards 230/236 as cached cards 234 in one or more datastores 232.

The contextual data 212 received by the device agent 206 may include data indicating a change in a current use context of the device 200. A change in the current use context of the device 200 may include a change to one or more use characteristics of the device 200 such as, for example, a change in a user activity or mode, a change in location in relation to a known location, a change in a current location by a predetermined distance, or any of the other use context changes described earlier.

The device agent 206 may communicate the contextual data 212 to the device service 240, potentially via the proxy service or firewall 238. The device agent 206 may communicate the contextual data 212 to the device service 240 at periodic intervals or upon receipt of the contextual data 212 such as, for example, in those example embodiments in which the contextual data 212 indicates a change to a current use context of the device 200. The device service 240 may, in turn, communicate the contextual data 212 to a context service 242 which may push the contextual data 212 to one or more card producers 248.

In particular, the context service 242 may push event notifications to a card producer 248 responsive to receipt of contextual data 212 that indicates a change in a use context of the device 200 that is relevant to one or more cards generated by that card producer 248. The event notification may include an indication of the device from which the contextual data was received and an indication of the nature of the changed context (e.g., an indication that the device passed a geo-fence associated with a work location at a time of day that corresponds to when the user typically starts his/her daily commute home). In certain example embodiments, the context service 242 may broadcast messages comprising the contextual data 212, and card producers 248 listening for the messages may retrieve the contextual data 212 from the broadcast. A card producer 248 may determine that a broadcasted message contains contextual data that is relevant to one or more cards generated by the card producer based, for example, on the presence of a customer identifier, device identifier, and/or card identifier included in the broadcasted message.

In certain example embodiments, a card producer 248 may also query the context service 242 for contextual data. The context service 242 may respond to the query by providing contextual data 246. The contextual data 246 may include the contextual data 212 indicating a current use context of the device 200 or a change to the use context of the device 200. Alternatively, or additionally, the contextual data 246 may include historical contextual data that provides various context metrics over a period of time of use of the device 200. The historical contextual data may include, for example, a percentage of time spent at a particular known location over some period of time; a number of times a particular known location was visited over some period of time; an average time of day or an average time range during which the user of the user device engaged in a particular activity; an average time of day or an average time range during which the user consumed content on the user device; a breakdown of the types of content consumed over some period of time; and so forth. The contextual data 246 may further include predictive contextual data that indicates a predicted future use context for the device 200. For example, the context service 242 may process historical contextual data to make predictions about future use context of the device. For example, if the user typically eats lunch at an off-peak time such as 2 PM, the historical contextual data received from the user device 200 may indicate this, and the context service 242 may generate predictive contextual data that indicates a likelihood that the user will continue to take lunch around 2 PM. In certain example embodiments, any one or a combination of the predictive contextual data, the historical contextual data, or the current contextual data 212 may be expressed as a probabilistic value. For example, the predictive contextual data may indicate an 80% likelihood that the user will continue to take lunch around 2 PM. Similarly, if a card producer queries the context service 242 for a current activity of the user, the context service 242 may respond to the query with an indication that there is a 60% percent chance that the true state of the user is "walking." It should be appreciated that the above examples of probabilistic contextual values are merely illustrative and not exhaustive.

As previously described, a card producer 248 may generate a card intended for a particular user based at least in part on at least a portion of the contextual data 246. While FIG. 1 depicts example data flows involving a particular user device 200 and a particular user, it should be appreciated that the context service 242 may receive the contextual 246 data from any number of user devices and may respond to queries from card producers for contextual data relating to any number of users. Upon generating a card object, a card producer 248 may call an API associated with the card service 244 to push the card object 236 to the card service 244. The card service 244 may then transmit the card object 236 to the device service 240 which may, in turn, transmit the card object to the device agent 206.

Upon receipt of a card object (which may be a card 230 produced locally on the user device 200 or a card 236 received from a remote card producer), the device agent 206 may determine whether current contextual data 212 satisfies one or more constraints specified in a card metadata of the card object. As previously described, the device agent 206 may leverage the rules engine 208 to determine whether the constraints are satisfied. If the card constraints are satisfied, the device agent 206 may transmit the card 216 to a client card library 218 that may cause card content of the card object 216 to be rendered in a UI 222 of a card client 220. The client card library 218 may be a thin client library that loads card objects, renders card content of the card objects, and handles user input events such as, for example, user selections of selectable portions of the card content. In certain example embodiments, the client card library 218 may not be provided as part of the device environment 202. Rather, the device agent 206 may transmit a card object 216 directly to a card client for rendering of card content of the card object 216. The card client 220 may an application that supports other functionality in addition to presenting card content or may be a dedicated application that specifically supports card content presentation. Further, in certain example embodiments, the card content may not be rendered in a user interface of the card client 220, but rather, the card client 220 may utilize the card content to identity or generate other content for presentation to the user. For example, the card client 220 may identify a targeted advertisement based at least in part on the card content and present the targeted advertisement to the user.

In certain example embodiments, the device agent 206 may receive a card object 230/236 that was generated in response to contextual data indicating a change in a current use context of the device 200. In such example embodiments, as long as the current context of the device 200 has not changed from the time when the card producer was informed of the change in use context of the device 200 and the time when the corresponding card 230/236 is received, the device agent 206 may determine that any constraints associated with the card are satisfied and may transmit the card for presentation in the UI 222 of the card client 220. On the hand other, in certain example embodiments, while the card may be tailored to the new device context 200 resulting from the change in device context, the card may nonetheless specify additional constraints that need not be related to the change in device context and which need to be met in order to present card content of the card. Accordingly, the device 200 may leverage the rules engine 208 to determine whether such additional constraints are satisfied before delivering the card for presentation by the card client 220. As previously noted, a card producer 248 may generate multiple instances of a card object, each instance specifying different constraints (e.g., different contextual conditions) that may need to be met before the associated card content can be presented. Accordingly, the device agent 206 may determine which, if any, of the constraints are met to identify the appropriate card instance to transmit for presentation.

A card presented by the card client 220 may include various selectable elements. The card metadata of the card may specify various actions to be taken responsive to selection of various selectable elements. For example, card metadata associated with a traffic-related card may specify that tapping on the card (or otherwise interacting with a portion of the card content) may cause a navigation application to be launched. In addition, various selectable links (e.g., hyperlinks) may be displayed as part of the content of the card. Selection of a hyperlink may direct a browser application of the user device 200 to a web resource containing content that may be related to the card content. In certain example embodiments, selection of a link may cause another card to be displayed via the UI 222 of the card client 220 or via a UI of another card client. The additional card that is displayed may have been generated by the same card producer or a different card producer, and may be linked to the card containing the selected link via linked data included in the card metadata of each card.

Various feedback data 224 may be collected by the card client 220 (or the client card library 218) in connection with card content that is being presented. The feedback data 224 may indicate one or more user interactions with the card content. For example, the feedback data 224 may indicate a number of times the card content is presented, an amount of time the card content was presented by the card client 220, whether the card was dismissed (e.g., swiped away), an amount of time that elapsed between presentation of the card content and dismissal of the card, head tracking data gathered by image sensors of the device 200 that may indicate an amount of time that a user consumed the card content, a number of selectable elements of the card content that the user selected, and so forth. The feedback data 224 may further include data that may provide a more direct assessment of the user's sentiment towards the card content. For example, the card itself (or the card client 220 or the client card library 218) may provide a user with the capability to rate or review the card content.

The feedback data 224 may be communicated to the device agent 206, which may, in turn, communicate the feedback data 224 to the device service 240, potentially via the proxy service or firewall 238. The device service 240 may communicate the feedback data 224 to the card service 244 which may store the feedback data 224 in one or more datastores 254 as at least a portion of aggregate feedback data 250 for multiple cards presented to multiple users and transmit a notification to a card producer 248 of the card to which the feedback data 224 relates. The notification may include the feedback data 224 and a card identifier to identify the card to which the feedback data 224 relates. The card producer 248 may receive the feedback data 224 via a feedback API exposed by the card service 244 to card producers 248. The feedback data 250 may include the feedback data 224 as well as feedback data associated with other cards and/or feedback data associated with one or more cards displayed on other user devices. In certain example embodiments, a card producer 248 may query the card service 244 for at least a portion of the feedback data 250 representative of a feedback history for a card and may perform batch or offline processing on the feedback history data to identify updated/new card content.

More specifically, a card producer 248 may utilize feedback data to update content of a card with the goal of increasing positive user sentiment towards the card content. For example, if the feedback data 224 indicates that the user dismissed the card 216 after a short period of time, the producer 248 may update the card content to increase the extent to which the card 216 is personalized to the user and/or to increase the contextual relevance of the card 216 to the user. For example, the card producer 248 may utilize the feedback data 224 and the contextual data 246 (e.g., current contextual data 212, historical contextual data, predictive contextual data, etc.) to generate updated card content having a potentially increased contextual relevance to the user. Additionally, or alternatively, the card producer 248 may receive the customer data 214 for the user from the device agent 206 via, for example, the device service 240, the context service 242, and/or the card service 244, and may utilize the customer data 214 and the feedback data 244 to generate updated card content that is more personalized to the user to whom the card 216 was presented. The card producer 248 may generate a card with updated card content that may include the same card identifier as the card 216 with the existing content (but perhaps a new instance identifier), in which case, the existing content may be replaced with updated card content in the card 216. In certain other example embodiments, the card producer 248 may generate a new card that may include a new card identifier, in which case, the existing card 216 (as well as any other existing cards having the same card identifier) may be deleted.

In addition to the contextual data 246, feedback data 244, and/or the customer data 214, a card producer 248 may utilize settings data 226 to improve the personalization and/or contextual relevance of the card 216 to the user. For example, the user may be provided with a capability to specify various values reflected in the settings data 226. For example, the settings data 226 may indicate a desired language; a desired unit system (e.g., metric vs. English system); desired activities, interests, content, or the like; a desired ordering of card types, and so forth. In certain example embodiments, default settings may be used if the user has not specified settings values. For example, if the registered address of a device is in Sunnyvale, Calif., the user's favorite sports teams may default to the 49ers and the Giants.

The device agent 206 may receive the settings data 226 from the client card library 218 and/or the card client 220, and may transmit the settings data 226, potentially via the proxy service or firewall 238, to the card service 244. The card service 244 may, in turn, store the settings data 226 as at least a portion of settings data 252. The settings data 252 may also include settings data pertaining to one or more other user devices. In addition, the card service 244 may transmit the settings data 226 to a card producer 248 that produces cards intended for the user (e.g., card 216) to permit the card producer 248 to utilize the settings data 226 to improve the personalization of the card content of the cards generated for the user.

In certain example embodiments, the card metadata for the card 216 may include a score generated by the card producer 248 that reflects a perceived degree of contextual relevance and/or personalization of the card content to a user. The card producer 248 may update the score assigned to the card 216 based on the feedback data 244. The card delivery management platform may also generate a platform score of the card 216 based on the producer-generated score and, potentially, a priority indicator assigned to the card. The card delivery management platform may utilize the feedback data to update a platform score for a card. The platform score and contextual data 246 may then be used to generate a ranking for the card 216. For example, the card delivery management platform may include a ranking engine 258 that accesses a ranking model 262 from one or more datastores 260, and applies the ranking model 262 to the platform score and at least a portion of the contextual data 246 to generate a ranking for the card 216. The ranking associated with the card 216 may be updated based on the feedback data 224. It should be appreciated that any number of other forms of data (e.g., the settings data 226, the contextual data 246, the customer data 214, etc.) may be provided as input to the ranking model 262 to generate or update the ranking for the card 216. The ranking generated for the card 216 may be stored as at least a portion of ranking data 242 in the datastore(s) 260.

The score and/or the ranking may determine whether the card 216 is to be presented by the card client 220 and/or an order in which the card 216 is to be presented in the UI 222 of the card client 220 in relation to other cards that are displayed or intended for display. The ranking data 242 may include score(s) and/or a ranking for the card 216, as well as, scores and/or rankings for one or more other cards. The ranking data 242 may further include one or more thresholds against which the ranking data 242 may be compared to determine whether and/or in what order the card 216 is to be presented by the card client 220. The card service 244 may access the ranking data 242 from the datastore(s) 260 and communicate the ranking data 242 to the device service 240 which may, in turn, transmit the ranking data 242 to the device agent 206. The device agent 206 may evaluate the ranking data 242 to determine whether the card 216 has a suitably high score and/or ranking to be selected for transmission to and presentation in the UI 22 of the card client 220. This evaluation may include selecting the N cards with the highest scores, rankings, or some combination thereof. Alternatively, this evaluation may include determining whether a score, ranking, or combination thereof for the card 216 meets or exceeds a threshold for delivering the card 216 to the card client 220. If the device agent 206 determines that the card 216 is to be delivered to the card client 220, the device agent 206 may, in certain example embodiments, further generate presentation order data that indicates an order in which the card content of the card 216 is to be presented with respect to one or more other cards. The device agent 206 may provide the presentation order data in association with the card 216. Alternatively, or additionally, the client card library 218 and/or the card client 220 may independently determine the presentation order.

An example device environment 202 and remote environment 204 have been depicted and described with respect to FIGS. 2A-2B. It should be appreciated, however, that numerous variations to the illustrative environments depicted in FIGS. 2A-2B are within the scope of this disclosure. Further, FIGS. 2A-2B merely depict example environments in accordance with one or more example embodiments of the disclosure. It should be appreciated that the environments depicted in FIGS. 2A-2B are applicable to a wide range of additional device and/or remote environments.

Figure 3:
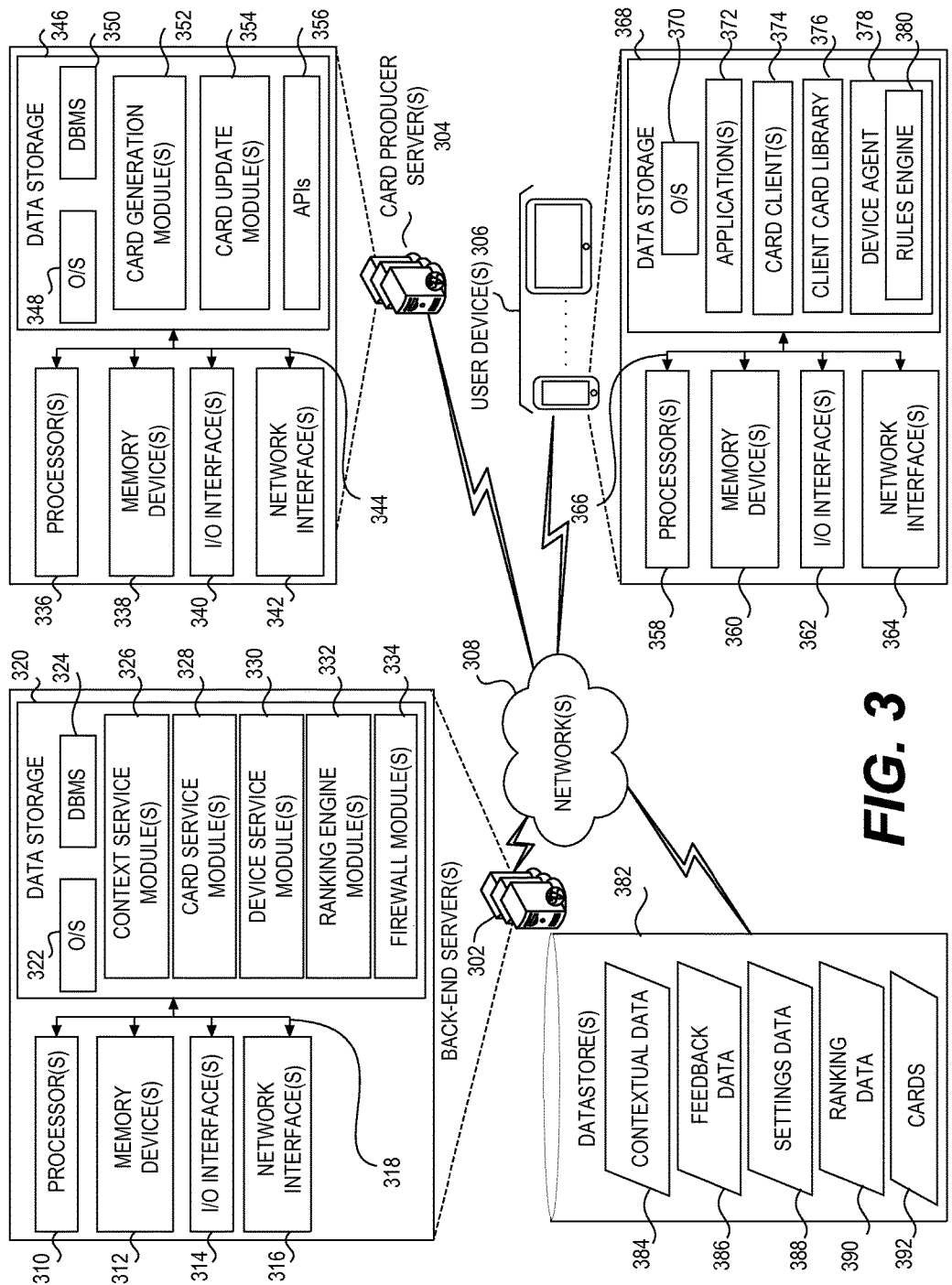
FIG. 3 is a schematic block diagram of an illustrative networked architecture in accordance with one or more example embodiments of the disclosure.

FIG. 3 is a schematic block diagram of an illustrative networked architecture 300 in accordance with one or more example embodiments of the disclosure. The networked architecture 300 may include one or more back-end servers 302, one or more card producer servers 304, and one or more user devices 306. The device service 240, the context service 242, and/or the card service 244 may be configured to execute on one or more of the back-end servers 302. Further, other components of the card delivery management platform (e.g., the proxy/firewall 238, the ranking engine 258, etc.) may be executable on one or more back-end servers 302. While the back-end server(s) 302, the card producer server(s) 304, and/or the user device(s) 306 may be referred to herein in the singular, it should be appreciated that multiple ones of any of the illustrative components of the networked architecture 300 may be provided, and any processing described as being performed by a particular component of the architecture 300 may be performed in a distributed manner by multiple such components.

The back-end server 302, the card producer server 304, and/or the user device 306 may be configured to communicate via one or more networks 308. The network(s) 308 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 308 may have any suitable communication range associated therewith and may include, for example, global networks (e.g., the Internet), metropolitan area networks (MANs), wide area networks (WANs), local area networks (LANs), or personal area networks (PANs). In addition, the network(s) 308 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the back-end server 302 may include one or more processors (processor(s)) 310, one or more memory devices 312 (generically referred to herein as memory 312), one or more input/output ("I/O") interface(s) 314, one or more network interfaces 316, and data storage 320. The back-end server 302 may further include one or more buses 318 that functionally couple various components of the server 302. These various components of the server 302 will be described in more detail hereinafter.

The bus(es) 318 may include at least one of a system bus, a memory bus, an address bus, or a message bus, and may permit exchange of information (e.g., data (including computer-executable code), signaling, etc.) between various components of the server 302. The bus(es) may include, without limitation, a memory bus or a memory controller, a peripheral bus, an accelerated graphics port, and so forth. The bus(es) 318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 312 of the server 302 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 312 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 312 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 320 may include removable storage and/or non-removable storage including, but not limited to, magnetic storage, optical disk storage, and/or tape storage. The data storage 320 may provide non-volatile storage of computer-executable instructions and other data. The memory 312 and the data storage 320, removable and/or non-removable, are examples of computer-readable storage media (CRSM) as that term is used herein.

The data storage 320 may store computer-executable code, instructions, or the like that may be loadable into the memory 312 and executable by the processor(s) 310 to cause the processor(s) 310 to perform or initiate various operations. The data storage 320 may additionally store data that may be copied to memory 312 for use by the processor(s) 310 during the execution of the computer-executable instructions. Moreover, output data generated as a result of execution of the computer-executable instructions by the processor(s) 310 may be stored initially in memory 312, and may ultimately be copied to data storage 320 for non-volatile storage.

More specifically, the data storage 320 may store one or more operating systems (O/S) 322; one or more database management systems (DBMS) 324; and one or more program modules, applications, or the like such as, for example, one or more context service module(s) 326, one or more card service module(s) 328, one or more device service module(s) 330, one or more ranking engine module(s) 332, and proxy/firewall module(s) 334. Any of the program modules may include one or more sub-modules. In addition, the data storage 320 may store various other types of data such as, for example, any of the data stored in the datastore(s) 382. Any of the modules depicted in FIG. 3 may include computer-executable code, instructions, or the like that may be loaded into the memory 312 for execution by one or more of the processor(s) 310. Further, any data stored in the data storage 320 may be loaded into the memory 312 for use by the processor(s) 310 in executing computer-executable code. In addition, any data stored in the datastore(s) 382 may be accessed via the DBMS 324 and loaded in the memory 312 for use by the processor(s) 310 in executing computer-executable code.

The processor(s) 310 may be configured to access the memory 312 and execute computer-executable instructions loaded therein. For example, the processor(s) 310 may be configured to execute computer-executable instructions of the various program modules of the server 302 to cause or facilitate various operations to be performed in accordance with one or more embodiments of the disclosure. The processor(s) 310 may include any suitable processing unit capable of accepting data as input, processing the input data in accordance with stored computer-executable instructions, and generating output data. The processor(s) 310 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 310 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 310 may be capable of supporting any of a variety of instruction sets.

Referring now to functionality supported by the various program modules of the server 302 depicted in FIG. 2, the context service module(s) 326 may form part of the context service 242 and may support any of the functionality described as being provided by the context service 242. The context service module(s) 326 may include computer-executable instructions, code, or the like that responsive to execution by one or more of the processor(s) 310 may cause operations to be performed including, without limitation, receiving contextual data and generating event notifications for notifying card producers of the contextual data, generating predictive contextual data, providing card producers with current, historical, or predictive contextual data in response to received queries, and so forth.

The card service module(s) 328 may form part of the card service 244 and may support any of the functionality described as being provided by the card service 244. The card service module(s) 328 may include computer-executable instructions, code, or the like that responsive to execution by one or more of the processor(s) 310 may cause operations to be performed including, without limitation, receiving cards from card producers and transmitting the cards to a device agent for ultimate presentation by a card client; receiving various types of data (e.g., settings data, feedback data, customer data, etc.) from a device agent and transmitting the data to a card producer; transmitting ranking data to a device agent, responding to queries from card producers for feedback data, settings data, and/or customer data; and so forth.

The device service module(s) 330 may form part of the device service 240 and may support any of the functionality described as being provided by the device service 240. The device service module(s) 330 may include computer-executable instructions, code, or the like that responsive to execution by one or more of the processor(s) 310 may cause operations to be performed including, without limitation, serving as a point of communication for a device agent with a remote environment of a card delivery management platform by relaying data to/from the device agent and various other components/services of the remote environment.

The ranking engine module(s) 332 may form part of the ranking engine 258 and may support any of the functionality described as being provided by the ranking engine 258. The ranking engine module(s) 332 may include computer-executable instructions, code, or the like that responsive to execution by one or more of the processor(s) 310 may cause operations to be performed including, without limitation, applying one or more ranking models to generate ranking data including scores and/or rankings of one or more cards.

The proxy/firewall module(s) 334 may form part of the proxy/firewall 238 and may support any of the functionality described as being provided by the proxy/firewall 238. The proxy/firewall module(s) 334 may include computer-executable instructions, code, or the like that responsive to execution by one or more of the processor(s) 310 may cause operations to be performed including, without limitation, providing proxy/firewall services for receipt of data from a device agent and transmission of data to the device agent.

Referring now to other illustrative components depicted as being stored in the data storage 320, the O/S 322 may be loaded from the data storage 320 into the memory 312 and may provide an interface between other application software executing on the server 302 and hardware resources of the server 302. More specifically, the O/S 322 may include a set of computer-executable instructions for managing hardware resources of the server 302 and for providing common services to other application programs (e.g., managing memory allocation among various application programs). The O/S 322 may include any operating system now known or which may be developed in the future including, but not limited to, any server operating system, any mainframe operating system, or any other proprietary or non-proprietary operating system.

The DBMS 324 may be loaded into the memory 314 and may support functionality for accessing, retrieving, storing, and/or manipulating data stored in the memory 312 and/or data stored in the data storage 320. The DBMS 324 may use any of a variety of database models (e.g., relational model, object model, etc.) and may support any of a variety of query languages. The DBMS 324 may access data represented in one or more data schemas and stored in any suitable data repository such as any of the datastore(s) 382. The datastores(s) 382 may include any of the datastores depicted in FIGS. 2A-2B and the contextual data 384, feedback data 386, settings data 388, ranking data 390, and cards 392 may include any of the corresponding data described with reference to FIGS. 2A-2B. The datastore(s) 382 may include, without limitation, databases (e.g., relational, object-oriented, etc.), file systems, flat files, distributed datastores in which data is stored on more than one node of a computer network, peer-to-peer network datastores, or the like.

Referring now to other illustrative components of the server 302, one or more input/output (I/O) interfaces 314 may be provided that may facilitate the receipt of input information by the server 302 from one or more I/O devices as well as the output of information from the server 302 to the one or more I/O devices. The I/O devices may include, for example, one or more user interface devices that facilitate interaction between a user and the server 302 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 302 may further include one or more network interfaces 316 via which the server 302 may communicate with any of a variety of other systems, platforms, networks, devices, and so forth. Such communication may occur via any of one or more of the network(s) 308.

Referring now to other illustrative components of the networked architecture 300, in an illustrative configuration, the card producer server 304 may include one or more processors (processor(s)) 336, one or more memory devices 338 (generically referred to herein as memory 338), one or more input/output ("I/O") interface(s) 340, one or more network interfaces 342, and data storage 344. The card producer server 304 may further include one or more buses 344 that functionally couple various components of the server 304. The bus(es) 344 of the card producer server 304 may include any of the example buses and bus architectures described with reference to the server 302. Similarly, the processor(s) 336 may include any of the example types of processors described with reference to the processor(s) 310, the memory 338 may include any of the example types of memory described with reference to the memory 312, the I/O interface(s) 340 may include any of the example types of I/O interfaces described with reference to the I/O interface(s) 314, and the network interface(s) 342 may include any of the example types of network interface(s) described with reference to the network interface(s) 316.

The data storage 346 may include any of the example types of data storage described with reference to the data storage 320. The data storage 346 may store computer-executable code, instructions, or the like that may be loadable into the memory 338 and executable by the processor(s) 336 to cause the processor(s) 336 to perform or initiate various operations. The data storage 346 may additionally store data that may be copied to memory 338 for use by the processor(s) 336 during the execution of the computer-executable instructions. Moreover, output data generated as a result of execution of the computer-executable instructions by the processor(s) 336 may be stored initially in memory 338, and may ultimately be copied to data storage 346 for non-volatile storage.

More specifically, the data storage 346 may store one or more operating systems (O/S) 348; one or more database management systems (DBMS) 350; and one or more program modules, applications, or the like including one or more card generation modules 350, one or more card update modules 354, and one or more APIs 356. The O/S 348 may include any of the example types of operating systems and may support any of the example functionality described with reference to the O/S 322. Similarly, the DBMS 350 may include any of the example types of database management systems and may support any of the example functionality described with reference to the DBMS 324. Any of the program modules may include computer-executable code, instructions, or the like that may be loaded into the memory 338 for execution by one or more of the processor(s) 336. Further, data stored in the data storage 346 may be loaded into the memory 338 for use by the processor(s) 336 in executing computer-executable code.

Referring now to functionality supported by the various program modules over the server 304 depicted in FIG. 2, the card generation module(s) 352 may include computer-executable instructions, code, or the like that responsive to execution by one or more of the processor(s) 336 may cause operations to be performed including, without limitation, generating, based at least in part on the contextual data 384 and/or the settings data 388, cards 392 that are personalized to the tastes/preferences of a user and contextually relevant to a current, historical, or future use context of a user device 306.

The card update module(s) 354 may include computer-executable instructions, code, or the like that responsive to execution by one or more of the processor(s) 336 may cause operations to be performed including, without limitation, generating new cards or updated cards with updated card content having an increased degree of personalization and/or an increased contextual relevance based at least in part on the feedback data 386 and at least one of the contextual data 384 or the settings data 388.

The APIs 356 may include computer-executable instructions, code, or the like that responsive to execution by one or more of the processor(s) 336 may cause operations to be performed including, without limitation, querying the context service module(s) 326 for the contextual data 384, querying the card device module(s) 328 for the feedback data 386 and/or the settings data 388, pushing new cards or updated cards 392 to the device service module(s) 330, and so forth.

Referring now to other illustrative components of the server 304, one or more input/output (I/O) interfaces 340 may be provided that may facilitate the receipt of input information by the server 304 from one or more I/O devices as well as the output of information from the server 304 to the one or more I/O devices. The I/O devices may include, for example, one or more user interface devices that facilitate interaction between a user and the server 304 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The server 304 may further include one or more network interfaces 342 via which the server 304 may communicate with any of a variety of other systems, platforms, networks, devices, and so forth. Such communication may occur via any of one or more of the network(s) 308.

Referring now to other illustrative components of the networked architecture 300, in an illustrative configuration, the user device 306 may include one or more processors (processor(s)) 358, one or more memory devices 360 (generically referred to herein as memory 360), one or more input/output ("I/O") interface(s) 362, one or more network interfaces 364, and data storage 368. The user device 306 may further include one or more buses 366 that functionally couple various components of the user device 306. The bus(es) 366 of the user device 306 may include any of the example buses and bus architectures described with reference to the server 302 or the server 304. Similarly, the processor(s) 358 may include any of the example types of processors described with reference to the processor(s) 310 or the processor(s) 336, the memory 360 may include any of the example types of memory described with reference to the memory 312 or the memory 338, the I/O interface(s) 362 may include any of the example types of I/O interfaces described with reference to the I/O interface(s) 314 or the I/O interface(s) 340, and the network interface(s) 364 may include any of the example types of network interface(s) described with reference to the network interface(s) 316 or the network interface(s) 342.

The data storage 368 may include any of the example types of data storage described with reference to the data storage 320 or the data storage 346. The data storage 368 may store computer-executable code, instructions, or the like that may be loadable into the memory 360 and executable by the processor(s) 358 to cause the processor(s) 358 to perform or initiate various operations. The data storage 368 may additionally store data that may be copied to memory 360 for use by the processor(s) 358 during the execution of the computer-executable instructions. Moreover, output data generated as a result of execution of the computer-executable instructions by the processor(s) 358 may be stored initially in memory 360, and may ultimately be copied to data storage 368 for non-volatile storage.

More specifically, the data storage 368 may store one or more operating systems (O/S) 370; and one or more program modules, applications, or the like including one or more applications 372, one or more card clients 374, a client card library 376, a device agent 378, and a rules engine 380. In one or more example embodiments, the application(s) 372 may include any of a variety of applications executable on the device 306. The card client(s) 374 may include any suitable card client such as, for example, the card client 114 or the card client 220. Further, in one or more example embodiments of the disclosure, the client card library 376, the device agent 378, and the rules engine 380 may correspond to the client card library 218, the device agent 206, and the rules engine 208, respectively. Any of the program modules, applications, or the like may include computer-executable code, instructions, or the like that may be loaded into the memory 360 for execution by one or more of the processor(s) 358. Further, data stored in the data storage 368 may be loaded into the memory 360 for use by the processor(s) 358 in executing computer-executable code. The O/S 370 may include any of the example types of operating systems and may support any of the example functionality described with reference to the O/S 322 or the O/S 348.

It should be appreciated that the program modules, applications, computer-executable instructions, code, or the like depicted in FIG. 3 as being stored in the data storage 320, the data storage 346, and/or the data storage 368 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 302, the server 304, or the user device 306 and/or hosted on other computing device(s) accessible via one or more of the network(s) 308, may be provided to support functionality provided by the program modules, applications, or computer-executable code depicted in FIG. 3 and/or additional or alternate functionality. Further, functionality may be modularized differently such that processing described as being supported collectively by the collection of program modules depicted in FIG. 3 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 3 may be implemented, at least partially, in hardware and/or firmware across any number of devices.

It should further be appreciated that the server 302, the server 304, and/or the user device 306 may include alternate and/or additional hardware, software, or firmware components beyond those described or depicted without departing from the scope of the disclosure. More particularly, it should be appreciated that software, firmware, or hardware components depicted as forming part of the server 302, the server 304, and/or the user device 306 are merely illustrative and that some components may not be present or additional components may be provided in various embodiments. While various illustrative program modules have been depicted and described as software modules stored in data storage 320, the data storage 346, and/or the data storage 368, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 4:
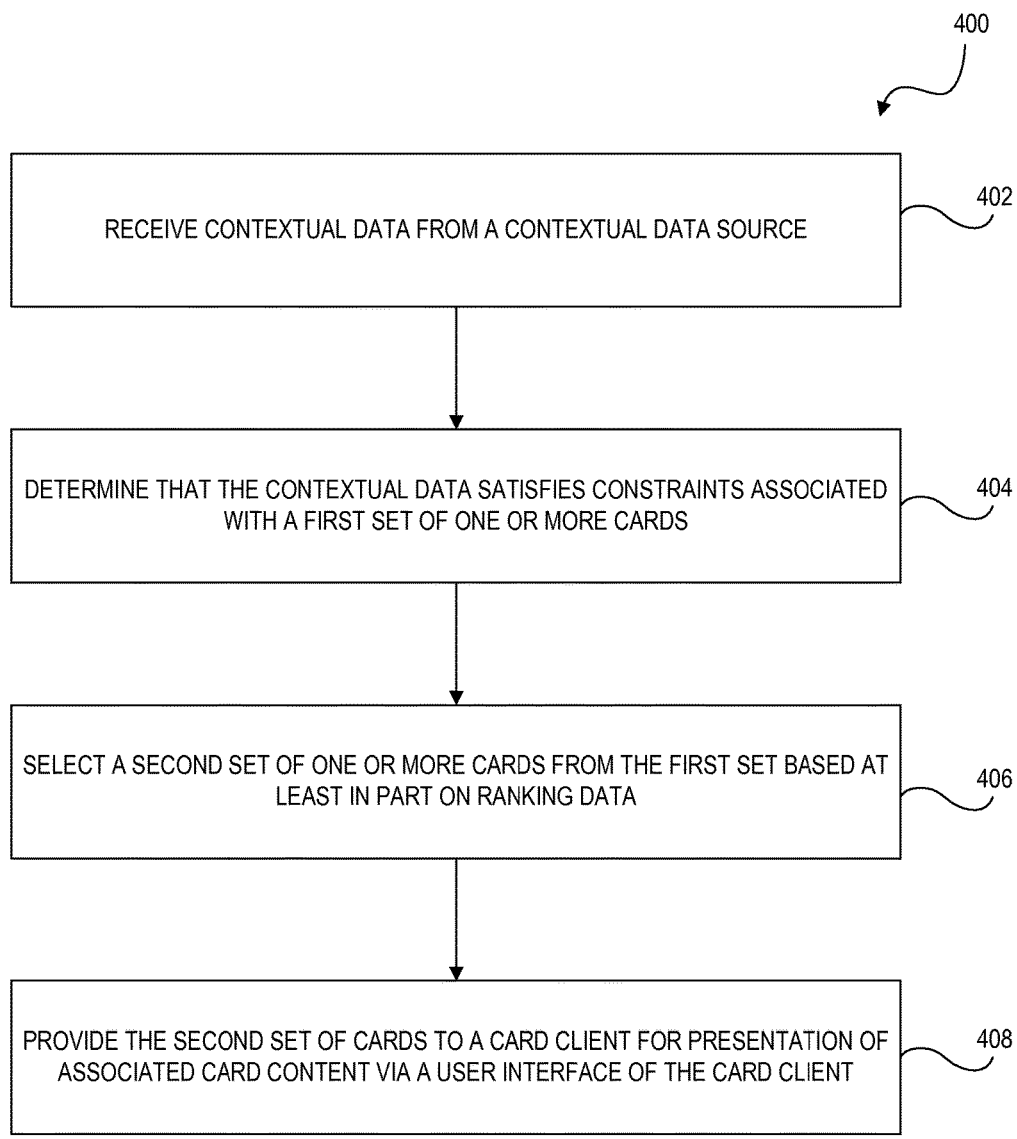
FIG. 4 is a process flow diagram of an illustrative method for selecting one or more cards for presentation via a user interface of a card client in accordance with one or more example embodiments of the disclosure.

FIG. 4 is a process flow diagram of an illustrative method 400 for selecting one or more cards for presentation via a user interface associated with a card client in accordance with one or more example embodiments of the disclosure.

At block 402, a device agent 378 may receive contextual data from a contextual data source. The contextual data may include data indicative of a current use context of a user device 306.

At block 404, the device agent 378 may leverage the rules engine 380 to analyze the contextual data to determine whether constraints associated with various cards are satisfied. Based on an analysis result of the rules engine 380, the device agent 378 may determine, at block 404, that the contextual data satisfies the constraints associated with a first set of one or more cards. As previously noted, the constraints may be specified in card metadata of the cards.

At block 406, the device agent 378 may select a second set of one or more cards from the first set based at least in part on ranking data. The ranking data may indicate scores, rankings, or the like associated with the various card(s) in the first set of cards. The ranking data may further indicate various threshold(s) against which the scores/rankings may be compared to determine which cards are to be selected for inclusion in a second set of one or more cards selected from the first set. The ranking data may further specify a selection methodology for selecting cards based on the ranking data. For example, the ranking data may specify that the first N cards having the highest ranking metrics (e.g., highest scores, rankings, or combinations thereof) are to be selected. As another example, the ranking data may specify that any card selected must have a score, ranking, or combination thereof that meets or exceeds a threshold value.

At block 408, the device agent 378 may provide the second set of cards to one or more card clients 374 for presentation of card content of the cards in user interface(s) of the card client(s) 374. In certain example embodiments, the device agent 378 may provide the second set of cards to the client card library 376 which may coordinate the rendering of the card content in the user interface of a card client.

Figure 5:
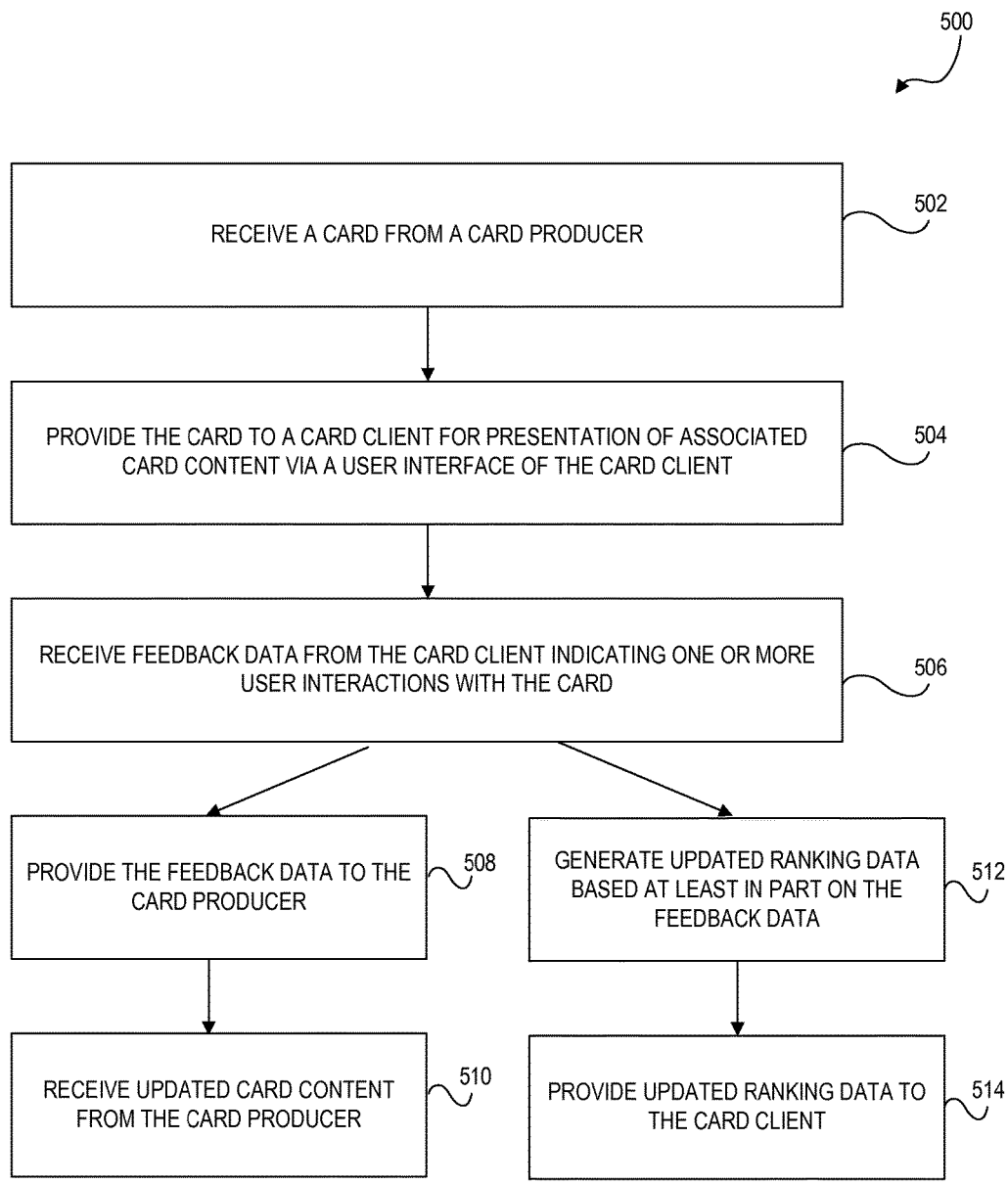
FIG. 5 is a process flow diagram of an illustrative method for receiving feedback data indicating user interaction with a card content, providing the feedback data to a card producer, and receiving updated card content from the card producer in accordance with one or more example embodiments of the disclosure.

FIG. 5 is a process flow diagram of an illustrative method 500 for receiving feedback data indicating user interaction with a card, providing the feedback data to a card producer, and receiving updated card content from the card producer in accordance with one or more example embodiments of the disclosure.

At block 502, the device agent 378 may receive a card from a card producer. The card may be received from a local card producer or from a remote card producer via the card service module(s) 328 and the device service module(s) 330.

At block 504, the device agent 378 may provide the card to a card client 374 for presentation of card content of the card in a user interface of the card client 374. In certain example embodiments, the device agent 378 may provide the card to the client card library 376 which may coordinate the rendering of the card content in the user interface of the card client 374

At block 506, the device agent 378 may receive feedback data from the card client 374 (potentially via the card client library 376) that indicates data relating to one or more user interactions with the card. The feedback data may indicate any of the metrics relating to possible user interactions with the card discussed earlier.

The feedback data received at block 506 may be provided to the card producer and/or may be used to update a ranking for the card. For example, at block 508, the device agent 378 may provide the feedback data to the card producer of the card. In particular, the device agent 378 may transmit the feedback data to the device service module(s) 330 which may, in turn, transmit the feedback data to the card service module(s) 328. The card service module(s) 328 may then transmit a notification message to the card producer that contains the feedback data. The card service module(s) 328 may also store the feedback data and provide it to the card producer in response to a query received from the card producer.

Upon receipt of the feedback data, the card producer may generate updated card content as part of a new card with a new card identifier or as part of an updated card that includes the same card identifier as the card for which the feedback data was received. At block 510, the device agent 378 may receive the new card or updated card containing the updated card content. In the case of a new card having updated card content and a new card identifier, the new card may replace the existing card. In the case of an updated card having updated card content but the same card identifier as the existing card, the existing card may continue to exist and the card content of the existing card may be changed so that the updated card content is presented. The device agent 378 may provide an instruction to the card client 374 to display the updated card content or the card client 374 may, upon receipt of the updated card content, independently determine that the updated card content is to replace the existing card content.

Additionally, or alternatively, the device agent 378 may utilize the feedback data to generate updated ranking data that may include an updated ranking for the card, and optionally, updated ranking(s) for one or more other cards at block 512. At block 514, the updated ranking data may be provided to the card client 374. It should be appreciated that in certain example embodiments, the device agent 378 may communicate the feedback data to the remote environment 204 for generation of updated ranking data by the ranking engine 258.

While one or more operations of the methods 400 and 500 may be described above as being performed by one or more components of a user device 306 having the illustrative configuration depicted in FIG. 3, it should be appreciated, however, that any of the operations of method 400 or method 500 may be performed by the user device 200 depicted in FIG. 2B or a user device having an alternate configuration. Further, any of the operations of method 400 or method 500 may be performed, at least in part, in a distributed manner by one or more other devices (e.g., the back-end server 302, the card producer server 304, etc.), or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Figure 6:
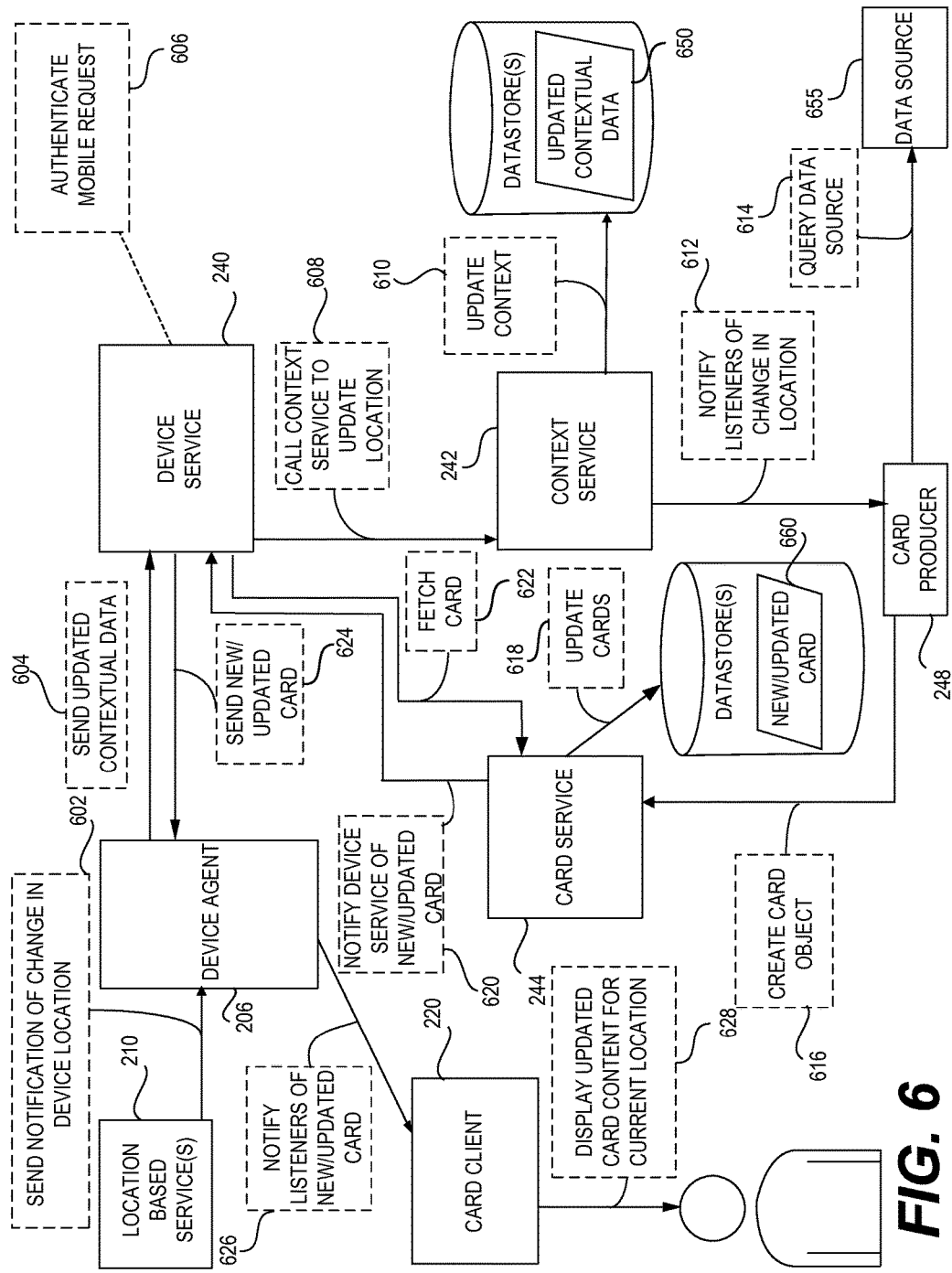
FIG. 6 is a hybrid system and process flow diagram illustrating generation and presentation of card content associated with new or updated cards in response to a change in device use context in accordance with one or more example embodiments of the disclosure.

FIG. 6 is a hybrid system and process flow diagram illustrating generation and presentation of new or updated cards in response to a change in device use context in accordance with one or more example embodiments of the disclosure. While FIG. 6 may be described using a change in device location as an example of a change in use context for a device, it should be appreciated that the process flow is applicable to any of a variety of device use context changes.

At operation 602, the contextual data source 210 such as a location-based service may send the device agent 206 a notification including updated contextual data indicating a change in a location of the user device 200.

At operation 604, the device agent 206 may send the updated contextual data to the device service 240 in the form of a request for new or updated cards containing updated card content that is contextually relevant to the new device location.

At operation 606, the device service 240 may authenticate the mobile request. At operation 608, the device service 240 may make a call to the context service 242 to update stored contextual data to indicate the change in device location. At operation 610, the context service 242 may store the updated contextual data 650 indicative of the new device location. At operation 612, the context service 242 may notify listeners of the changed device location. The listeners may include one or more card producers that generate cards that may be affected by the change in device location. A particular card producer 248 may detect the changed device location and may query a data source 655, at operation 614, for updated card content that is pertinent to the new device location. For example, if the producer 248 generates a weather-related card, the producer 248 may query a weather service for a current or future weather forecast associated with the new device location. Upon receiving the updated card content from the data source 655, the card producer 248 may generate a new card object or an updated card object at operation 616. A new card object may include the updated card content and a new card identifier, and may replace an existing card of the same card type. An updated card object may include the updated card content and the same card identifier as an existing card of the same card type such that the existing card content of the existing card is replaced with the updated card content while maintaining the existing card.

Upon creating the new/updated card, the card producer 248 may call an API to push the new/updated card to the card service 244. At operation 618, the card service 244 may store the new/updated card 660. At operation 620, the card service 244 may notify the device service 240 of the new/updated card. At operation 622, the device service 240 may make a call to the card service 244 to fetch the new/updated card. At operation 624, the device service 240 may send the new/updated card to the device agent 206. At operation 626, the device agent 206 may notify listeners of the availability of the new/updated card. Listeners may include any card client currently presenting a card of the same card type (e.g., card client 220). The client card library 218 may also be a listener. At operation 628, the updated card content for the current device location may be rendered in a UI 222 of the card client 220. If a new card with a new card identifier was generated, the existing card may be replaced with the new card. If an updated card with the same card identifier as an existing card was generated, the content of the existing card may be replaced with the updated card content.

Figure 7:
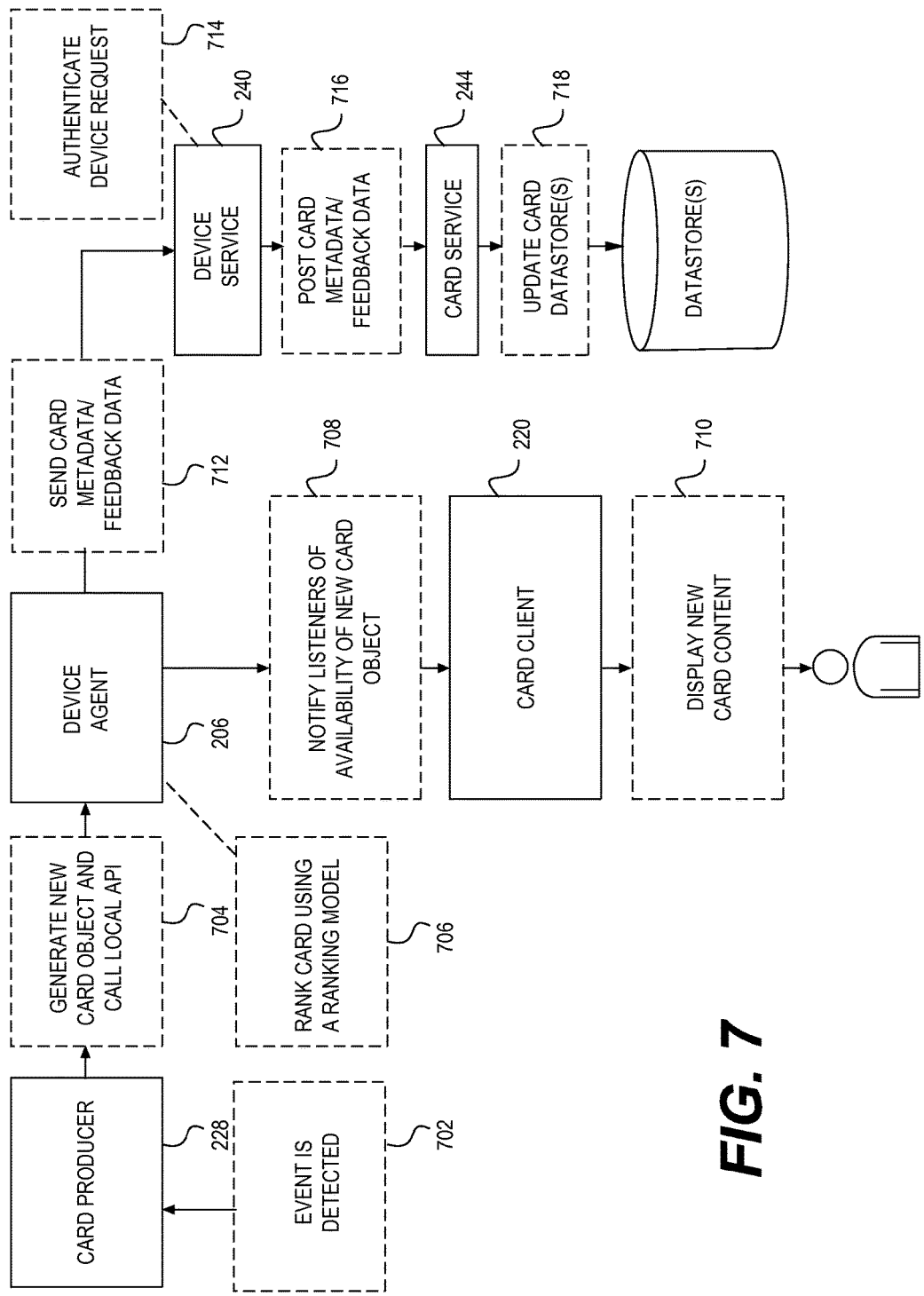
FIG. 7 is a hybrid system and process flow diagram illustrating the generation of cards by a local device card producer in accordance with one or more example embodiments of the disclosure.

FIG. 7 is a hybrid system and process flow diagram illustrating the generation of cards by a local device card producer in accordance with one or more example embodiments of the disclosure.

At operation 702, the local card producer 228 may detect an event. The event may be, for example, an event that results in a change in the use context of the device 200. Non-limiting examples include receipt of an incoming e-mail, SMS message, or instant message; receipt of an incoming call; a calendar event having a start time within a predetermined period of time from a current time, etc.

At operation 704, the local card producer 228 may generate a new card object that includes card content relevant to the detected event and may call a local API to push the new card object to the device agent 206. At operation 706, the device agent 206 may rank the card object using a ranking model or may retrieve a ranking generated by the ranking engine 258.

At operation 708, the device agent 206 may notify listeners of the availability of the new card object. The listeners may include the card client 220, which may receive the new card object and render the new card content in the UI 222 at operation 710 (potentially using the client card library 218). The new card content may be displayed as part of rendering the new card object for the first time. In other example embodiments, the new card object may include the same card identifier as an existing card such that the new card content is, in fact, updated card content for the existing card. In such an example scenario, the existing card may be modified to reflect the updated card content.

At operation 712, the device agent 206 may send metadata associated with the new card object and any feedback data received from user interaction with the new card content to the device service 240 in the form of a request to store the new card content. The device service 240 may authenticate the request at operation 714. Upon successful authentication, the device service 240 may communicate the feedback data and card metadata to the card service 244 at operation 716. The card service 244 may store the new card object and associated feedback data and card metadata at operation 718.

Figure 8:
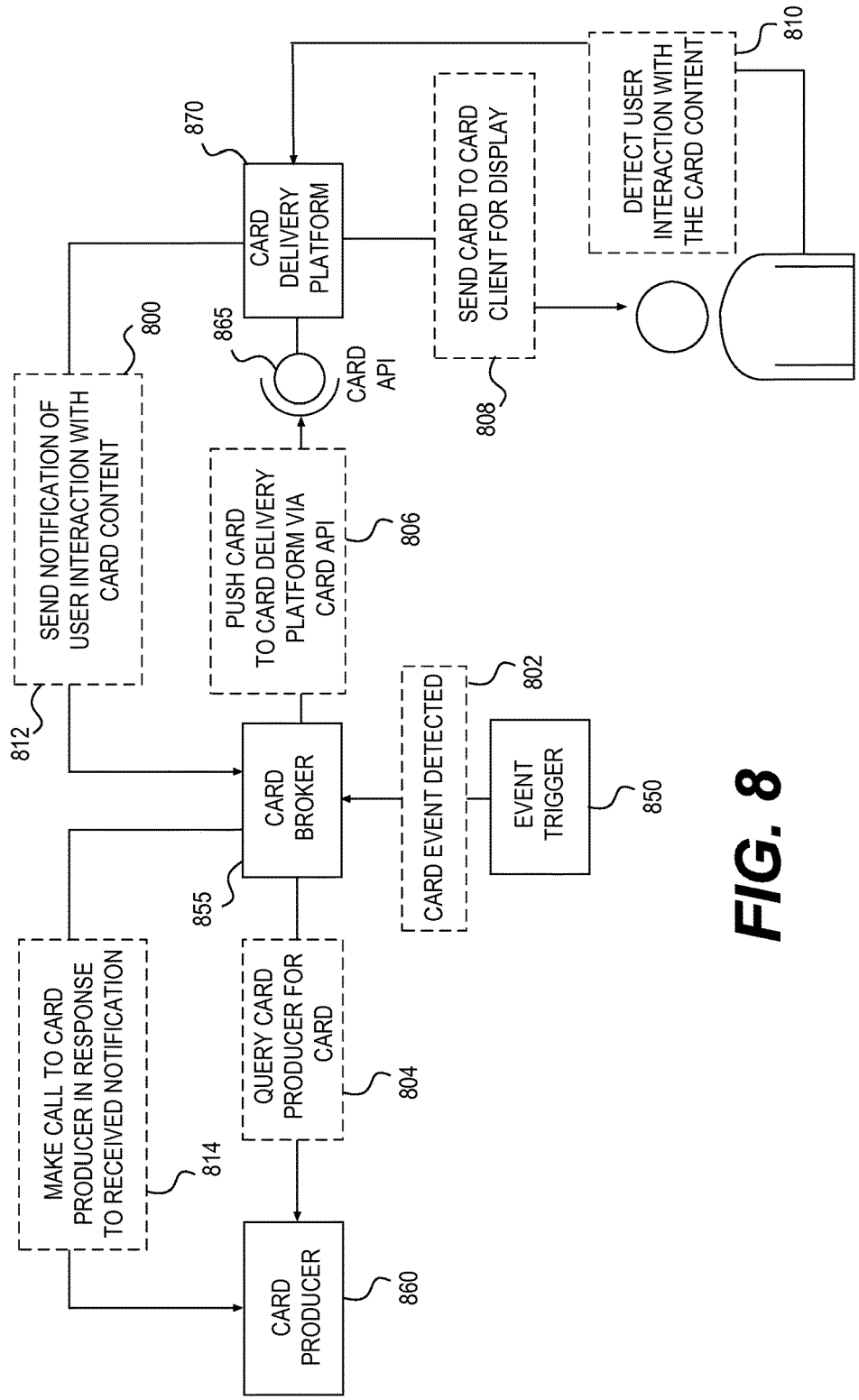
FIG. 8 is a hybrid system and process flow diagram illustrating a brokered model for card generation and delivery in accordance with one or more example embodiments of the disclosure.

FIG. 8 is a hybrid system and process flow diagram illustrating a brokered model for card generation and delivery in accordance with one or more example embodiments of the disclosure.

At operation 802, a card broker 855 may detect a card event generated as a result of an event trigger 850. The card event may be, for example, receipt of updated contextual data that indicates a change in a use context of a device.

At operation 804, the card broker may query a card producer 860 for a card that is contextually relevant to the detected card event. The card broker may query the card producer 860 for a new card type that does not correspond to an existing card type being displayed or available for display to a user or the card broker 855 may query the card producer 860 for updated card content corresponding to an existing card type.

Upon receipt of the card object from the card producer 860, the card broker 855 may push the card to a card delivery platform 870 via a corresponding card API 865. For example, referring to the example environments of FIGS. 2A-2B, the card broker 855 may make a call to the card API 865 to cause the card object to be transmitted to the card service 244. Upon receipt of the card object, the card delivery platform 870 may send the card to a card client which may display the card content via a user interface of the card client. For example, the card service 244 may store the card object and transmit the card object to the device agent 206 via the device service 240. The device agent 206 may, in turn, transmit the card to the card client 220 (or the client card library 218) for presentation in a user interface of the card client 220.

At operation 810, the card delivery platform 870 may detect user interaction with the card content. For example, referring again to the example environments of FIGS. 2A-2B, the card client 220 may collect feedback data indicating one or more user interactions with the card content. Such interactions, as previously described, may include, without limitation, selecting one or more selectable elements of the card that trigger various actions (e.g., selecting a hyperlink, tapping on the card to launch a mobile application, etc.); dismissing the card from the user interface; rating, reviewing, or providing another form of direct feedback on the card; and so forth. The feedback data may indicate that these interactions occurred and provide various metrics relating to the interactions (e.g., an amount of time that elapsed between displaying a card and dismissal of the card). The presentation of a card under contextually relevant conditions may be referred to herein as an "impression" and may be considered a type of user interaction.

The card client 220 may provide the feedback data to the device agent 206 (potentially via the client card library 218). The device agent 206 may, in turn, communicate the feedback data to the card service 244 via the device service 240. At operation 812, the card delivery platform 870 may transmit a notification to the card broker 855 that may include the feedback data or an indication that feedback data for the card is available. For example, the card service 244 may transmit the notification to the card broker 855. At operation 814, the card broker 855 may, in turn, make a call to the card producer 860 informing the card producer 860 that feedback data for the card previously generated by the card producer 860 is available. The card broker 855 may push the feedback data to the card producer as part of making the call at operation 814. In other example embodiments, the card producer 860 may periodically query the card broker 855 for feedback data.

Figure 9:
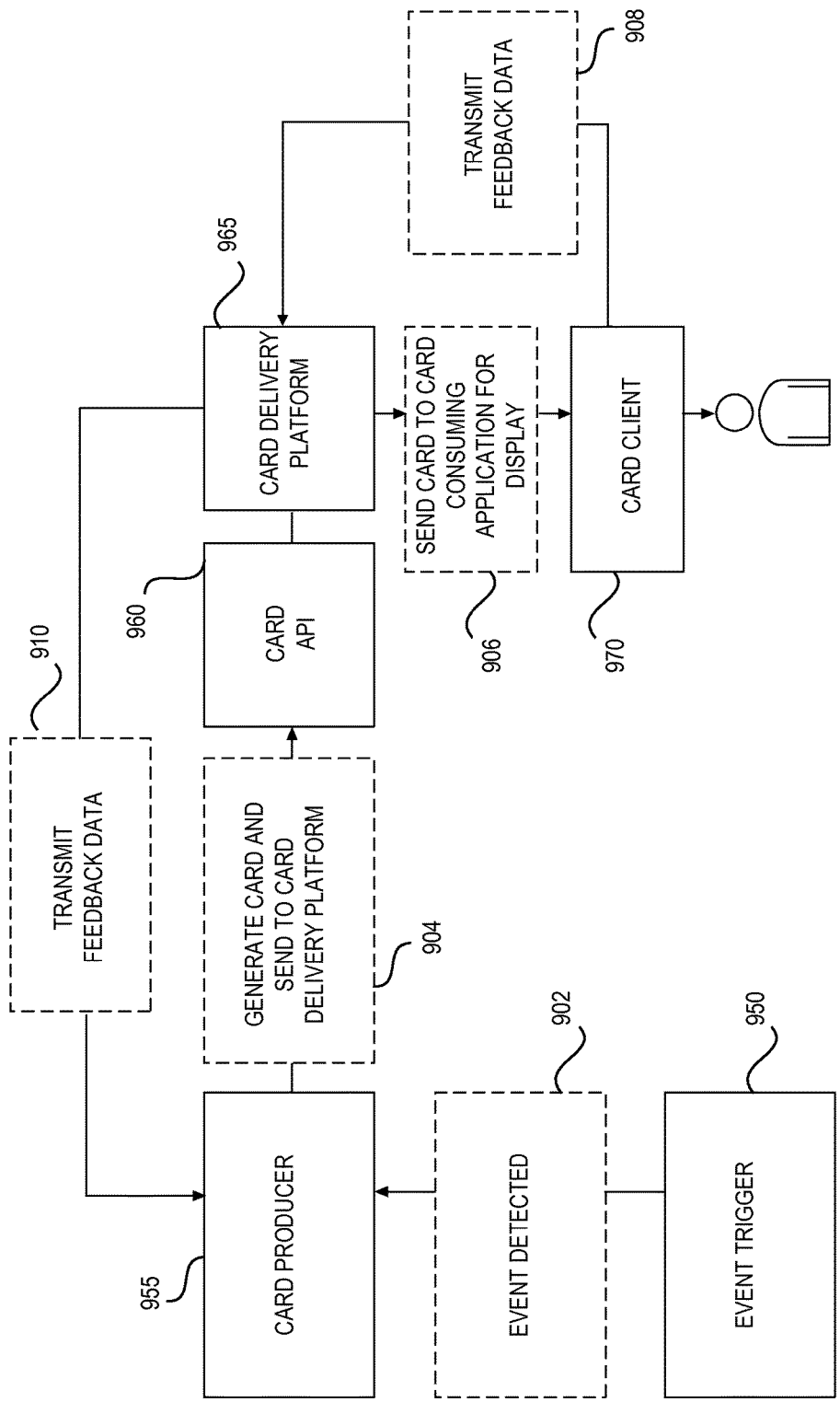
FIG. 9 is a hybrid system and process flow diagram illustrating an un-brokered model for card generation and delivery in accordance with one or more example embodiments of the disclosure.

FIG. 9 is a hybrid system and process flow diagram illustrating un-brokered model for card generation and delivery in accordance with one or more example embodiments of the disclosure.

At operation 902, a card producer 955 may detect a card event generated as a result of an event trigger 950. The card event may be, for example, receipt of updated contextual data that indicates a change in a use context of a device.

At operation 904, the card producer 955 may generate a card object and push the card object to the card delivery platform 965 via a card API 960. The card object may be a new card that does not correspond to an existing card being presented or available for presentation to a user or the card object may be an updated card that includes new content (e.g., updated card content) corresponding to an existing card. For example, the card object may be an updated card that includes new content and the same card identifier as an existing card.

Referring to the example environments of FIGS. 2A-2B, the card producer 955 may be a remote card producer 248 that generates a card and pushes the card to the card service 244 via the API 960. The card service 244 may form part of the card delivery platform 965. At operation 906, the card delivery platform 965 may send the card to a card client 970 for display. The card client 970 may be the card client 220, in which case, at operation 906, the card service 244 may transmit the card to the device agent 206 via the device service 240, and the device agent 206 may communicate the card to the card client 220 (potentially via the client card library 218).

At operation 908, the card client 970 may transmit feedback data indicative of one or more user interactions with the card content to the card delivery platform 965, and at operation 910, the card delivery platform 965 may transmit the feedback data to the card producer 955. At operation 908, the card client 220 may transmit the feedback data to the device agent 206 (potentially via the client card library 218), and the device agent 206 may send the feedback data to the card service 244 via the device service 240. Then, at operation 910, the card service 244 may generate a notification that includes the feedback data or an indication of its availability and transmit the notification to the card producer 955 (e.g., a card producer 248).

While one or more operations depicted in FIGS. 6-9 may have been described in the context of the example environments of FIGS. 2A-2B, it should be appreciated that any of the operations depicted in FIGS. 6-9 may be implemented in accordance with the example architecture of FIG. 3. Further, any of the operations described as being performed by a particular component may be performed by any one or more other components, perhaps in a distributed manner. In addition, it should be appreciated that processing performed in response to execution of computer-executable instructions provided as part of an application, program module, or the like may be interchangeably described herein as being performed by the application or the program module itself or by a device on which the application, program module, or the like is executing.

Further, any operations described and depicted with respect to FIGS. 4-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4-9 may be performed.

FIGS. 10A-10C are schematic block diagrams of various architectural implementations for supporting the presentation of card content by different types of card clients in accordance with one or more example embodiments of the disclosure.

FIG. 10A depicts an architectural configuration in which a card client 1006 may include or access a client card library 1004 and may utilize the client card library to make a call to a generic client API 1002 to obtain one or more card objects from the device agent 1000. In certain example embodiments, the device agent 1000 may correspond to the device agent 206 or the device agent 378, the client card library 1004 may correspond to the client card library 218 or the client card library 376, and the card client 1006 may corresponding to the card client 220 or the card client 374.

FIG. 10B depicts an alternative architectural configuration to that depicted in FIG. 10. In FIG. 10B, a card client 1008 may directly receive cards from the device agent 1000 via the generic client API 1002. This may provide the card client 1008 with access to the actual card object which may allow the card client 1008 to generate a custom presentation of card content. In certain example embodiments, the custom presentation may not be limited to a template on which the card object may be based.

FIG. 10C depicts yet another alternative architectural configuration to those depicted in FIGS. 10A and 10B. The architectural configuration depicted in FIG. 10C may correspond to scenarios in which no card management delivery platform components (e.g., a device agent, a client card library, etc.) may be provided on a user device. Accordingly, a card client 1022 may communicate with a card service 1010 and a context service 1012 via respective APIs. More specifically, the card client 1022 may communicate settings data to the card service 1010 via a settings API 1014 and feedback data 1016 to the card service 1010 via a feedback API 1016. Further, the card client 1022 may receive cards from the card service 1010 via a card API 1018. In addition, the card client 1022 may communicate contextual data to the context service 1012 via a context API 1020.

Illustrative Card Objects

Figure 11:
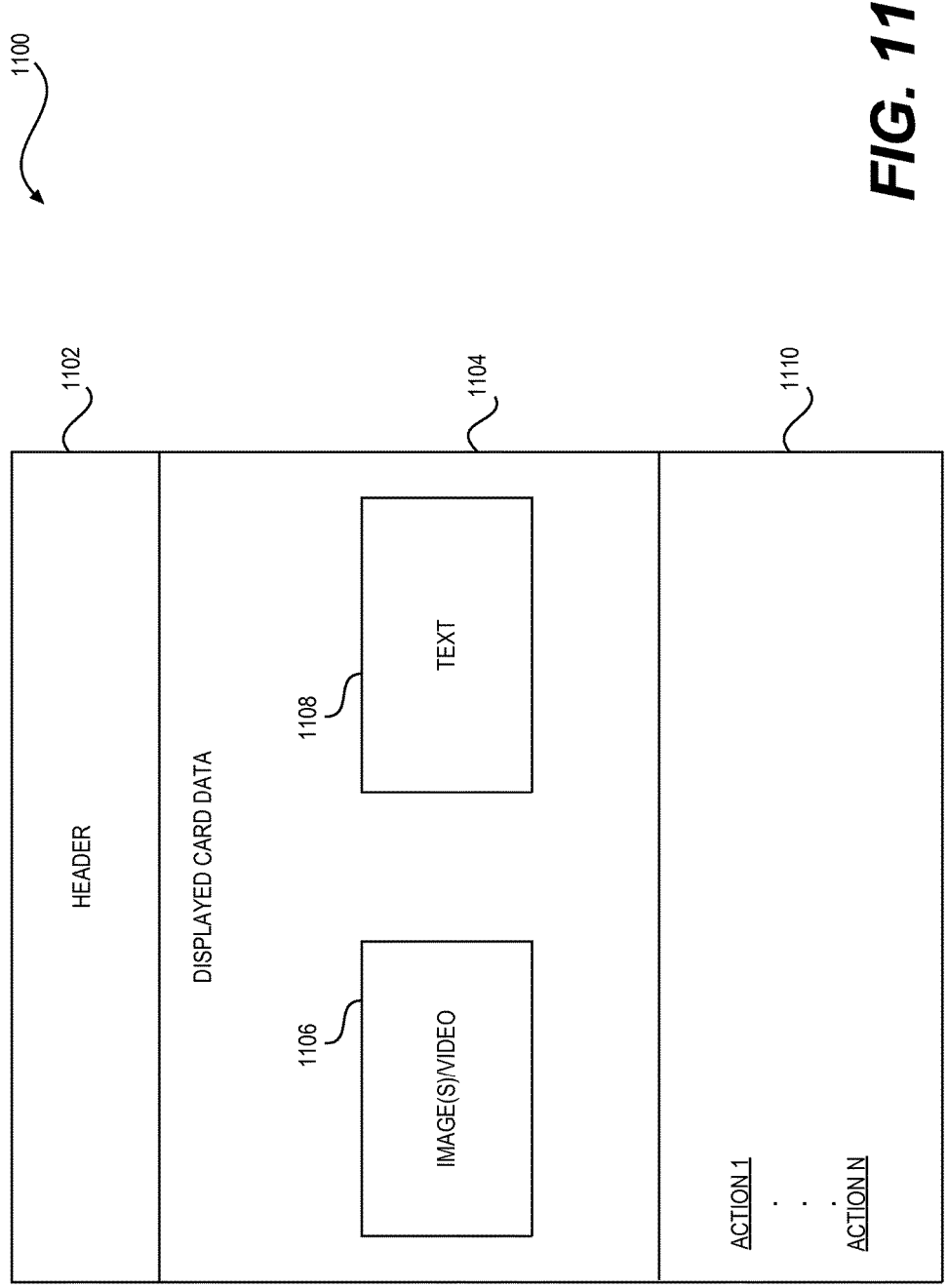
FIG. 11 is a schematic diagram of displayed card content in accordance with one or more example embodiments of the disclosure.

FIG. 11 is a schematic diagram of displayed card content in accordance with one or more example embodiments of the disclosure. The displayed content of an example card 1100 may include a header 1102 that may include prominently displayed text of the card 1100. The displayed content may further include images, graphics, video content, etc. 1106 and text content 1108. In addition, the displayed content may include one or more selectable elements 1110 that when selected may trigger one or more actions. For example, a selectable element 1110 may include a URI that when selected causes a redirection to a resource such as a web resource. It should be appreciated that other portions of the displayed content may be selectable as well. For example, one or more images 1106 may be selectable and may cause other applications on the device to be launched responsive to selection. In addition, in certain example embodiments, any portion of the displayed card content may be selectable. For example, any portion of a weather-related card may be selectable and may cause a related weather application to be launched responsive to selection.

Figure 12:
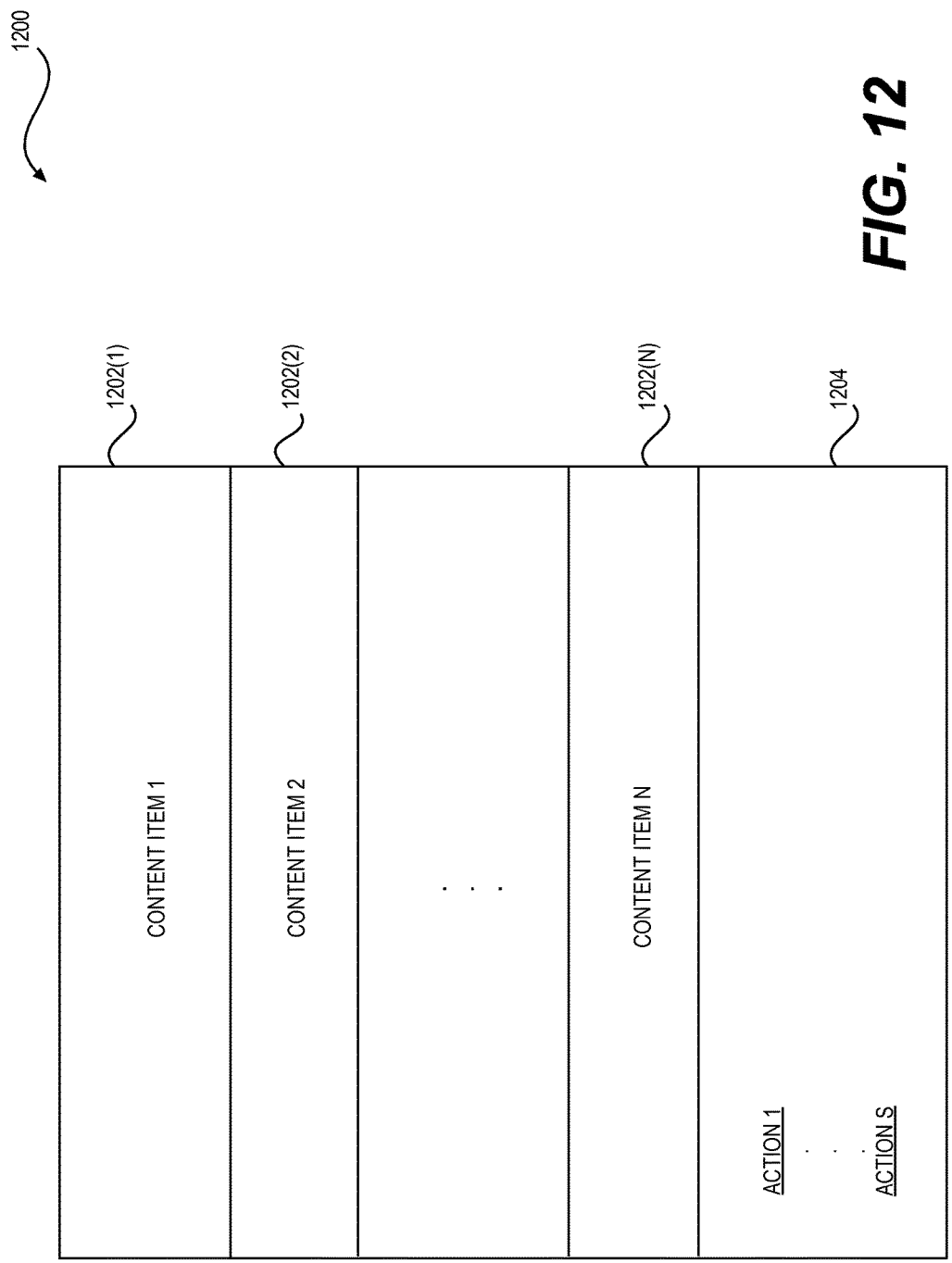
FIG. 12 is a schematic diagram of displayed card content in accordance with one or more other example embodiments of the disclosure.

FIG. 12 is a schematic diagram of displayed card content in accordance with one or more other example embodiments of the disclosure. In the example card 1200 depicted in FIG.

12, one or more content items 1202(1)-1202(N) may be presented in succession. The content items 1202(1)-1202(N) may include an indication of recently received electronic communications or voice calls (in the case of an e-mail or voice calling card, for example), an indication of news items (in the case of a news-related card), and so forth. The displayed card content may further include one or more selectable elements 1204 that may trigger one or more actions similar to the example card content depicted in FIG. 11.

Figure 13:
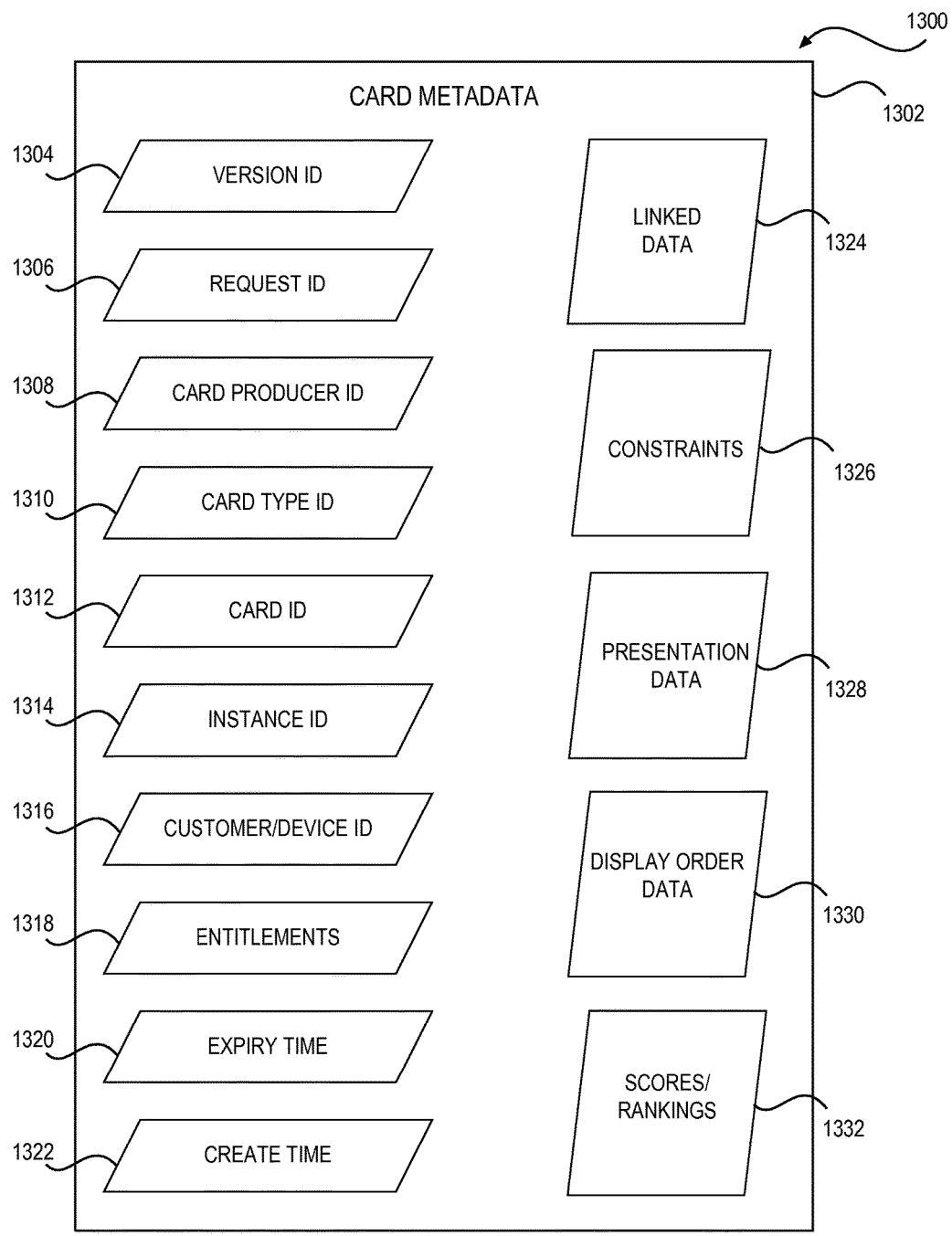
FIG. 13 is a schematic block diagram of illustrative card metadata in accordance with one or more example embodiments of the disclosure.

FIG. 13 is a schematic block diagram of illustrative card metadata 1302 for an illustrative card 1300 in accordance with one or more example embodiments of the disclosure. FIG. 13 will be described with respect to the illustrative environments of FIGS. 2A-2B.

The card metadata 1302 may include various identifiers associated with the card 1300. For example, the card metadata may include a version identifier 1304 that indicates a version of an Application Programming Interface (API) used by a card producer 248 to post the card 1300 to the card service 244 which, in turn, may transmit the card to the device agent 206 executing on the user device 200. The card metadata 1302 may further include a request identifier 1306. The request identifier 1306 may be used by the device agent 206 and the device service 240 for synchronization purposes to ensure that the same card data is being maintained both locally on the device 200 and remotely on one or more servers on which the device service 240 is executing. The request identifier 1306 may also be used to stamp feedback data (e.g., the feedback data 224) to link the feedback data to the card 1300. The card metadata 1302 may further include a producer identifier 1308 that may serve to create a namespace of card types and to identify the card producer 248 of the card 1300. The card metadata 1302 may additionally include a card type identifier 1310 that may indicate the type of card (e.g., a meal-related card, a weather-related card, etc.).

The card metadata 1302 may additionally include a card identifier 1312 that identifies a particular presentable card. The producer identifier 1308 in conjunction with the card type identifier 1312 may create a namespace of card identifiers. In certain example embodiments, a user may be able to select a setting to selectively turn on or off the presentation of cards based on the card type identifier 1312.

The card metadata 1302 may also include a card instance identifier 1314 that may identify a particular instance of the card 1300. In certain example embodiments, a card producer may produce multiple instances of a card, with each instance having a different card instance identifier 1314 but the same card identifier 1312. Different instances of the card 1300 may correspond to different versions of the card 1300 with different card content relevant to different contextual conditions. For example, the card 1300 may be a "lunchtime" card for which the card producer may have produced multiple instances that provide different restaurant recommendations in relation to different geo-coordinates. The different contextual conditions to which different instances of the card 1300 may be relevant may be embodied as constraints 1326 within the card metadata 1302.

The card metadata 1302 may further include a customer identifier 1316 that may indicate a particular user for whom the card 1300 is intended and/or a device identifier 1316 that may indicate a particular device on which the card 1300 is to be presented. If no device identifier is specified, the card may be presented on any device associated with the customer identifier 1316.

The card metadata 1302 may further include a time/datestamp 1320 that indicates a point in time at which the card expires and is no longer available for presentation and a time/datestamp 1322 indicating a point in time at which the card producer generated the card (which may differ from a point in time at which the card is pushed to the card service via a call to a corresponding API). The card metadata may further include entitlements data 1318 that may indicate various types of data that a user may be permitted to opt out of sharing. For example, the card 1300 may require data that a user must be provided with an option of not sharing. The entitlements data 1318 may indicate any such data.

The card metadata may further include linked data 1324 that includes structured machine-readable data indicating various attributes of card content of the card 1300, constraints 1326 that specify preferred contextual conditions or contextual conditions that must be present before the card content is presented, presentation data 1328 that may specify the format and organization for how the card content should be presented, presentation data 1330 which may be a Boolean value that specifies whether the card 1300 should be displayed more prominently when the card content is updated, and scores/ranking data 1332 that may specify a producer-generated and/or platform-generated score for the card 1300 indicative of a degree to which the card is personalized and/or contextually relevant for a user, a ranking for the card 1300 in relation to one or more other cards, and so forth. It should be appreciated that the card metadata 1302 depicted in FIG. 13 is merely illustrative and not exhaustive.

Illustrative User Interface (UI)/User Experience (UX)

Figure 14:
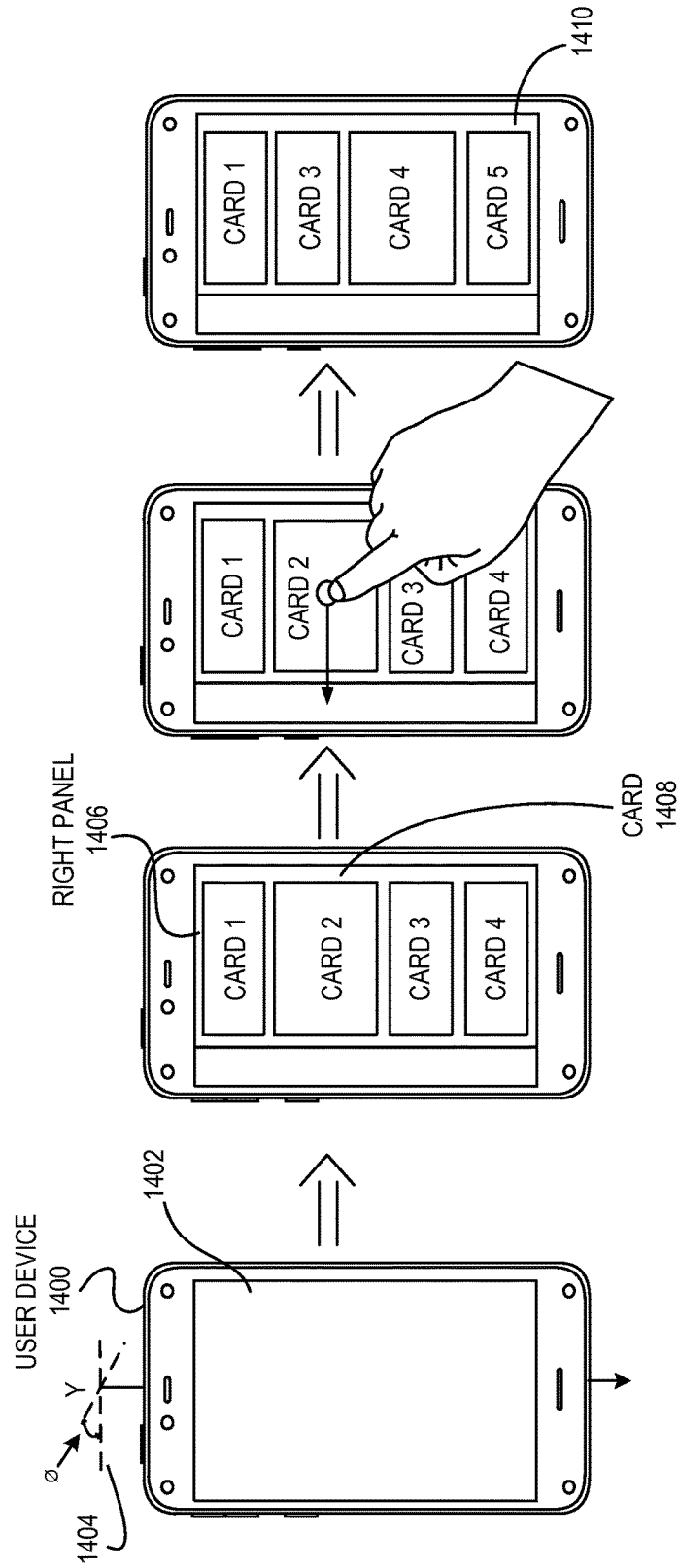
FIG. 14 is a schematic diagram of a series of illustrative user actions for initiating a presentation of a card via a user interface of a card client and dismissing a card from the user interface in accordance with one or more example embodiments of the disclosure.

FIG. 14 is a schematic diagram of a series of illustrative user actions for initiating a presentation of a card via a user interface of a card client and dismissing a card from the user interface in accordance with one or more example embodiments of the disclosure.

A user device 1400 may be provided on which a user interface 1402 may be displayed. The user interface 1402 may be a home screen of the user device 1400 or an interface associated with any other application executable on the device (e.g., a downloaded mobile application, a messaging application, an e-mail client application, etc.). A user may perform a gesture 1404 (e.g., a tilt gesture) which may cause a right panel 1406 to appear as an overlay over the user interface 1402. A portion of the user interface 1402 may remain un-obscured by the right panel 1406. It should be appreciated that any suitable gesture may be performed to cause the right panel 1406 to be displayed.

The right panel 1406 may be a card client. The right panel may present card content associated with various cards (e.g., cards 1-4). The user may interact with the cards in various ways. For example, the user may perform a gesture (e.g., a swipe) to remove or "dismiss" a card 1408 (e.g., card 2) from the right panel 1406. If the user dismisses a card currently being displayed, the presentation of the cards may be modified to accommodate an additional card 1410 (e.g., card 5). In certain example embodiments, the presentation order of other cards displayed prior to the dismissal of card 2 may be updated based on the dismissal of card 2. It should be appreciated that the right panel 1406 is merely an example type of card client and that cards may be presented by numerous other types of card clients such as browser application, dedicated mobile applications, or the like. Further, the gestures, location of the right panel 1406, and so forth are merely illustrative and not exhaustive. For example, in another example embodiment, a card may be dismissed by performing a double tap gesture, the right panel 1406 may be caused to be appear by a swivel gesture, and so forth. As another example, the card client may be a left panel that appears from the left side of a display screen in response to a gesture.

Figure 15:
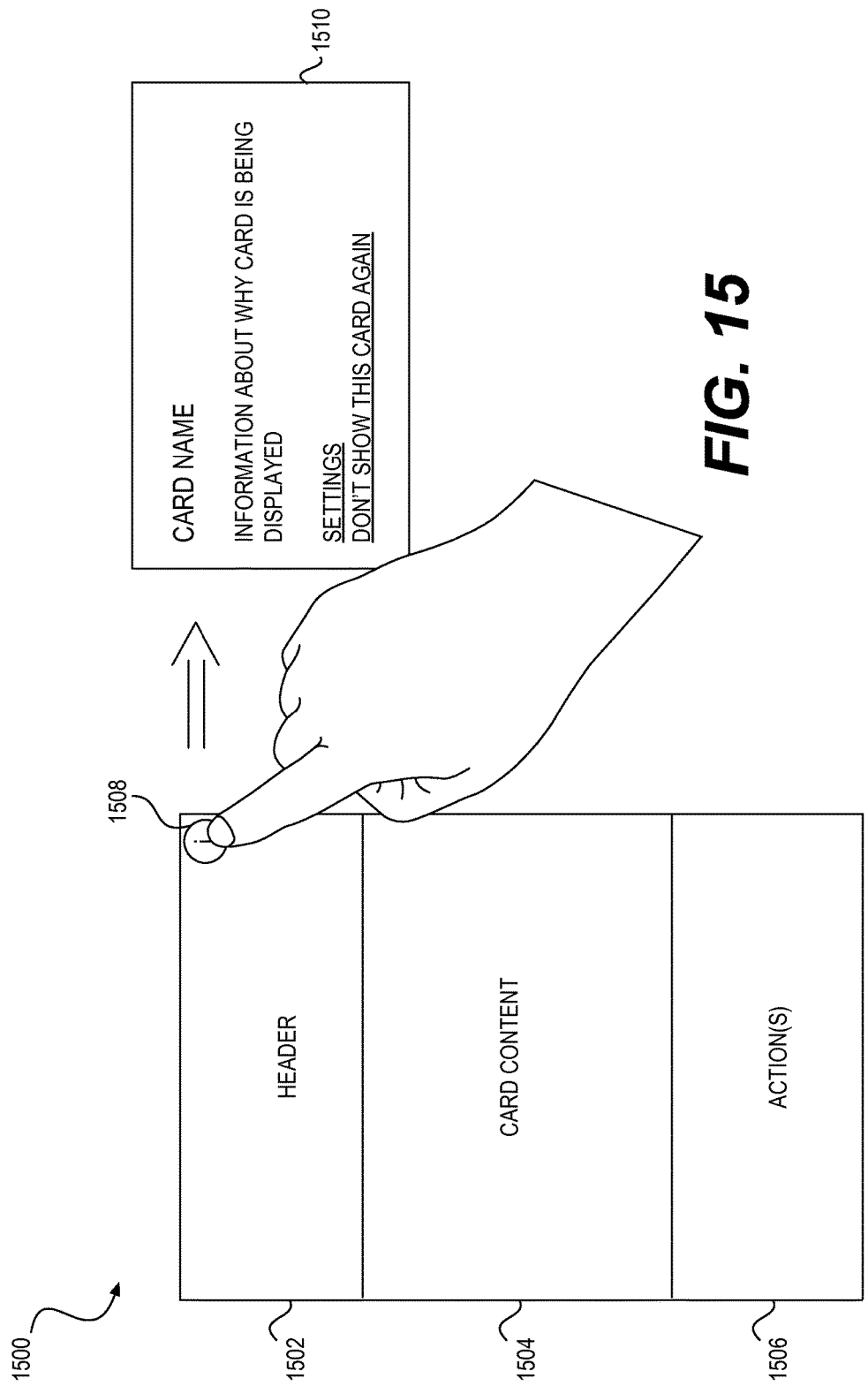
FIG. 15 is a schematic diagram of an illustrative user action for initiating a display of information relating to a card in accordance with one or more example embodiments of the disclosure.

FIG. 15 is a schematic diagram of an illustrative user action for initiating a display of information relating to a card in accordance with one or more example embodiments of the disclosure. Presented card content of an example card 1500 may include header content 1502, primary card content 1504, and one or more actions 1506. In addition, a selectable widget 1508 may be presented that, when selected, presents information identifying the card and why the card is being presented. In this manner, a user may gain greater insight into the contextual relevance and/or personalization of the card content.

Figure 16:
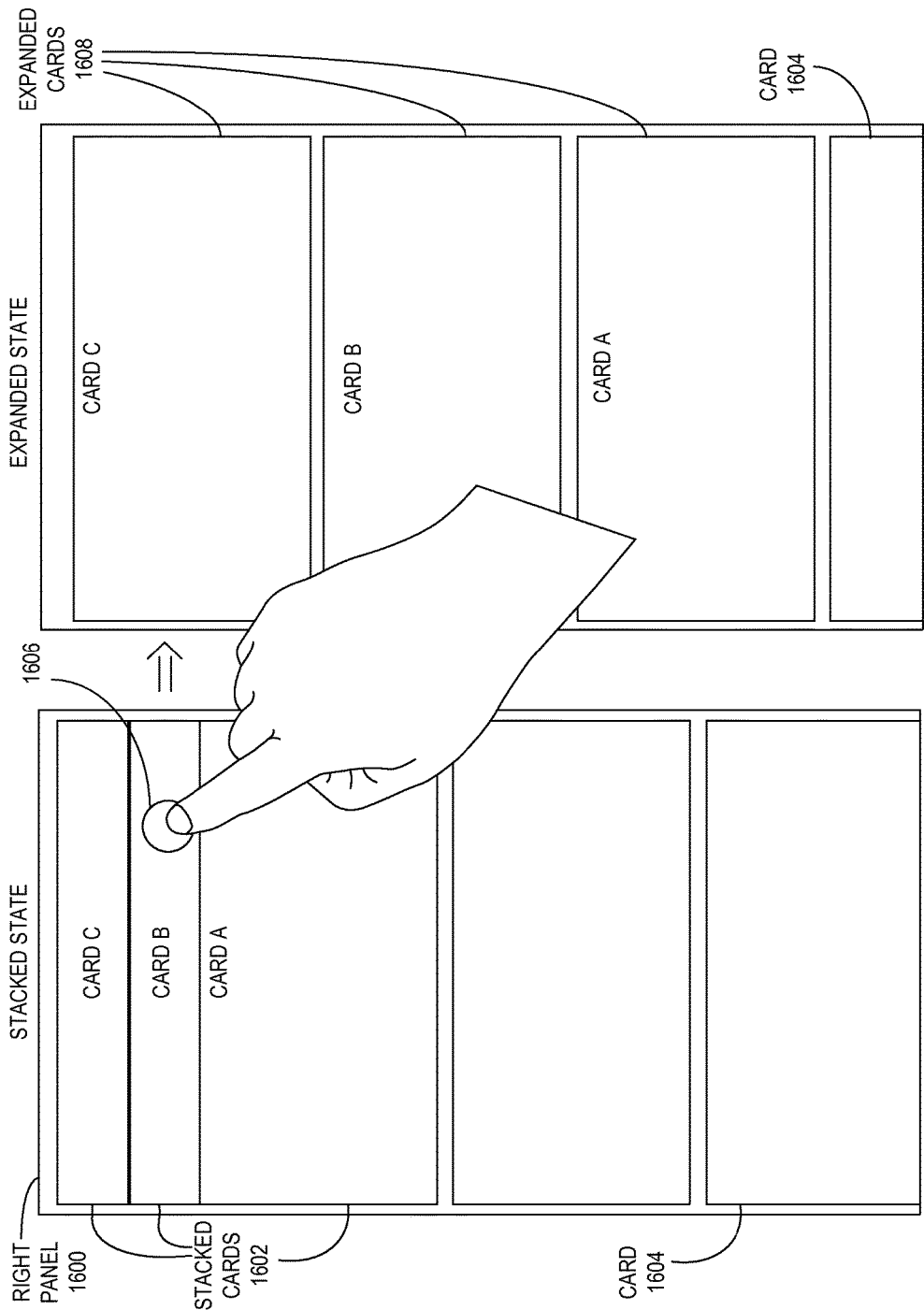
FIG. 16 is a schematic diagram of an illustrative user action for expanding a set of stacked cards in accordance with one or more example embodiments of the disclosure.

FIG. 16 is a schematic diagram of an illustrative user action for expanding a set of stacked cards in accordance with one or more example embodiments of the disclosure. A right panel 1600 is shown as an example card client. Various cards (e.g., Cards A-C) are depicted as being presented in a stacked state 1602. A user gesture performed with respect to any card among the stacked set of cards 1602 (e.g., a tap) may cause the cards to transition from the stacked state 1602 to the expanded state 1608. Expansion of the cards may cause a particular card 1604 that was previously displayed in full when the cards were in the stacked state 1602 to become partially displayed. In certain example embodiments, only cards of the same card type may be stackable. For example, a set of weather-related cards may be stackable. In other example embodiments, cards of different types may be stackable as well.

Figure 17:
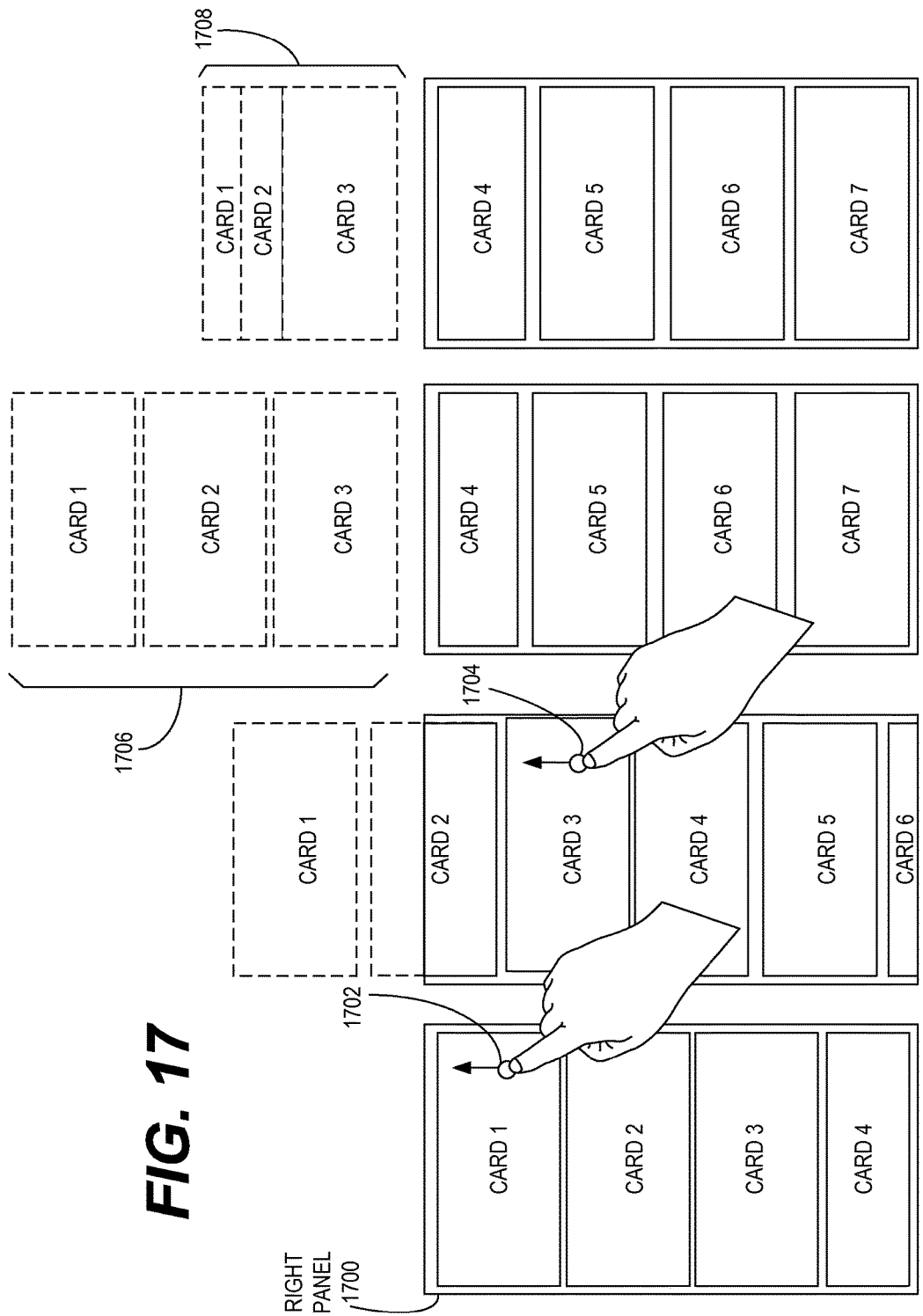
FIG. 17 is a schematic diagram of a series of illustrative user actions for scrolling through a list of cards presented via a user interface of a card client in accordance with one or more example embodiments of the disclosure.

FIG. 17 is a schematic diagram of a series of illustrative user actions for scrolling through a list of cards presented via a user interface of a card client in accordance with one or more example embodiments of the disclosure.

A right panel 1700 is again shown as an example card client. In a first stage of the series of user actions, a user may perform a gesture 1702 such as, for example, a swipe to scroll through the set of cards displayed in the right panel 1700. In response to the gesture 1702, the set of cards displayed in the right panel 1700 may shift upwards causing certain cards to no longer be displayed in the right panel 1700 (e.g., card 1) and causing other cards to become displayed (e.g., card 5). Certain cards may be partially displayed in the right panel 1700 (e.g., card 2, card 6). In certain example embodiments, the cards may be rendered dynamically as they enter the right panel 1700 or may have been pre-rendered prior to being displayed in the right panel 1700.

The user may perform an additional gesture 1704 (e.g., a swipe) to continue to scroll through the cards. This may cause additional cards (e.g., card 2 and card 3) to leave the display view of the right panel 1700. Once a set of stackable cards are outside of the view of the display panel 1700, the cards may transition to a stacked state 1708. If the stacked cards are again brought into the view of the right panel 1700, the cards may remain in the stacked state 1708 until expanded by a user gesture (e.g., a double tap) or may be automatically expanded.

FIG. 18 is a schematic diagram of an illustrative user action for dismissing a stacked set of cards in accordance with one or more example embodiments of the disclosure. A right panel 1800 is again depicted as an example card client. A user may dismiss (remove) a set of cards in a stacked state 1802 from the right panel 1800 by performing a gesture 1804 (e.g., a swipe) with respect to the displayed card content of any of the cards in the stacked state 1802. Performing the gesture with respect to any given card in the stacked set of cards may cause the entire stacked set of cards to be dismissed.

FIG. 19 is a schematic diagram of an illustrative user action for dismissing an individual card of an expanded set of cards in accordance with one or more example embodiments of the disclosure. A right panel 1900 is again depicted as an example card client. The right panel 1900 is depicted as displaying the stacked set of cards from FIG. 18 in an expanded state. When in an expanded state, a user may dismiss individual cards of the stackable set of cards by performing a gesture 1908 with respect to the card the user wishes to dismiss.

FIGS. 20-30 are schematic diagrams of example templates and corresponding card types in accordance with one or more example embodiments of the disclosure.

Figure 20:
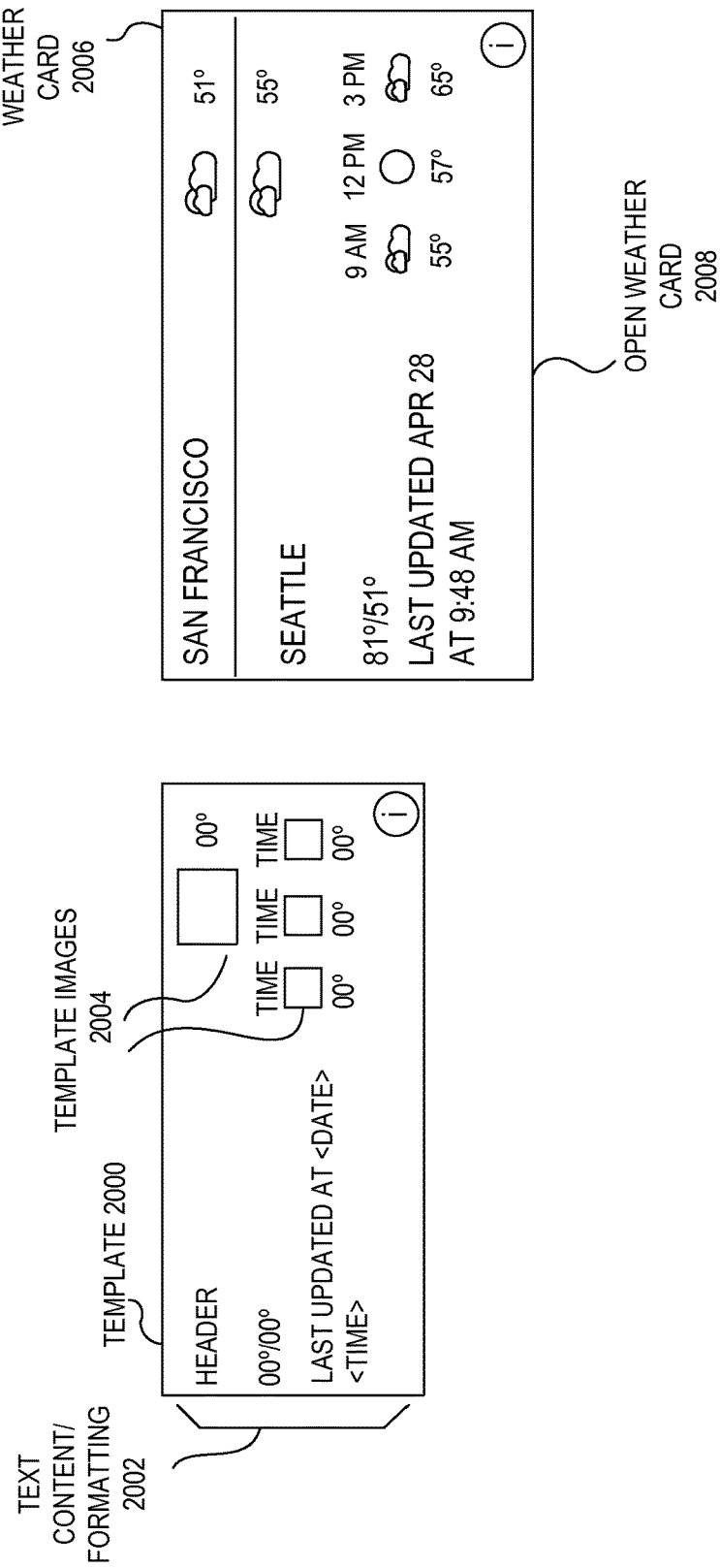

FIG. 20 depicts example weather-related cards. One card 2006 is depicted in a closed state while another card 2008 is depicted in an open state. As previously discussed, weather-related cards are examples of cards that may be stackable. The formatting, organization, and so forth of the cards 2006, 2008 may be specified by a template 2000. The template 2000 may specify placeholders 2002 for text to be included in corresponding cards, placeholders for images 2004 to be included in corresponding cards, and so forth.

Figure 21:
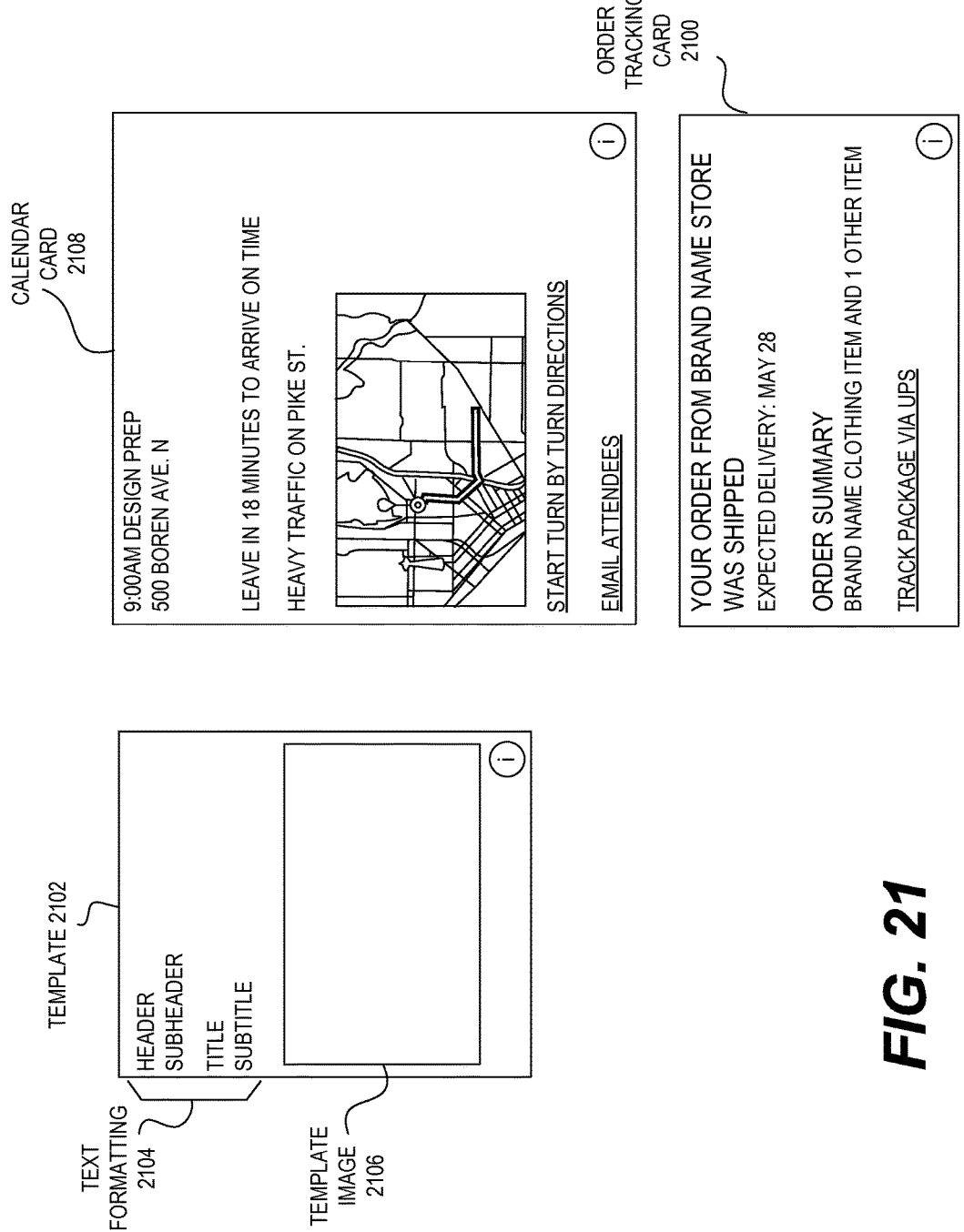

FIG. 21 depicts an example calendar card 2108 and an example order tracking card 2100. Although each of the cards 2100 and 2108 may include different types of content, they may be generated based on the same template 2102. The template 2102 may specify placeholders 2104 for text to be included in corresponding cards, a placeholder 2106 for an image to be included in corresponding cards, and so forth.

Figure 23:
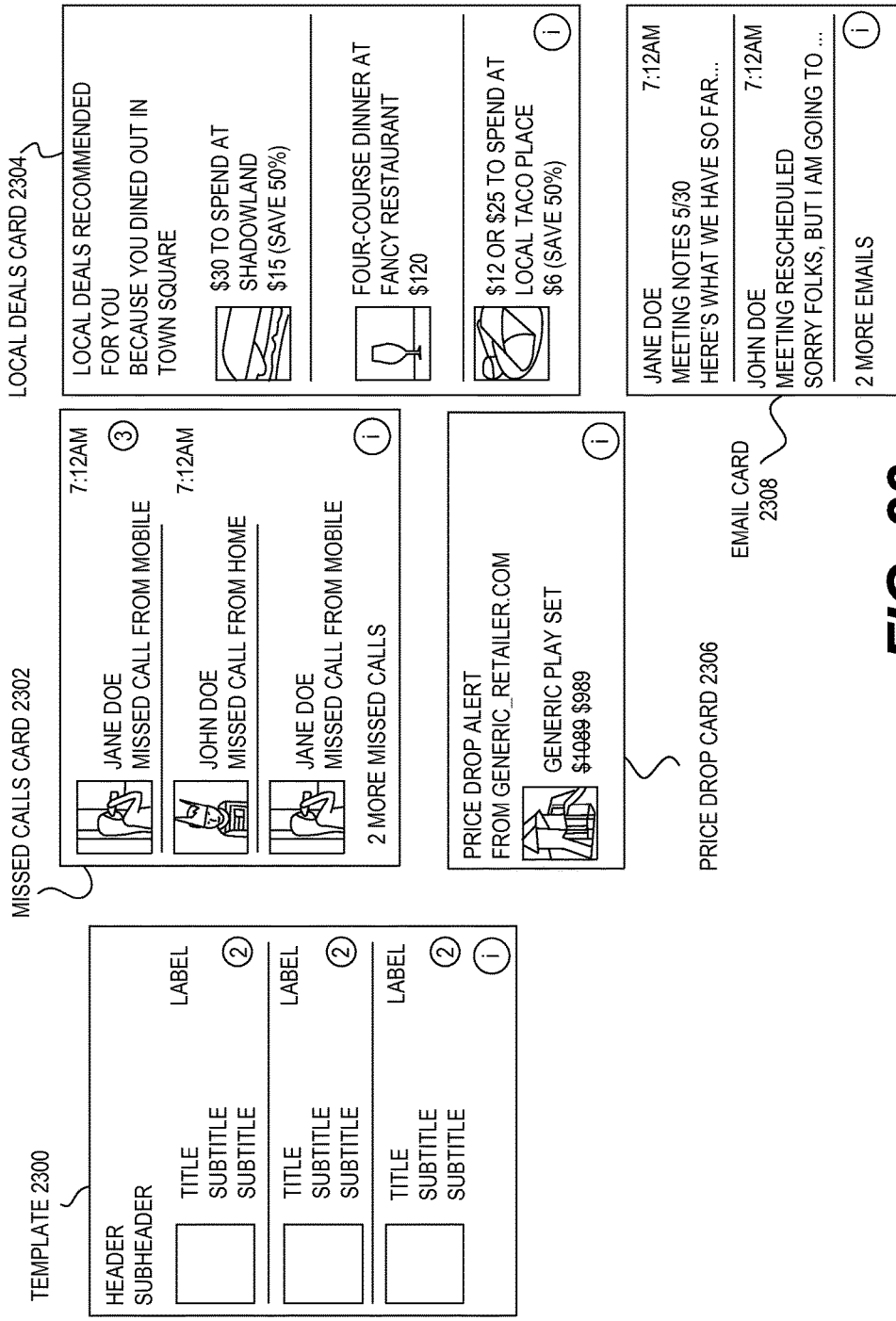
Figure 24:
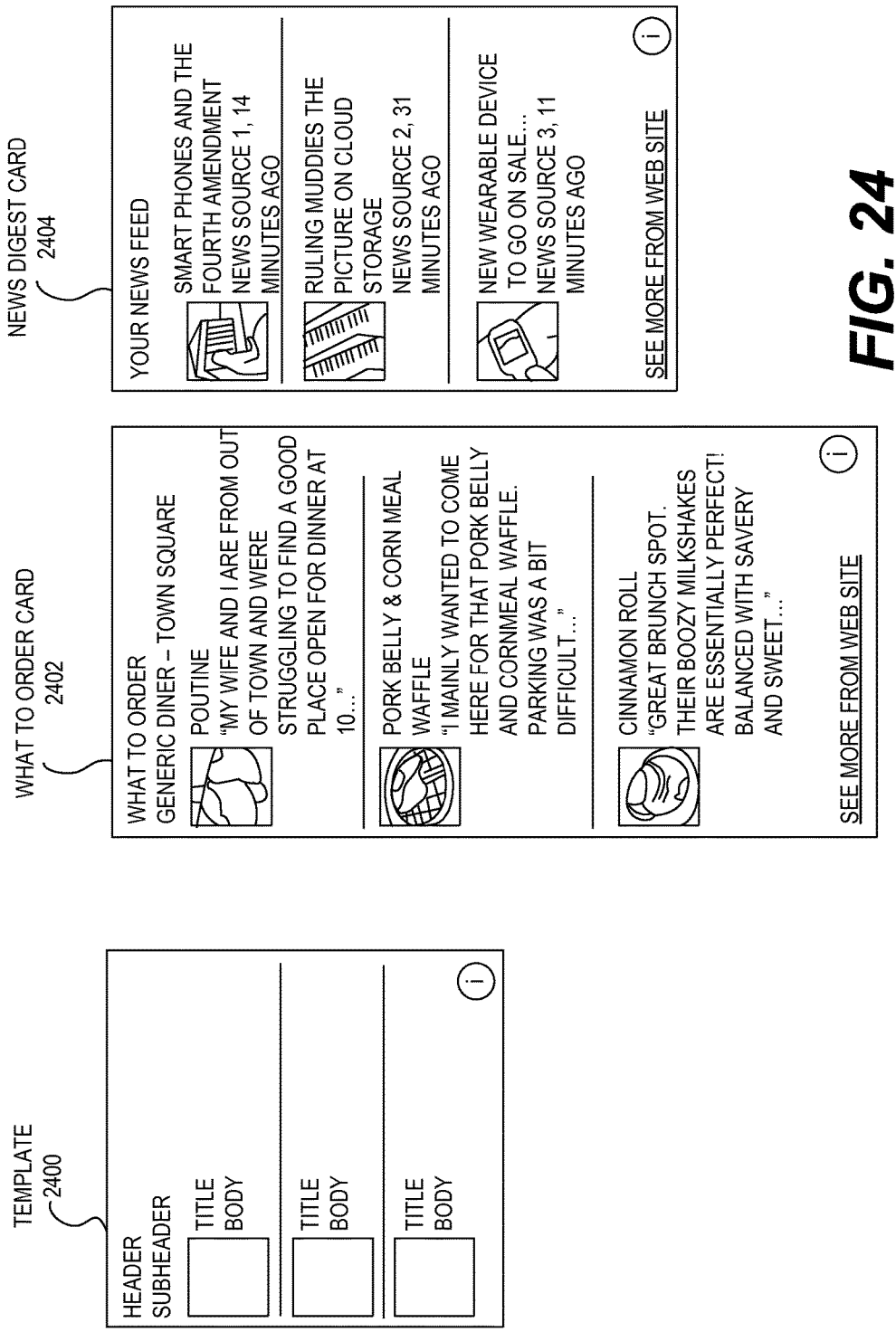
Figure 28:
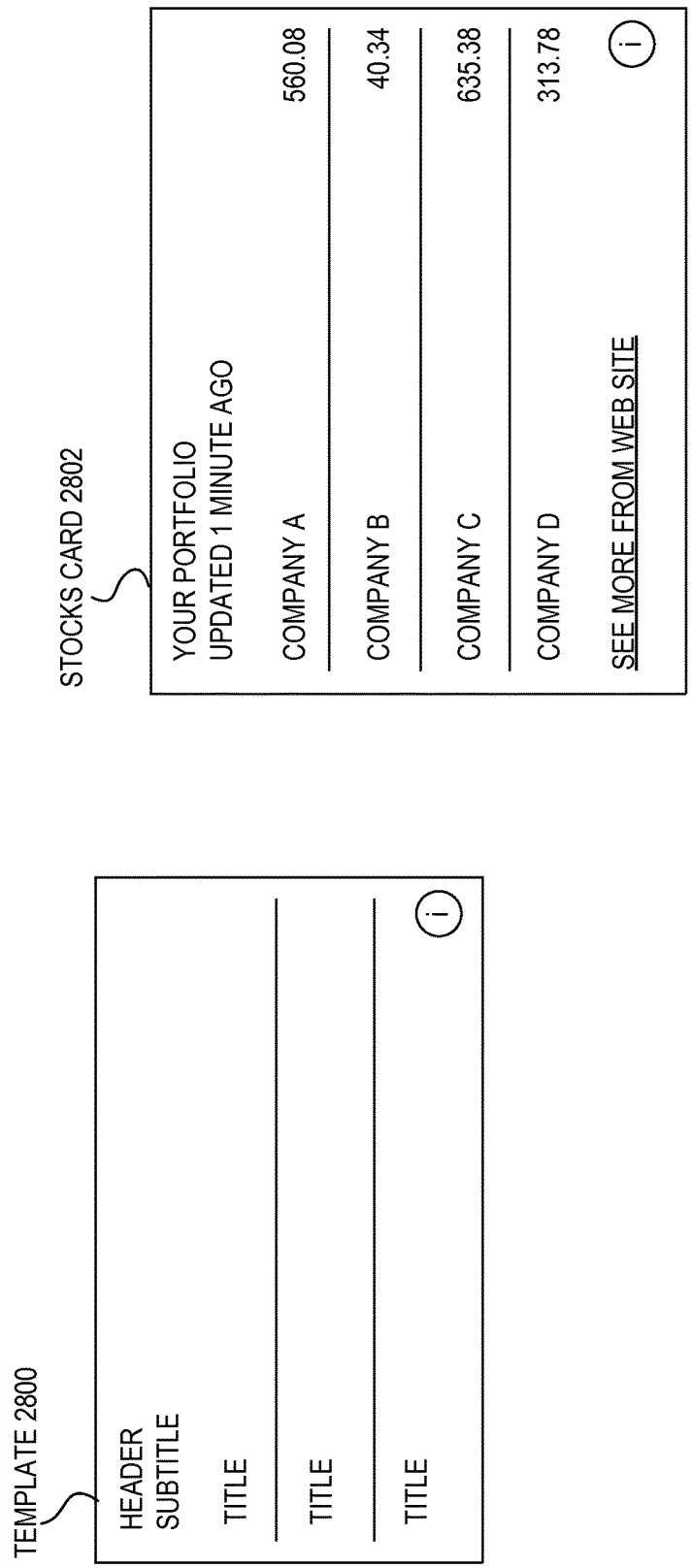
Figure 29:
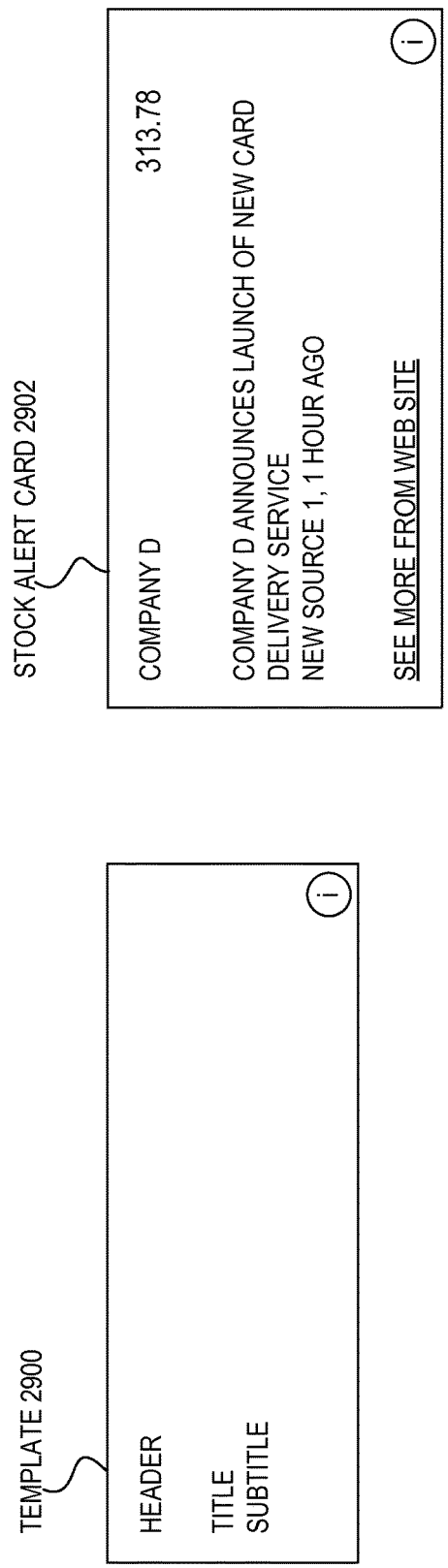

FIG. 22 depicts an example content card 2200 that may be generated based on the example template 2200. FIG. 23 depicts an example missed calls card 2302, an example local deals card 2304, an example price drop card 2306, and an example email card 2308 that may be generated based on the same template 2300. FIG. 24 depicts an example food item recommendation card 2402 and an example news digest card 2404 that may be generated based on the example template 2400. FIG. 25 depicts an example messaging card 2502 that may be generated based on the example template 2500. FIG. 26 depicts an example restaurant recommendations card 2602 that may be generated based on the example template 2600. FIG. 27 depicts an example news alert card 2700 that may be generated based on the example template 2700. FIG. 28 depicts an example stock portfolio related card 2802 that may be generated based on the example template 2800. FIG. 29 depicts an example stock alert card 2902 that may be generated based on the example template 2900. FIG. 30 depicts an example photos card 3002 that may be generated based on the example template 3000. It should be appreciated that the example templates and corresponding cards depicted in FIGS. 20-30 are merely illustrative and not exhaustive.

Illustrative Device Configurations and Gestures

Figure 31:
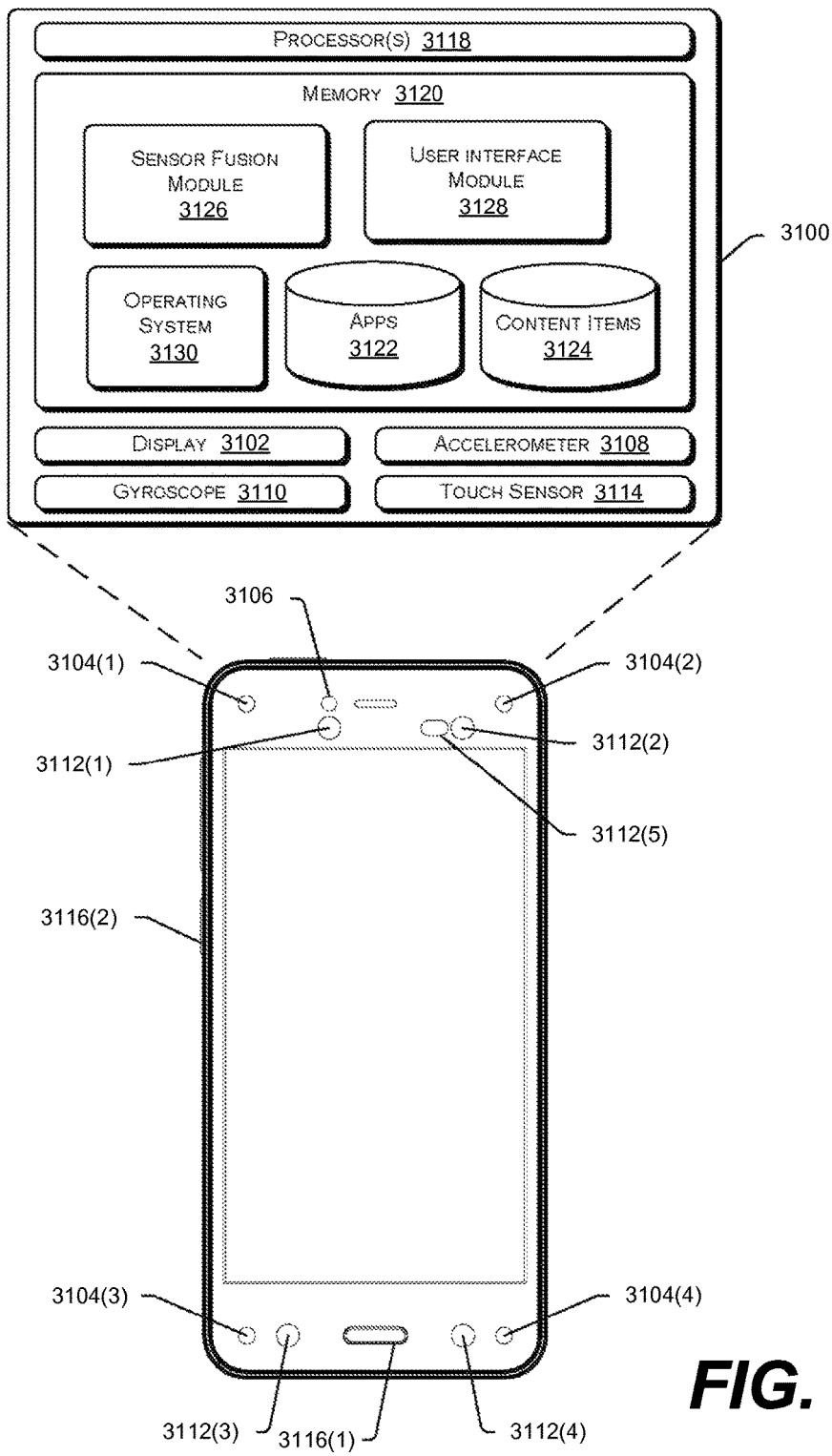
FIG. 31 is a schematic block diagram of an illustrative configuration of a user device capable of detecting one or more gestures and rendering one or more user interfaces in accordance with one or more example embodiments of the disclosure.

FIG. 31 illustrates an example user device 3100 (e.g., handheld or mobile electronic device) that may enable/implement the gestures and user interfaces described herein. In certain example embodiments, the device 3100 may correspond to the device 200 and/or the device 306. As illustrated, the device 3100 may include a display 3102 for presenting applications and content items, along with other output devices such as one or more speakers, a haptic device, and the like. The device 3100 may include multiple different sensors, including multiple cameras 3104(1), 3104(2), 3104(3), 3104(4), and 104(5) which, in some instances may reside on the front face of the device 3100 and near the corners of the device 3100 as defined by a housing of the device. While FIG. 1 illustrates four corner cameras 3104(1)-(4), in other instances the device 3100 may implement any other number of cameras, such as two corner cameras, one centered camera on top and two cameras on the bottom, two cameras on the bottom, or the like.

In addition to the cameras 3104(1)-(4), the device 3100 may include a front-facing camera 3106, which may be used for capturing images and/or video. The device 3100 may also include various other sensors, such as one or more accelerometers 3108, one or more gyroscopes 3110, one or more infrared cameras 3112(1), 3112(2), 3112(3), 3112(4), and 3112(5), a touch sensor 3114, a rear-facing camera, and the like. In some instances, the touch sensor 3114 may be integrated with the display 3102 to form a touch-sensitive display, while in other instances the touch sensor 3114 may be located apart from the display 3102. As described in detail below, the collection of sensors may be used individually or in combination with one another for detecting in-air gestures made by a user holding the device 3100.

FIG. 31 further illustrates that the device 3100 may include physical buttons 3116(1) and 3116(2), potentially along with multiple other physical hardware buttons (e.g., a power button, volume controls, etc.). The physical button 3116(1) may be selectable to cause the device to turn on the display 3102, to transition from an application to a home screen of the device, and the like, as discussed in detail below. The physical button 3116(2), meanwhile, may be selectable to capture images and/or audio for object recognition, as described in further detail below.

The device 3100 may also include one or more processors 3118 and memory 3120. Individual ones of the processors 3116 may be implemented as hardware processing units (e.g., a microprocessor chip) and/or software processing units (e.g., a virtual machine). The processor(s) 3118 may include any of the example types of processors discussed with respect to FIG. 3. The memory 3120, meanwhile, may be implemented in hardware or firmware, and may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by a processor including any of the example types of memory discussed with respect to FIG. 3. The memory 3120 encompasses non-transitory computer-readable media. Non-transitory computer-readable media includes all types of computer-readable media other than transitory signals.

As illustrated, the memory 3120 may store one or more applications 3122 for execution on the device 3100, one or more content items 3124 for presentation on the display 102 or output on the speakers, a sensor-fusion module 3126, a user-interface module 3128, and an operating system 3130. The sensor-fusion module 3124 may function to receive information captured from the different sensors of the device 3100, integrate this information, and use the integrated information to identify inputs provided by a user of the device. For instance, the sensor-fusion module 3126 may integrate information provided by the gyroscope 3110 and the corner cameras 3104(1)-(4) to determine when a user of the device 3100 performs a "peek gesture."

The user-interface module 3128, meanwhile, may present user interfaces (UIs) on the display 3102 according to inputs received from the user. For instance, the user-interface module 3128 may present any of the screens described and illustrated below in response to the user performing gestures on the device, such as in-air gestures, touch gestures received via the touch sensor 3114, or the like. The operating system module 3130, meanwhile, functions to manage interactions between and requests from different components of the device 3100.

Figure 32:
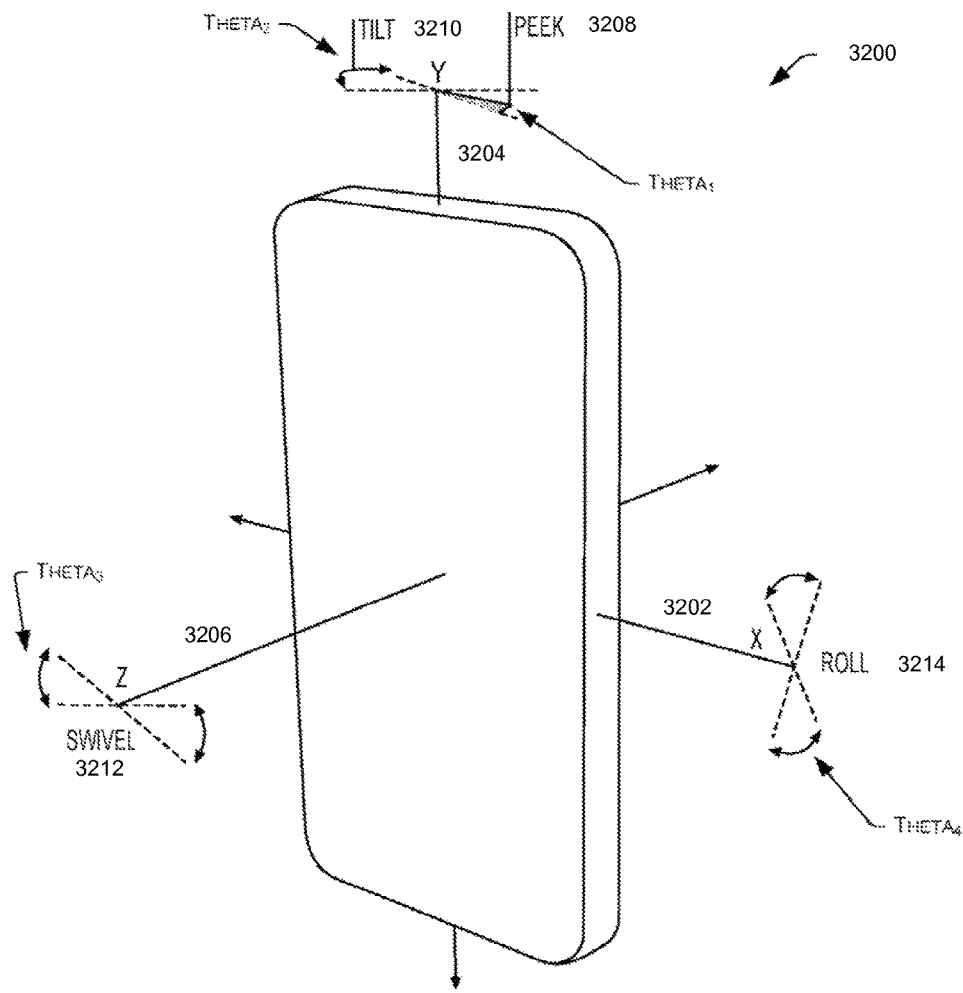
FIG. 32 illustrates example gestures that may be performed in accordance with one or more example embodiments of the disclosure.

FIG. 32 illustrates example gestures that a user may perform using the device 3100. As illustrated, FIG. 32 defines an x-axis 3202, a y-axis 3204, and a z-axis 3206. The x-axis is within a plane defined by the major plane of the device 3100 and runs along the length of the device 3100 and in the middle of the device. The y-axis 3204, meanwhile, is also in the plane but runs along the height of the device 3100 and in the middle of the device. Finally, the z-axis 3206 runs perpendicular to the major plane of the device (and perpendicular to the display of the device) and through a middle of the device 3100.

As illustrated, a user may perform a peek gesture 3208 and a tilt gesture 3210 by rotating the device 3100 about the y-axis 3202. In some instances, a peek gesture 3208 is determined by the user-interface module when the position of the user changes relative to the device, as determined from information captured by the corner cameras 3104(1)-(4). Therefore, a user may perform a peek gesture 3208 by rotating the device slightly about the y-axis (thereby changing the relative position of the user's face to the device from the perspective of the cameras 3104(1)-(4)) and/or by moving the user's face to the right or left when looking at the display 3102 of the device 3100 (again, changing the user's position relative to the cameras 3104(1)-(4)). In some instances, the peek gesture 3208 is defined with reference solely from information from the cameras 3104(1)-(4), while in other instances other information may be utilized (e.g., information from the gyroscope, etc.). Furthermore, in some instances a peek gesture 3208 requires that a user's position relative to the device 3100 change by at least a threshold angle, $\theta_1$.

Next, a user may perform a tilt gesture 3210 by rotating the device 3100 about the y-axis 3202 by a threshold amount, $\theta_2$, and then rotating the device 3100 back the opposite direction by a second threshold amount. In some instances, $\theta_2$ is greater than $\theta_1$, although in other instances the opposite is true or the angles are substantially equal. For instance, in one example $\theta_1$ may be between about 0.1° and about 5°, while $\theta_2$ may be between about 5° and about 30°.

In some implementations, the user-interface module 3128 detects a tilt gesture based on data from the gyroscope indicating that the user has rotated the device 3100 about the y-axis in a first direction and has started rotating the device 3100 back in a second, opposite direction (i.e., back towards the initial position). In some instances, the user-interface module 3128 detects the tilt gesture 3210 based on the rotation forwards and backwards, as well as based on one of the cameras on the front of the device 3100 recognizing the presence of a face or head of a user, thus better ensuring that the a user is in fact looking at the display 3102 and, hence, is providing an intentional input to the device 3100.

In some instances, the peek gesture 3208 may be used to display additional details regarding icons presented on the display 3102. The tilt gesture 3210, meanwhile, may be used to navigate between center, left, and right panels. For instance, a tilt gesture to the right (i.e., rotating the device 3104 about the y-axis in a clockwise direction followed by a counterclockwise direction when viewing the device from above) may cause the device to navigate from the center panel to the right panel, or from the left panel to the center panel. A tilt gesture to the left (i.e., rotating the device 3104 about the y-axis in a counterclockwise direction followed by a clockwise direction when viewing the device from above), meanwhile, may cause the device to navigate from the center panel to the left panel, or from the right panel to the center panel.

In addition to the peek gesture 3208 and the tilt gesture 3210, a user of may rotate the device 3100 about the z-axis to perform the swivel gesture 3212. The swivel gesture 3212 may comprise rotating the device more than a threshold angle ($\theta_3$), while in other instances the swivel gesture 3212 may comprise rotating the device more than the threshold angle, $\theta_3$, and then beginning to rotate the device back towards its initial position (i.e., in the opposite direction about the z-axis 3206), potentially by more than a threshold amount. Again, the user-interface module may determine that a swivel gesture 3212 has occurred based on information from the gyroscope, from another orientation sensor, and/or from one or more other sensors. For example, the user-interface module may also ensure that a face or head of the user is present (based on information from one or more front-facing cameras) prior to determining that the swivel gesture 3212 has occurred. As described above, the swivel gesture 3212 may result in any sort of operation on the device 3100, such as surfacing one or more icons.

Finally, FIG. 32 illustrates that a user of the device 3100 may perform a roll gesture 3214 by rotating the device 3100 about the x-axis 3202. The user-interface module 3128 may identify the roll gesture similar to the identification of the tilt and swivel gestures. That is, the module 3128 may identify that the user has rolled the device about the x-axis 3202 by more than a threshold angle ($\theta_4$), or may identify that that the user has rolled the device past the threshold angle, $\theta_4$, and then has begun rolling it back the other direction. Again, the user-interface module 3128 may make this determination using information provided by an orientation sensor, such as the gyroscope, and/or along with information from other sensors (e.g., information from one or more front-facing cameras, used to ensure that a face or head of the user is present). Alternatively, the roll gesture 3214 may be detected entirely and exclusively using the optical sensors (e.g., front facing cameras). While the roll gesture 3214 may be used by the device to perform various operations in response, in one example the roll gesture 3214 may cause the device to surface one or more icons, such as settings icons or the like.

In one example a user may be able to scroll content (e.g., text on documents, photos, etc.) via use of the roll gesture 3214. For instance, a user may roll the device forward (i.e., so that a top half of the device is nearer to the user) in order to scroll downwards, and may roll the device backward (so that a top half of the device is further from the user) in order to scroll upwards (or vice versa). Furthermore, in some instances the speed of the scrolling may be based on the degree of the roll. That is, a user may be able to scroll faster by increasing a degree of the roll and vice versa. Additionally or alternatively, the device may detect a speed or acceleration at which the user performs the roll gesture, which may be used to determine the speed of the scrolling. For instance, a user may perform a very fast roll gesture to scroll quickly, and a very slow, more gentle roll gesture to scroll more slowly.

While a few example gestures have been described, it is to be appreciated that the user-interface module 3128 may identify, in combination with the sensor-fusion module 3126, multiple other gestures based on information captured by sensors of the device 3100. Furthermore, while a few example operations performed by the device 3100 have been described, the device may perform any other similar or different operations in response to these gestures.

Figure 33:
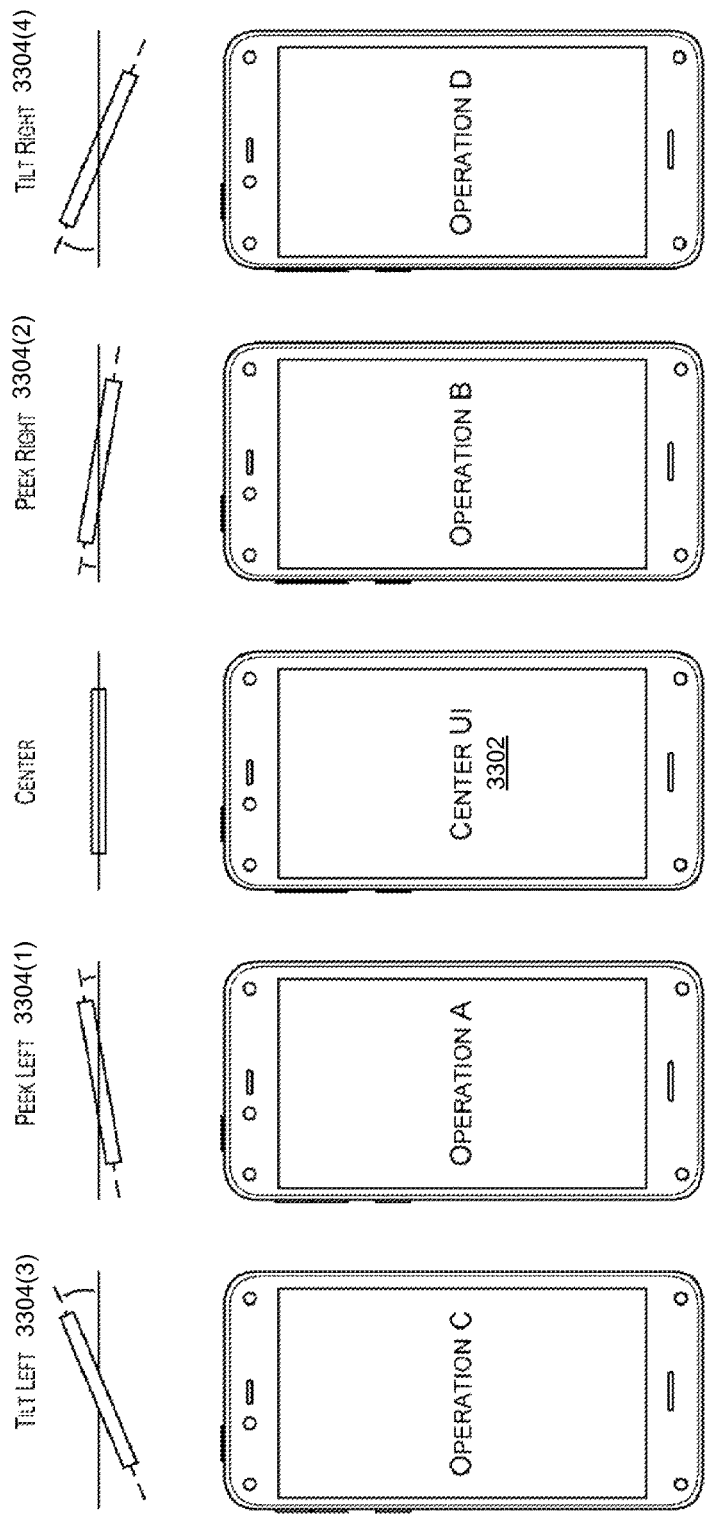
FIG. 33 illustrates example gestures and corresponding operations that may be performed in accordance with one or more example embodiments of the disclosure.

FIG. 33 illustrates an example scenario 3300 where a user performs, on the mobile electronic device 3100, a peek gesture to the left, a peek gesture to the right, a tilt gesture to the left, and a tilt gesture to the right. As illustrated, each of these gestures causes the mobile electronic device to perform a different operation.

To begin, the electronic device 3100 presents a "center UI" 3302 on the display 3102. Thereafter, a user performs a peek gesture to the left 3304(1) by either rotating the device 3100 in a counterclockwise manner when viewed from the top of the device and/or by moving a head of the user in corresponding or opposing manner. That is, because the device 3100 identifies the peek gesture using the four corner cameras 3104(1)-(4) in some instances, the device identifies the gesture 3304(1) by determining that the face or head of the user has changed relative to the position of the device and, thus, the user may either rotate the device and/or move his or her head to the left in this example. In either case, identifying the change in the position of the user relative to the device causes the device to perform an "operation A". This operation may include surfacing new or additional content, moving or altering objects or images displayed in the UI, surfacing a new UI, performing a function, or any other type of operation.

Conversely, FIG. 33 also illustrates a user performing a peek gesture to the right 3304(2) while the device 3100 presents the center UI 3302. As shown, in response the device 3100 performs a different operation, operation B.

In still another example, a user of the device 3100 may perform a tilt gesture to the left 3304(3) when the device 3100 presents the center UI (before or after performance of operation A). As described above, the device 3100 may recognize the tilt gesture 3304(3) based on data collected by an inertial sensor, such as a gyroscope, accelerometer, or the like. For instance, the device 3100 may determine that the tilt gesture has been performed in response to determining that the user has rotated the device in the counterclockwise direction (when viewed from above) passed a threshold angle and then has begun rotating the device 3100 back in the clockwise direction. In response to determining that the tilt gesture has occurred, the device 3100 may perform a predefined operation associated with that gesture (here, "Operation C").

Finally, FIG. 33 illustrates a user of the device 3100 performing a tilt gesture to the right 3304(4), which the device 3100 may identify in a manner similar to how the device identified the tilt gesture 3304(3). Here, however, the user rotates the device clockwise past a threshold angle and then back in a counterclockwise direction. As illustrated, the device 3100 performs an operation D on the device 3100.

Figure 34:
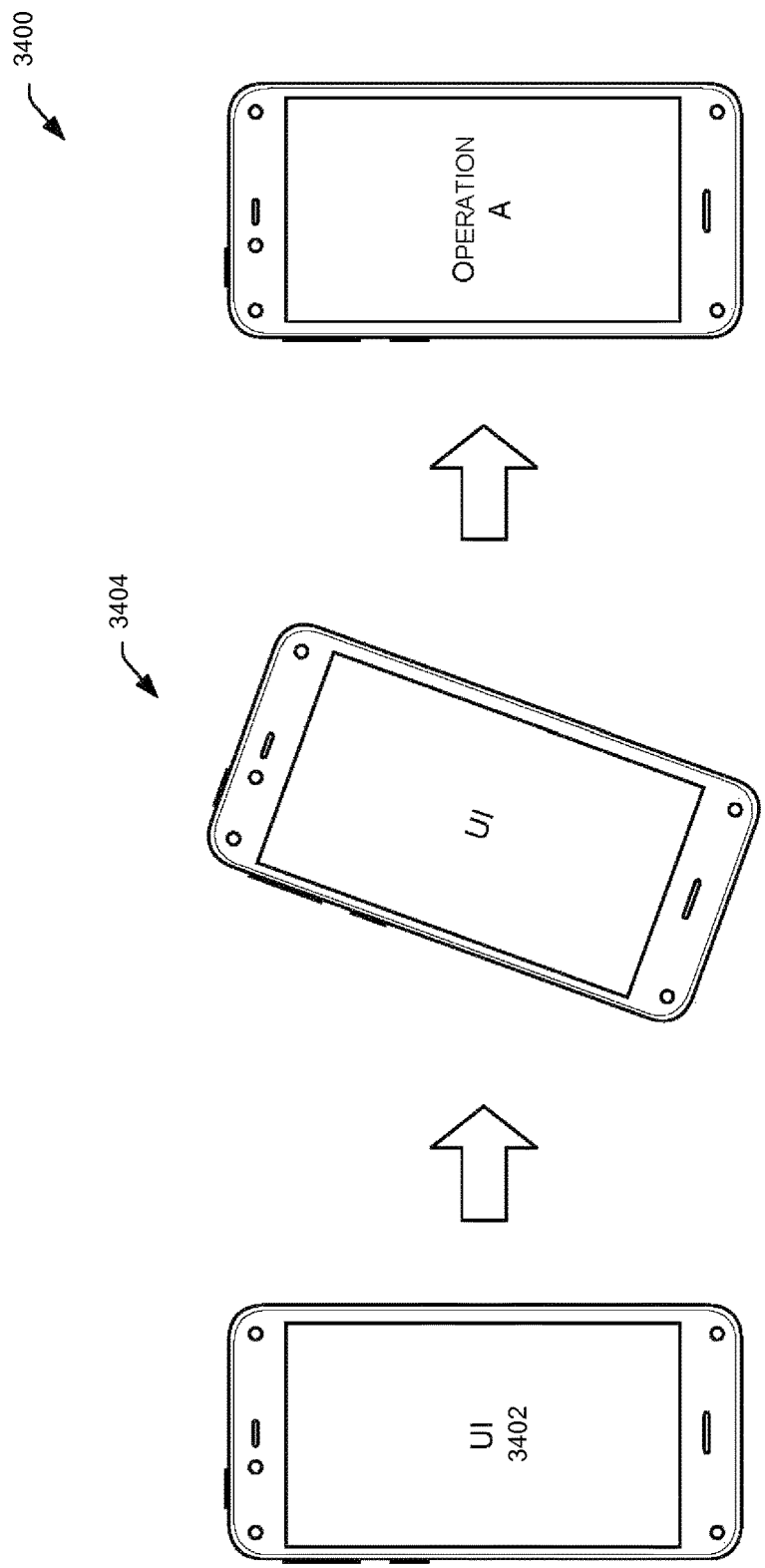
FIG. 34 illustrates an example swivel gesture and performance of an operation in response to the swivel gesture in accordance with one or more example embodiments of the disclosure.

FIG. 34 illustrates an example scenario 3400 where a user performs a swivel gesture on the device 3100 and, in response, the device performs a predefined operation. As illustrated, the device 3100 initially displays a UI 3402. At 3404, the user begins to perform a swivel gesture by rotating the device 3100 in either direction about the z-axis that is perpendicular to the display 3102 of the device. As noted above, an inertial sensor may sense this rotation. After 3404, the user rotates the device 3100 about the z-axis in the opposite direction (counterclockwise in this example) and, in response, the device 3100 identifies the gesture as a swivel gesture. In response to identifying the swivel gesture, the device performs an operation A, which, as discussed above, may comprise any sort of operation, including displaying or otherwise outputting certain content. While this example displays a swivel gesture to the right (given the initial clockwise rotation), in other instances the user may perform a swivel gesture to the left, which may result in the same or a different operation.

In some instances, the swivel gesture may require that a user rotate the device by more than a first threshold amount (e.g., 10 degrees), and then back by more than a second threshold amount (e.g., 5 degrees). In other instances, the device may detect a swivel gesture in response to the user rotating the device by more than a threshold amount then back the other direction by any amount.

Figure 35:
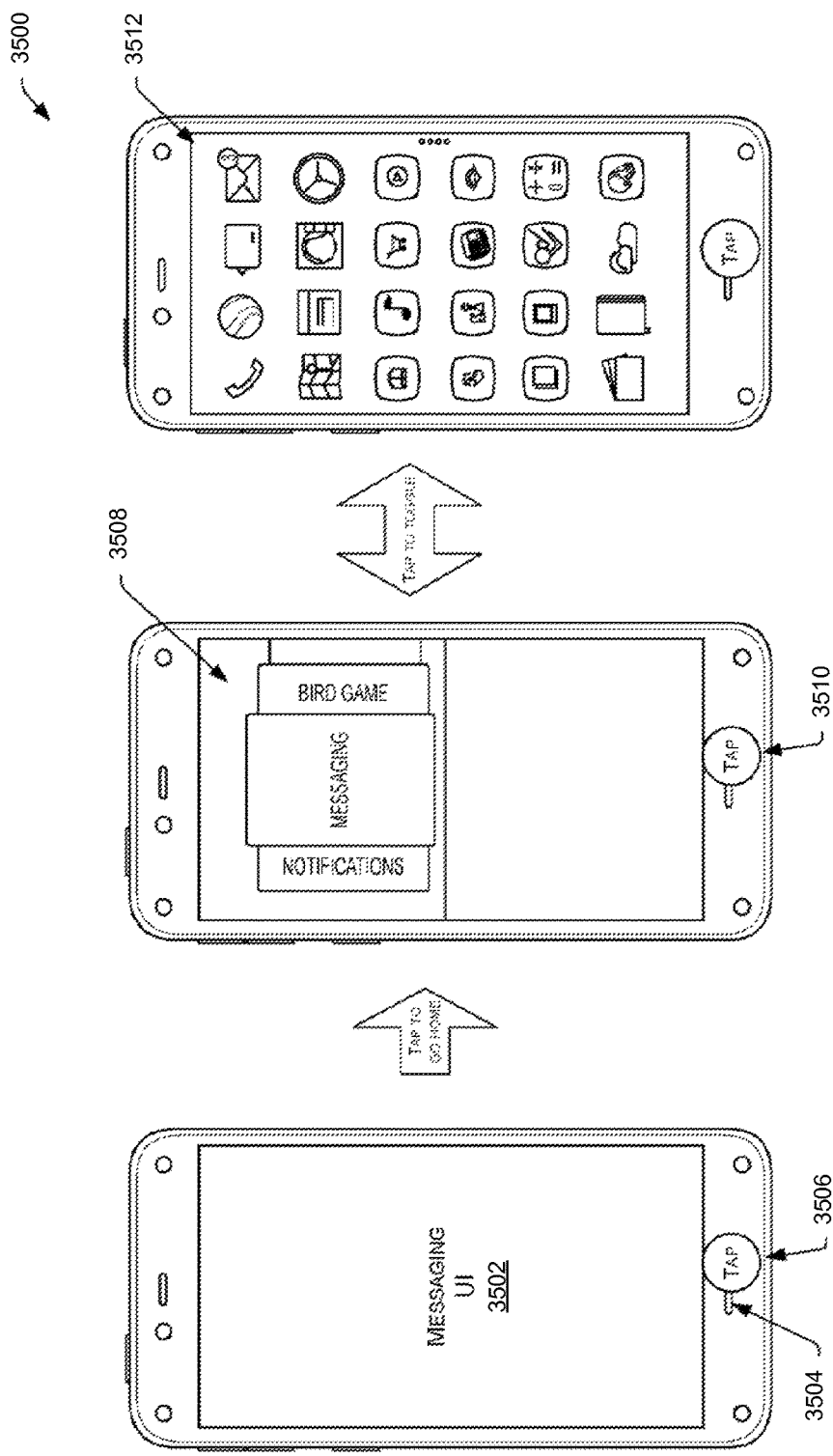
FIG. 35 illustrates different user interfaces that may be presented responsive to a user gesture in accordance with one or more example embodiments of the disclosure.

FIG. 35 illustrates an example scenario 3500 of the user interface (UI) of the device changing in response to a user selecting a physical home button on the device. In this example, the device 3100 begins by displaying a UI 3502 from an example application. While the device 3100 presents the UI 3502, the user selects (e.g., depresses) a physical button 3504 on the device 3100. This button 3504 may comprise a "home button" that, when selected causes the device 3100 to present a home screen associated with the device 3100. In this example, at 3506 the user taps or otherwise selects the button 3504. In response, the device 3100 navigates to the home screen 3508, which comprises a carousel of icons corresponding to applications and/or content items (collectively, "items").

The list displayed on the home screen 3508 may comprise an interactive list that is scrollable by the user of the device, such as by touch gestures on the display 3102. For instance, the user may swipe horizontally to view different icons in the list, and a single icon in the middle of the list and in front of the other icons may have user-interface focus at any one time. In some instances, the list comprises a carousel that "loops", such that a user is able to continuously spin the carousel in a circle, while in other examples the list has two ends and may be scrolled leftwards and rightwards.

In response to the user again selecting, at 3510, the home button 3504, the device displays a UI comprising a grid of applications 3512 available to the device (e.g., stored locally on the device, remotely in the cloud, or both). In some instances the grid 3512 is scrollable horizontally or vertically to display as many pages as necessary to present an icon associated with each application available to the device 3100. As illustrated, as the user selects the home button 3504, the device 3100 toggles between displaying the home screen (e.g., with the carousel) and the application grid 3512. Application icons may appear in the home carousel 3508, the application grid 3512, or both.

Figure 36:
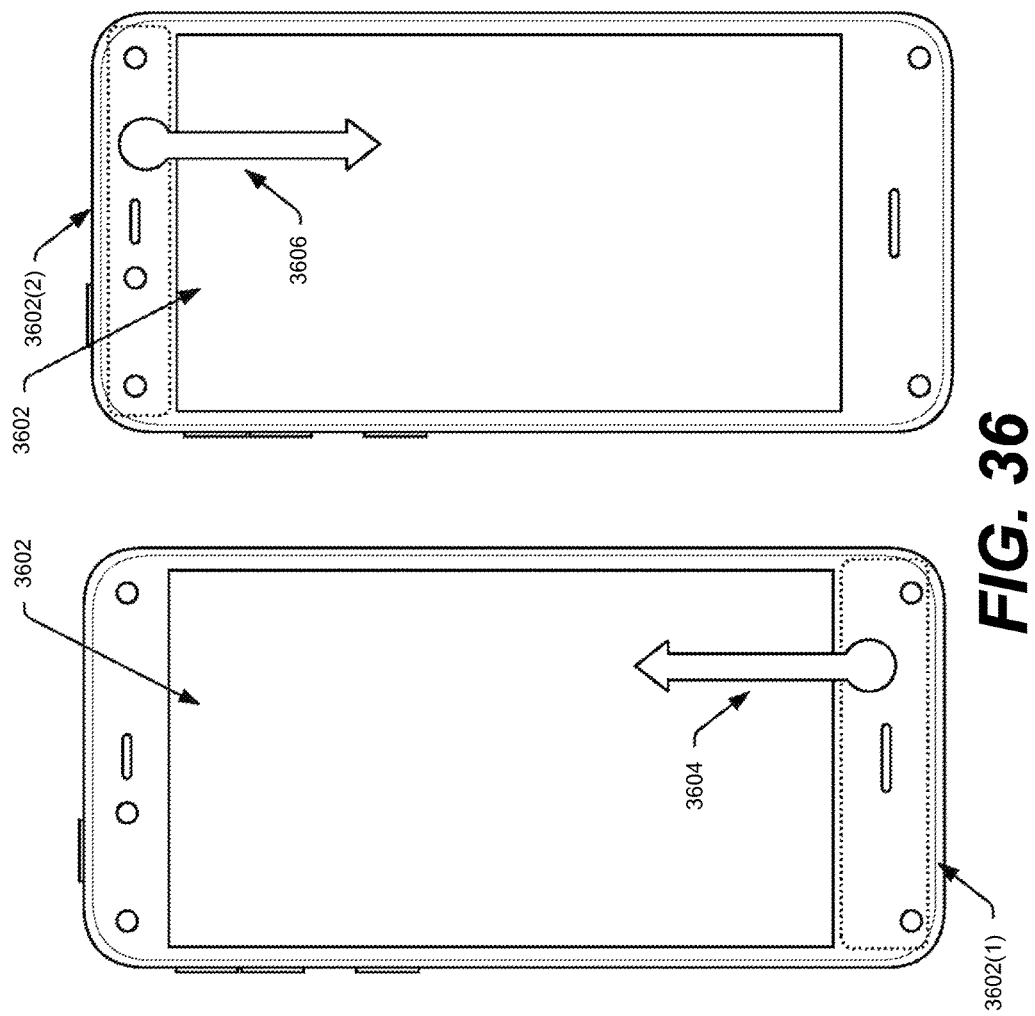
FIG. 36 illustrates example swipe gestures originating at a bezel of a user device and terminating at a display of the device in accordance with one or more example embodiments of the disclosure.

FIG. 36 illustrates example swipe gestures initiated at a bezel of the device and terminating at a display of the device. The left side of FIG. 36 depicts an upwards swipe gesture 3604 that begins at a bottom portion of a bezel 3602(1) of the device 3100 and ends on the display 3102. The right side of FIG. 36 illustrates a downwards swipe gesture 3606 that begins at an upper portion of the bezel 3602(2) and ends on the display 3102.

These respective gestures may be associated with the same or different operations. For instance, the gesture 3604 may cause the device 3100 to navigate backwards to whatever task the device 3100 was performing prior to the current task the device is performing at the time of the gesture 3604. This may include navigating backwards in a browser application, switching from a first application to a second application that the user was previously consuming, or the like. Similarly, the gesture 3604 may cause the device 3100 to perform an sort of predefined operations.

FIGS. 37A-H illustrate various example swipe gestures that a user may perform on the mobile electronic device 3100. These respective gestures may be associated with any type of predefined operations, which may be specific to whatever application a device is currently executing or which may be used consistently across all applications on the device.

FIG. 37A illustrates a basic tap on a touch-sensitive display, such as the display 3102. This may cause the device open a content item or otherwise perform a selection operation. FIG. 37B illustrates a double tap, which comprises a user striking the touch-sensitive display (or other touch sensor) with an implement (e.g., a finger, stylus, pen, etc.) two times within a threshold duration of one another and within a threshold distance of another. This may allow a user to zoom in on a content item (e.g., map, picture, etc.), to toggle a video aspect ratio of the display, to enter an immersive text view, or the like.

FIG. 37C, meanwhile, illustrates a tap-and-hold gesture. Here, the user taps the display and keeps his or her finger on the display for a threshold amount of time. After the touch-sensor recognizes the user's finger or other element on the display for the threshold amount of time, the device 3100 may recognize the tap-and-hold gesture and may perform a corresponding operation. For instance, pressing-and-holding may cause the device to launch a voice-recognition application to allow a user of the device 3100 to provide a voice command to the device. This gesture may also cause the device to present a camera button, may launch the camera directly, may cause the device 3100 to present a context menu of icons, or the like.

FIG. 37D illustrates a pinch-and-spread gesture, where a user places two fingers on the touch-sensitive display in close proximity to one another then spreads his or her fingers out. This may cause the device 3100 to zoom in on certain items, such as maps, photos, a browser, etc.

FIG. 37E, meanwhile, illustrates a horizontal swipe by a user, while FIG. 37F illustrates a vertical swipe. A horizontal swipe may allow a user to navigate an interactive list horizontally, to pan a map horizontally, to move from one song to another song in a music application to fast forward or rewind in a video application, or the like. The vertical swipe of FIG. 37F, meanwhile, may allow a user to scroll a list or the application grid vertically, pan a map vertically, unlock the device 3100, answer a phone call, change a volume of the device, and the like.

FIG. 37G illustrates a drag-and-drop gesture, which may cause the device 3100 to give the appearance of the user grabbing and icon on the display 3102 and moving the icon where the user's finger or other implement travels on the display. To do so, a user may tap-and-hold on the device and, after a threshold amount of time, may drag his or her finger or other implement across the display in the desired direction without lifting his or her finger or implement off of the display. When the user lifts the finger or implement off of the display, the device 3100 may consider the gesture complete and may determine an operation to perform (e.g., where to display the icon) based on where the user removed his or her finger from the display 3102.

Finally, FIG. 37H illustrates a multi-finger swipe gesture, where a user places two fingers onto the touch-sensitive display or other touch sensor and slides his or her fingers across the display 3102 or touch sensor. In some instances, this gesture acts similar to one or more of the in-air gestures (e.g., swivel, peek, tilt, roll) in order to provide a better experience to users that are unable to perform the in-air gestures comfortably. For instance, the multi-finger swipe gesture to the right may navigate an application (or the home screen) from a center panel to a right panel, while such a gesture to the left may cause display of a corresponding left panel. This gesture may also adjust a brightness of the display 3102 or may be associated with any other predefined operation.

FIG. 38 illustrates an example double-tap gesture 3802 that a user may perform on a back of the mobile electronic device 3100. Here, a user may perform this gesture 3802 by tapping the device (e.g., with a finger) on the back of the device, with the taps occurring within a threshold amount of time of each other and within a threshold distance of one another. In some instances, an inertial sensor, such as an accelerometer, a gyroscope, or both may detect both tap events and may determine: (1) whether they occurred within a threshold amount of time of one another, and (2) whether they occurred within a threshold distance of one another. If so, then the device 3100 may determine that a double-tap gesture 3802 occurred and may perform a corresponding operation. It is noted that while FIG. 38 illustrates a double-tap gesture, in other instances the device 3100 utilizes gestures having any other predetermined number of taps. Furthermore, while an accelerometer or gyroscope may be used to identify the gesture 3802, in other instances other sensors may be used to determine this gesture, such as a touch screen or touch sensor on the back of the device 3100.

Figure 39:
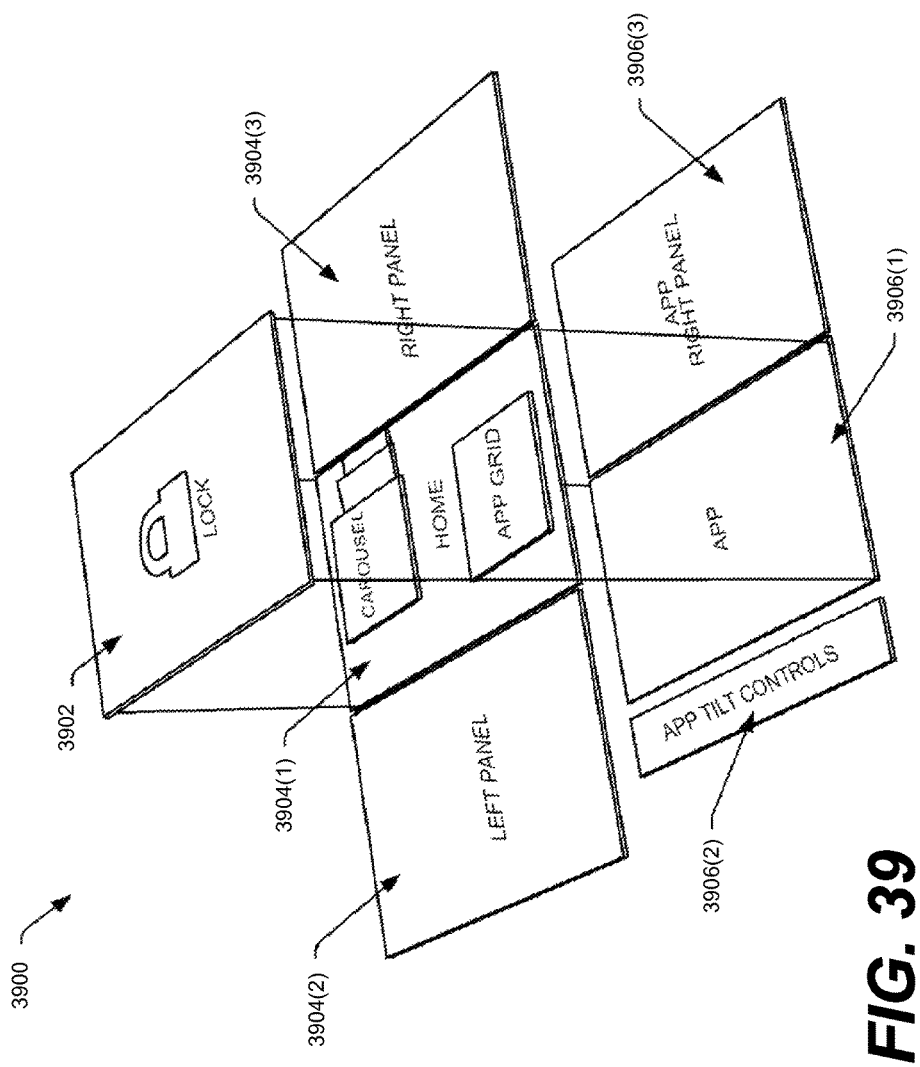
FIG. 39 illustrates an example sequence of user interfaces that may be rendered by a user device in accordance with one or more example embodiments of the disclosure.

FIG. 39 illustrates an example sequence of UIs 3900 that the device 3100 may implement. The UI of the device may initially comprise a lock screen 3902. Upon a user unlocking the device (e.g., via a password, a swipe gesture, biometric authentication, etc.), the UI may comprise a "home screen" 3904(1), which may include an interactive list as described above (e.g., the carousel), along with a grid of applications, which a user may navigate via vertical swipe gestures. As described above, the home screen 3904(1) may comprise a center panel of a three (or more) panel layer of screens. From the home screen 3904(1), the user may navigate to a left panel 3904(2) or to a right panel 3904(3). For instance, a user may perform a tilt gesture to the left to navigate to the left panel 3904(2) or may perform a tilt gesture to the right to navigate to the right panel 3904(3). Conversely, the user may perform a multi-finger swipe right or left or may perform another predefined gesture to navigate to these panels.

Additionally from the layer of screens 3904, a user may navigate to a particular application comprising a center panel 3906(1), a left panel 3906(2), and a right panel 3906(3). The center panel 3906(1) may be the default screen for an application executable on the device and, as such, this panel may display the "primary content". For instance, in a book-reading application, the center panel 3906(1) may comprise the content of the electronic book. In a document processing application, the center panel 3906(1) may comprise the content of the document, and the like. Again, the user may navigate to the right and left panels via the respective tilt gestures in some instances.

In some examples, a left panel 3906(2) of an application may comprise user-interface controls, which may include application-specific controls, device-generic controls (e.g., wireless settings, display brightness, etc.), or both. The right panel 3906(3), meanwhile, may comprise content that is supplementary to or related to the primary content displayed on the center panel 906(1). In certain example embodiments, the left panel 3906(2) and/or the right panel 3906(3) may include card content that is personalized, contextually relevant, and/or pertinent to content that may be currently rendered in the center panel 3906(1). While a few specific examples are discussed and illustrated below, it is to be appreciated that these are merely examples and many other possibilities exist.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
receiving, at least one computer processor, first contextual data that indicates at least one of (i) a time, a location, or a user activity associated with use of a user device, and at least one of (ii) a time of day or a time range during which the user device is engaged in an activity;
receiving, at the at least one computer processor, content consumption data indicating previous content consumed in connection with a user account associated with the user device;
generating, by the at least one computer processor and based at least in part on the content consumption data, a first card object comprising displayable content that relates to at least one of at least a portion of the first contextual data, the first card object further comprising first card metadata specifying a first constraint on displaying the content, wherein the first card metadata comprises a first card identifier;
transmitting, by the at least one computer processor, the first card object for presentation by a card client configured to execute on the user device, wherein the content of the first card object is displayed upon occurrence of a first contextual condition that satisfies the first constraint;
determining, by the at least one computer processor before occurrence of the first contextual condition, that a second constraint associated with a second card object is satisfied by occurrence of a second contextual condition;
generating, by the at least one computer processor, the second card object, wherein the second card object comprises updated displayable content and second card metadata comprising the first card identifier; and
transmitting, by the at least one computer processor, the second card object for presentation by the card client, wherein the updated displayable content of the second card object replaces the content of the first card object.

2. The method of claim 1, further comprising:
receiving, at the at least one computer processor, a card event notification comprising second contextual data indicating that the location has changed.

3. The method of claim 1, further comprising:
receiving, at the at least one computer processor, a card event notification comprising second contextual data indicating that the location has changed;
generating, by the at least one computer processor, a third card object comprising displayable content that is related to the change in the location, wherein the third card object comprises third card metadata comprising a second card identifier that is different from the first card identifier;
transmitting, by the at least one computer processor, the third card object for presentation by the card client; and
transmitting, by the at least one computer processor, an instruction to delete the first card object.

4. The method of claim 1, further comprising:
receiving, at the at least one computer processor, feedback data indicating a user interaction with the displayable content after being displayed by the card client, wherein the user interaction comprises at least one of a selection of a selectable portion of the displayable content that triggers an action to occur or a gesture causing removal of the displayable content from a user interface of the card client;
generating, by the at least one computer processor, using the feedback data, a third card object comprising updated displayable content having an increased likelihood of being of interest to the user; and
transmitting, by the at least one computer processor, the third card object for presentation by the card client.

5. A method, comprising:
receiving, at least one computer processor, contextual data relating to use of a user device over a period of time, wherein the contextual data indicates at least one of a time of day or a time range during which the user device is engaged in an activity;
receiving, at the at least one computer processor, content consumption data indicating previous content consumed in connection with a user account associated with the user device;
generating, by the at least one computer processor and based at least in part on the content consumption data, a first card object comprising content that relates to the contextual data, the first card object further comprising a first card identifier and card metadata specifying a first constraint on presenting the content;
transmitting, by the at least one computer processor, the first card object for presentation by a card client configured to execute on the user device, wherein the content of the first card object is presented by the card client upon occurrence of a first contextual condition that satisfies the first constraint;
determining, by the at least one computer processor before occurrence of the first contextual condition, that a second constraint associated with a second card object is satisfied by occurrence of a second contextual condition;
generating, by the at least one computer processor, the second card object, wherein the second card object comprises updated content and second card metadata comprising the first card identifier; and
transmitting, by the at least one computer processor, the second card object for presentation by the card client, wherein the updated content of the second card object replaces the content of the first card object.

6. The method of claim 5, wherein the card object is a first card object, the method further comprising:
receiving, at the at least one computer processor, feedback data indicating a user interaction with the content after display of the updated content by the card client;
generating, by the at least one computer processor, a user sentiment metric based at least in part on the feedback data, wherein the user sentiment metric is a measure of an extent to which the feedback data indicates a positive user sentiment towards the updated content;
determining, by the at least one computer processor, that the user sentiment metric is less than a threshold level of positive user sentiment;
generating, by the at least one computer processor, a third card object;
determining, by the at least one computer processor, a score for content of the third card object that indicates a greater likelihood that the user expresses at least the threshold level of positive user sentiment towards the updated content; and
transmitting, by the at least one computer processor, the third card object for presentation by the card client.

7. The method of claim 5, wherein the card metadata is first card metadata, and wherein the second card object comprises second card metadata comprising a Boolean value indicating that the updated content is to be displayed more prominently than content currently being displayed by the card client.

8. The method of claim 6, wherein the user interaction comprises a user gesture to remove the content from a user interface of the card client within a predetermined period of time.

9. The method of claim 5, wherein the card metadata comprises a ranking associated with the first card object, and wherein the ranking indicates a priority with which the card client displays the content in relation to other content.

10. The method of claim 5, wherein the contextual data comprises historical contextual data indicating a first event relating to the use of the user device, wherein the historical contextual data indicates a location and a time associated with the first event, and wherein the contextual condition comprises occurrence of a second event associated with the location and the time.

11. The method of claim 10, further comprising querying a service for the historical contextual data.

12. The method of claim 5, wherein the card metadata further comprises an expiration time after which the content is no longer eligible for display.

13. The method of claim 5, further comprising:
receiving, at the at least one computer processor, a card event notification comprising second contextual data indicating that a location of the user device has changed,
generating, by the at least one computer processor, a third card object comprising updated content that is related to the change in the location, wherein the third card object comprises second card metadata comprising a second card identifier; and
transmitting, by the at least one computer processor, the third card object for presentation by the card client, wherein the updated content of the third card object replaces the content of the second card object.

14. The method of claim 5, further comprising:
receiving, at the at least one computer processor, a card event notification comprising second contextual data indicating that a location of the user device has changed,
generating, by the at least one computer processor, a third card object comprising updated content that is related to the change in the location, wherein the third card object comprises second card metadata comprising a second card identifier that is different from the first card identifier;

transmitting, by the at least one computer processor, the third card object for presentation by the card client; and transmitting, by the at least one computer processor, an instruction to delete the first card object.

15. A system, comprising:
at least one memory storing computer-executable instructions; and
at least one processor configured to access the at least one memory and execute the computer-executable instructions to:
  receive contextual data relating to use of a user device over a period of time, wherein the contextual data indicates at least one of a time of day or a time range during which the user device is engaged in an activity;
  receive content consumption data indicating previous content consumed in connection with a user account associated with the user device;
  generate, based at least in part on the content consumption data, a first card object comprising content that relates to the contextual data, the first card object further comprising a first card identifier and card metadata specifying a first constraint on presenting the content;
  transmit the card object for presentation by a card client configured to execute on the user device, wherein the content of the first card object is presented by the card client upon occurrence of a contextual condition that satisfies the first constraint;
  determine, before occurrence of the first contextual condition, that a second constraint associated with a second card object is satisfied by occurrence of a second contextual condition;
  generate the second card object, wherein the second card object comprises updated content and second card metadata comprising the first card identifier; and
  transmit the second card object for presentation by the card client, wherein the updated content of the second card object replaces the content of the first card object.

16. The system of claim 15, wherein the contextual data comprises historical contextual data indicating a first event relating to the use of the user device, wherein the historical contextual data indicates a location and a time associated with the first event, and wherein the contextual condition comprises occurrence of a second event associated with the location and the time.

17. The system of claim 15, wherein the at least one processor is further configured to execute the computer-executable instructions to:
  receive a card event notification comprising second contextual data indicating that a location of the user device has changed,
  generate a third card object comprising updated content that is related to the change in the location, wherein the third card object comprises second card metadata comprising a second card identifier; and
  transmit the third card object for presentation by the card client, wherein the updated content of the third card object replaces the content of the second card object.

18. The system of claim 15, wherein the at least one processor is further configured to execute the computer-executable instructions to:
  receive a card event notification comprising second contextual data indicating that a location of the user device has changed,
  generate a third card object comprising updated content that is related to the change in the location, wherein the third card object comprises second card metadata comprising a second card identifier that is different from the first card identifier;
  transmit the third card object for presentation by the card client; and
  transmit an instruction to delete the first card object.

* * * * *